United States Patent
Lin et al.

(10) Patent No.: US 10,466,394 B2
(45) Date of Patent: Nov. 5, 2019

(54) DIFFRACTION GRATINGS FORMED BY METASURFACES HAVING DIFFERENTLY ORIENTED NANOBEAMS

(71) Applicant: Magic Leap, Inc., Plantation, FL (US)

(72) Inventors: Dianmin Lin, Los Altos, CA (US); Michael Anthony Klug, Austin, TX (US); Pierre St. Hilaire, Belmont, CA (US); Mauro Melli, San Leandro, CA (US); Christophe Peroz, San Francisco, CA (US); Evgeni Poliakov, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 93 days.

(21) Appl. No.: 15/880,404

(22) Filed: Jan. 25, 2018

(65) Prior Publication Data

US 2018/0231702 A1 Aug. 16, 2018

Related U.S. Application Data

(60) Provisional application No. 62/451,615, filed on Jan. 27, 2017, provisional application No. 62/451,608, filed on Jan. 27, 2017.

(51) Int. Cl.
    *G02B 5/18* (2006.01)
    *F21V 8/00* (2006.01)
    *G02B 27/01* (2006.01)

(52) U.S. Cl.
    CPC ......... *G02B 5/1871* (2013.01); *G02B 5/1809* (2013.01); *G02B 5/1842* (2013.01);
    (Continued)

(58) Field of Classification Search
    CPC .............. G02B 27/0172; G02B 5/1809; G02B 5/1842; G02B 5/1871; G02B 6/0011;
    (Continued)

(56) References Cited

U.S. PATENT DOCUMENTS

| 6,850,221 B1 | 2/2005 | Tickle |
| D514,570 S | 2/2006 | Ohta |

(Continued)

FOREIGN PATENT DOCUMENTS

| TW | 201530195 A | 8/2015 |
| WO | WO 2017/079480 | 5/2017 |

(Continued)

OTHER PUBLICATIONS

International Search Report and Written Opinion for PCT Application No. PCT/US18/15324, dated May 10, 2018.

(Continued)

*Primary Examiner* — William R Alexander
*Assistant Examiner* — Balram T Parbadia
(74) *Attorney, Agent, or Firm* — Knobbe, Martens, Olson & Bear, LLP

(57) ABSTRACT

Metasurfaces provide compact optical elements in head-mounted display systems to, e.g., incouple light into or outcouple light out of a waveguide. The metasurfaces may be formed by a plurality of repeating unit cells, each unit cell comprising two sets or more of nanobeams elongated in crossing directions: one or more first nanobeams elongated in a first direction and a plurality of second nanobeams elongated in a second direction. As seen in a top-down view, the first direction may be along a y-axis, and the second direction may be along an x-axis. The unit cells may have a periodicity in the range of 10 nm to 1 μm, including 10 nm to 500 nm or 300 nm to 500 nm. Advantageously, the metasurfaces provide diffraction of light with high diffraction angles and high diffraction efficiencies over a broad range of incident angles and for incident light with circular polarization.

60 Claims, 41 Drawing Sheets

(52) U.S. Cl.
CPC .......... *G02B 6/0011* (2013.01); *G02B 6/0016* (2013.01); *G02B 27/0172* (2013.01); *G02B 2207/101* (2013.01)

(58) Field of Classification Search
CPC ............ G02B 6/0016; G02B 2207/101; G02B 27/01; G02B 5/18; G02B 1/00; G02B 2207/10; F21V 8/00; H01Q 15/02
See application file for complete search history.

(56) References Cited

U.S. PATENT DOCUMENTS

| | | | |
|---|---|---|---|
| 7,905,650 | B2 | 3/2011 | Ma et al. |
| 8,917,447 | B2 | 12/2014 | Wolk et al. |
| 9,081,426 | B2 | 7/2015 | Armstron |
| 9,176,065 | B2 | 11/2015 | Bond et al. |
| D752,529 | S | 3/2016 | Loretan et al. |
| 9,348,143 | B2 | 5/2016 | Gao et al. |
| D759,657 | S | 7/2016 | Kujawski et al. |
| 9,671,566 | B2 | 6/2017 | Abovitz et al. |
| D794,288 | S | 8/2017 | Beers et al. |
| D805,734 | S | 12/2017 | Fisher et al. |
| 2005/0161589 | A1 | 7/2005 | Kim et al. |
| 2006/0126179 | A1 | 6/2006 | Levola |
| 2006/0240232 | A1 | 10/2006 | Faris |
| 2008/0176041 | A1 | 7/2008 | Sato et al. |
| 2010/0232017 | A1 | 9/2010 | McCarthy et al. |
| 2011/0069727 | A1 | 3/2011 | Reid et al. |
| 2011/0141541 | A1* | 6/2011 | Bratkovski ............ G02B 1/005 359/240 |
| 2011/0166045 | A1 | 7/2011 | Dhawan et al. |
| 2012/0013989 | A1* | 1/2012 | Choi ...................... B82Y 20/00 359/642 |
| 2012/0099817 | A1 | 4/2012 | Quan et al. |
| 2012/0127062 | A1 | 5/2012 | Bar-Zeev et al. |
| 2013/0082922 | A1 | 4/2013 | Miller |
| 2013/0125027 | A1 | 5/2013 | Abovitz |
| 2013/0176554 | A1 | 7/2013 | Loncar et al. |
| 2014/0063585 | A1 | 3/2014 | Hagoplan et al. |
| 2014/0071539 | A1 | 3/2014 | Gao |
| 2014/0140653 | A1 | 5/2014 | Brown et al. |
| 2014/0146390 | A1* | 5/2014 | Kaempfe ............. G02B 5/1809 359/485.01 |
| 2014/0167022 | A1* | 6/2014 | Huh .................... H01L 51/5275 257/40 |
| 2014/0177023 | A1 | 6/2014 | Gao et al. |
| 2014/0218468 | A1 | 8/2014 | Gao et al. |
| 2014/0264998 | A1* | 9/2014 | Smith ............... H01L 31/02366 264/104 |
| 2014/0272295 | A1 | 9/2014 | Deshpande et al. |
| 2014/0306866 | A1 | 10/2014 | Miller et al. |
| 2015/0103306 | A1 | 4/2015 | Kaji et al. |
| 2015/0116721 | A1 | 4/2015 | Kats et al. |
| 2015/0167921 | A1 | 6/2015 | Gollier et al. |
| 2015/0219806 | A1* | 8/2015 | Arbabi ................ G02B 5/1828 359/573 |
| 2015/0222883 | A1 | 8/2015 | Welch |
| 2015/0222884 | A1 | 8/2015 | Cheng |
| 2015/0253570 | A1 | 9/2015 | Sunnari et al. |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0025626 | A1 | 1/2016 | Dos Santos Fegadolli et al. |
| 2016/0025914 | A1 | 1/2016 | Brongersma et al. |
| 2016/0026253 | A1 | 1/2016 | Bradski et al. |
| 2016/0154044 | A1 | 6/2016 | Bertness |
| 2016/0306079 | A1 | 10/2016 | Arbabi et al. |
| 2017/0131460 | A1 | 5/2017 | Lin et al. |
| 2017/0322418 | A1 | 11/2017 | Lin et al. |
| 2018/0045953 | A1* | 2/2018 | Fan ................... G02B 27/0012 |
| 2018/0217395 | A1 | 8/2018 | Lin et al. |

FOREIGN PATENT DOCUMENTS

| | | |
|---|---|---|
| WO | WO 2017/193012 | 11/2017 |
| WO | WO 2018/140502 | 8/2018 |
| WO | WO 2018/140651 | 8/2018 |

OTHER PUBLICATIONS

Aieta, F. et al., "Multiwavelength achromatic metasurfaces by dispersive phase compensation," Science, vol. 347, Issue 6228, Mar. 20, 2015, in 5 pages. URL: www.sciencemag.org.

Arbabi, A. et al., "Dielectric metasurfaces for complete control of phase and polarization with subwavelength spatial resolution and high transmission," Nature Nanotechnology, published online Aug. 31, 2015, in 8 pages. URL: www.nature.com/naturenanotechnology.

Cunningham et al., "A plastic colorimetric resonant optical biosensor for multiparallel detection of label-free biochemical interactions," Sensors and Actuators B, vol. 85, Jul. 2002, in 8 pages.

Hasman, E. et al., "Polarization dependent focusing lens by use of quantized Pancharatnam-Berry phase diffractive optics", Applied Physics Letters, vol. 82, No. 3, Jan. 20, 2003, in 3 pages.

Khorasaninejad, M. et al., "Broadband Multifunctional Efficient Meta-Gratings Based on Dielectric Waveguide Phase Shifters", Nano Letters, vol. 15, Sep. 2015, in 7 pages.

Kildishev, A. et al., "Planar Photonics with Metasurfaces", Science, vol. 339, Mar. 15, 2013, in 9 pages. URL: http://d .doi.org/10.1126/science.1232009.

Lin, D. et al., "Dielectric gradient metasurface optical elements", Science, vol. 345, Issue 6194, Jul. 18, 2014, in 6 pages.

Lin, D. et al., "Supplementary Materials for Dielectric gradient metasurface optical elements", Science, vol. 345, Issue 6194, Jul. 18, 2014, in 22 pages.

Pors, A. et al., "Gap plasmon-based metasurfaces for total control of reflected light", Scientific Reports, vol. 3, Jul. 8, 2013, in 6 pages.

Shalaev et al., "High-Efficiency All Dielectric Metasurfaces for Ultra-Compact Beam Manipulation in Transmission Mode," Nano letters 15.9 (2015): 6261-6266.

Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.

Yu, N. et al., "Optical Metasurfaces and Prospect of Their Applications Including Fiber Optics", Journal of Lightwave Technology, vol. 33, No. 12, Jun. 15, 2015, in 15 pages. URL: http://ieeeplore.ieee.org/document/7045485/.

Zhu, A. Y. et al., "Broadband visible wavelength high efficiency meta-gratings", Conference on Lasers and Electro-Optics, OSA Technical Digest (online), Jan. 2016, in 2 pages.

International Search Report and Written Opinion for PCT Application No. PCT/US2018/015057, dated Apr. 5, 2018.

* cited by examiner

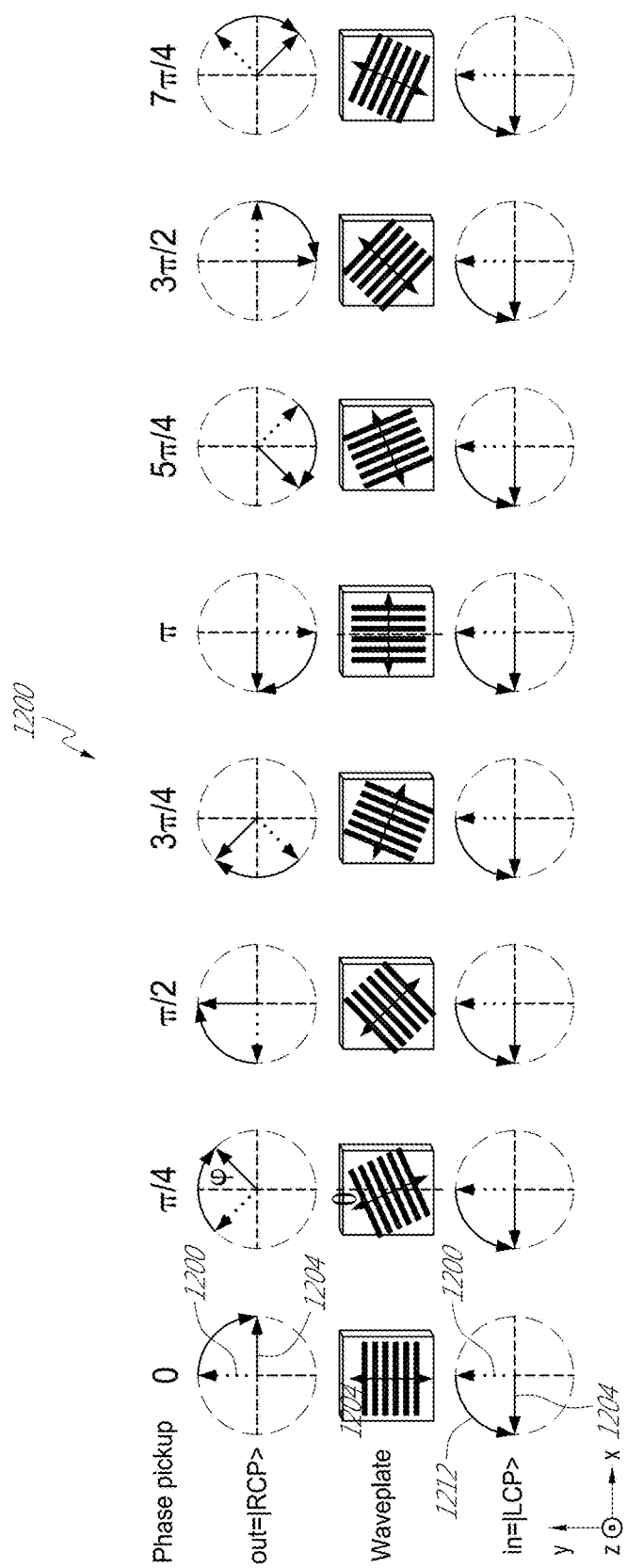

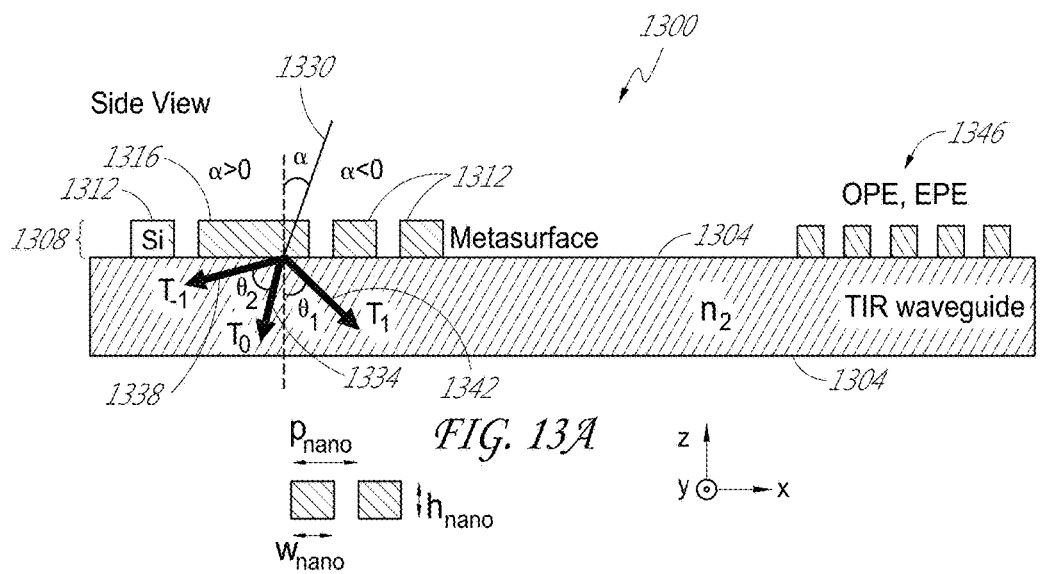
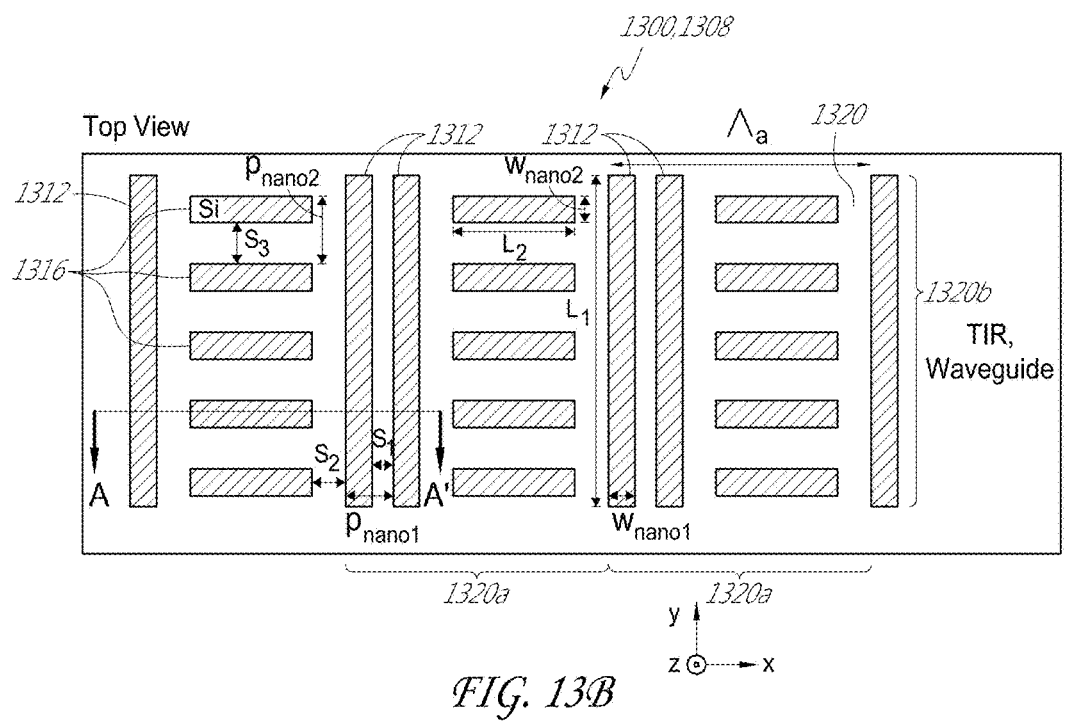

DIFFRACTION GRATINGS FORMED BY METASURFACES HAVING DIFFERENTLY ORIENTED NANOBEAMS

PRIORITY CLAIM

This application claims the benefit of priority under 35 U.S.C. § 119(e) of U.S. Provisional Application No. 62/451,608 filed on Jan. 27, 2017 and U.S. Provisional Application No. 62/451,615 filed on Jan. 27, 2017. The entire disclosure of each of these priority documents is incorporated herein by reference.

INCORPORATION BY REFERENCE

This application incorporates by reference the entirety of each of the following patent applications: U.S. application Ser. No. 14/331,218; U.S. application Ser. No. 14/641,376; U.S. Provisional Application No. 62/012,273; U.S. Provisional Application No. 62/005,807; U.S. Provisional Application No. 62/333,067; and U.S. patent application Ser. No. 15/342,033.

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 1 is depicted. The user of an AR technology sees a real-world park-like setting 20 featuring people, trees, buildings in the background, and a concrete platform 30. The user also perceives that he "sees" "virtual content" such as a robot statue 40 standing upon the real-world platform 1120, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

According to some embodiments, an optical system includes a metasurface configured to diffract visible light having a wavelength. The metasurface includes a plurality of repeating unit cells, where each unit cell consists of two to four sets of nanobeams. A first set of nanobeams are formed by one or more first nanobeams and a second set of nanobeams are formed by a plurality of second nanobeams disposed adjacent to the one or more first nanobeams and separated from each other by a sub-wavelength spacing. The one or more first nanobeams and the plurality of second nanobeams are elongated in different orientation directions. The unit cells repeat at a period less than or equal to about 10 nm to 1 µm.

According to some other embodiments, an optical system includes a waveguide configured to propagate visible light, where the wave guide includes a substrate having thereon a metasurface of the optical system described above, wherein the one or more first nanobeams and the second nanobeams are arranged to diffract light at a diffraction angle relative to the direction of an incident light, and to cause the diffracted light to propagate in the substrate under total internal reflection.

According to some embodiments, a head-mounted display device is configured to project light to an eye of a user to display augmented reality image content, where the head-mounted display device includes a frame configured to be supported on a head of the user. The display device additionally includes a display disposed on the frame. At least a portion of the display includes one or more waveguides, where the one or more waveguides are transparent and disposed at a location in front of the user's eye when the user wears the head-mounted display device, such that the transparent portion transmits light from a portion of an environment in front of the user to the user's eye to provide a view of the portion of the environment in front of the user. The display device additionally includes one or more light sources. The display device further includes at least one diffraction grating configured to couple light from the light sources into the one or more waveguides or to couple light out of the one or more waveguides, where the diffraction grating includes a metasurface of the optical system described above.

According to yet other embodiments, a method of fabricating an optical system comprises providing a substrate and forming on the substrate a metasurface comprising a plurality of unit cells. Forming the metasurface includes forming the unit cells consisting of two to four sets of nanobeams. Forming the unit cells includes forming a first set of nanobeams including one or more first nanobeams and forming a second set of nanobeams adjacent to the one or more first nanobeams. Forming the second set of nanobeams includes forming a plurality of second nanobeams that are separated from each other by a sub-wavelength spacing. The one or more first nanobeams and the plurality of second nanobeams are elongated in different orientation directions. The unit cells repeat at a period less than or equal to about 10 nm to 1 µm.

According to some embodiments, an optical system includes a metasurface configured to diffract visible light having a wavelength, where the metasurface includes a plurality of repeating unit cells. Each unit cell includes a first set of nanobeams, where two or more of the first nanobeams have different widths. Each unit cell additionally includes a second set of nanobeams, where two or more of the second nanobeams have different widths. The second nanobeams are disposed adjacent to the first nanobeams and separated from each other by a sub-wavelength spacing. Furthermore, the first nanobeams and the second nanobeams of the unit cells have different orientations.

According to other embodiments, a head-mounted display device is configured to project light to an eye of a user to display augmented reality image content, where the head-mounted display device includes a frame configured to be supported on a head of the user. The display device additionally includes a display disposed on the frame. At least a portion of the display includes one or more waveguides, where the one or more waveguides are transparent and are disposed at a location in front of the user's eye when the user wears the head-mounted display device, such that the transparent portion transmits light to the user's eye to provide a view of the portion of the environment in front of the user. The display device additionally includes one or more light sources. The display device further includes at least one diffraction grating configured to couple light from the light sources into the one or more waveguides or to couple light out of the one or more waveguides, where the diffraction grating comprising a metasurface according to the optical system described above.

According to yet other embodiments, a method of fabricating a metasurface, includes providing a substrate. The method additionally includes forming on the substrate a metasurface having a plurality of unit cells. Forming the metasurface includes forming a first set of nanobeams comprising two or more first nanobeams having different widths. Forming the metasurface additionally includes forming a second set of nanobeams comprising two or more second nanobeams having different widths, where the second nanobeams are disposed adjacent to the first nanobeams and are separated from each other by a sub-wavelength spacing. The first nanobeams and the second nanobeams have different orientations.

Examples of various other embodiments are provided below:

1. An optical system comprising:
    a metasurface configured to diffract visible light having a wavelength, the metasurface comprising:
        a plurality of repeating unit cells, each unit cell consisting of two to four sets of nanobeams, wherein:
            a first set of nanobeams are formed by one or more first nanobeams; and
            a second set of nanobeams are formed by a plurality of second nanobeams disposed adjacent to the one or more first nanobeams and separated from each other by a sub-wavelength spacing,
        wherein the one or more first nanobeams and the plurality of second nanobeams are elongated in different orientation directions, and
        wherein the unit cells repeat at a period less than or equal to about 10 nm to 1 µm.

2. The optical system of Embodiment 1, wherein the one or more first nanobeams and the second nanobeams are oriented at an angle relative to each other to cause a phase difference between the visible light diffracted by the one or more first nanobeams and the visible light diffracted by the second nanobeams.

3. The optical system of Embodiment 2, wherein the phase difference is twice the angle.

4. The optical system of any of Embodiments 1-3, wherein the wavelength in the visible spectrum corresponds to a blue light, a green light or a red light.

5. The optical system of any of Embodiments 1-4, wherein the one or more first nanobeams and the second nanobeams are oriented in orientation directions that are rotated by about 90 degrees relative to each other.

6. The optical system of any of Embodiments 1-5, wherein each of the first nanobeams have a same width.

7. The optical system of any of Embodiments 1-6, wherein each of the second nanobeams has a same width.

8. The optical system of any of Embodiments 1-7, wherein each of the first nanobeams in each of the second nanobeams have a same spacing between individual ones of the first and second nanobeams.

9. The optical system of any of Embodiments 1-7, wherein the unit cells repeat at a period less than or equal to the wavelength, wherein the wavelength is within the visible spectrum.

10. The optical system of any of Embodiments 1-9, wherein the one or more first nanobeams and the second nanobeams have a height smaller than the wavelength.

11. The optical system of any of Embodiments 1-10, wherein the one or more first nanobeams and the second nanobeams are formed of a material whose bulk refractive index is higher than 2.0 at the wavelength.

12. The optical system of any of Embodiments 1-11, wherein the one or more first nanobeams and the second nanobeams are formed of a semiconductor material or an insulating material.

13. The optical system of any of Embodiments 1-12, wherein the one or more first nanobeams and the second nanobeams are formed of a material having silicon.

14. The optical system of any of Embodiments 1-13, wherein the one or more first nanobeams and the second nanobeams are formed of a material selected from the group consisting of polycrystalline silicon, amorphous silicon, silicon carbide and silicon nitride.

15. The optical system of any of Embodiments 1-14, wherein the one or more first nanobeams and the second nanobeams are configured to diffract the visible light at a diffraction efficiency greater than 10% at a diffraction angle greater than 50 degrees relative to a surface normal plane.

16. The optical system of Embodiment 15, wherein the one or more first nanobeams and the second nanobeams are configured to diffract light at the diffraction efficiency for the incident light having a range of angle of incidence which exceeds 40 degrees.

17. The optical system of Embodiment 16, wherein the surface normal plane extends in the first orientation direction.

18. The optical system of Embodiment 17, wherein the one or more first nanobeams and the second nanobeams are configured to diffract light in a transmission mode, wherein the intensity of diffracted light on an opposite side of the one or more first nanobeams and the second nanobeams as a light-incident side is greater compared to the intensity of diffracted light on a same side of the one or more first nanobeams and the second nanobeams as the light-incident side.

19. The optical system of Embodiment 17, wherein the wherein the one or more first nanobeams and the second nanobeams are configured to diffract light in a reflection mode, wherein the intensity of diffracted light on a same side of the one or more first nanobeams and the second nanobeams as a light-incident side is greater compared to the intensity of diffracted light on an opposite side of the one or more first nanobeams and the second nanobeams as the light-incident side.

20. The optical system of any of Embodiments 1-19, wherein the one or more first nanobeams and the second nanobeams are formed on a substrate and formed of a material whose bulk refractive index is greater than a refractive index of the substrate by at least 0.5.

21. The optical system of Embodiment 20, wherein the substrate has a refractive index greater than 1.5.

22. The optical system of any of Embodiments 20-21, wherein the substrate is configured such that light diffracted by the one or more first nanobeams and the second nanobeams propagate in the second direction under total internal reflection.

23. The optical system of any of Embodiments 1-22, wherein the one or more first nanobeams and the second nanobeams have a substantially rectangular cross-sectional shape.

24. The optical system of any of Embodiments 1-23, wherein the one or more first nanobeams comprise a pair of first nanobeams.

25. The optical system of Embodiment 24, wherein the one or more first nanobeams are immediately adjacent to the pair of nanobeams such that the second nanobeams are directly interposed between adjacent pairs of first nanobeams.

26. The optical system of any of Embodiments 1-23, wherein the one or more first nanobeams consists of one first nanobeam.

27. The optical system of any of Embodiments 1-24 and 26, further comprising a third set of nanobeams formed by a plurality of third nanobeams elongated in a different orientation relative to the first one or more first nanobeams and the plurality of second nanobeams, the third nanobeams interposed between the one or more first nanobeams and the second nanobeams.

28. The optical system of Embodiment 27, wherein the third nanobeams have the same length such that the third nanobeams coterminate.

29. The optical system of any of Embodiments 27-28, wherein adjacent ones of the third nanobeams are separated by a constant space in the first orientation direction.

30. The optical system of any of Embodiments 27-29, wherein the one or more first nanobeams span a distance in the first orientation direction corresponding to a plurality of third nanobeams.

31. The optical system of any of Embodiments 27-30, wherein each of the third nanobeams has the same width and wherein a spacing between individual ones of the third has a same width.

32. The optical system of any of Embodiments 27-31, wherein the third nanobeams extend in a third orientation direction that is rotated in a counterclockwise direction relative to the one or more first nanobeams by an angle smaller than the smallest angle of rotation in the counterclockwise direction of the second nanobeams relative to the one or more first nanobeams when viewed a direction of propagation of an incident light.

33. The optical system of any of Embodiments 27-32, further comprising a fourth set of nanobeams formed by a plurality of fourth nanobeams elongated in a different orientation relative to the first one or more first nanobeams, the plurality of second nanobeams and the plurality of third nanobeams, the fourth nanobeams disposed on a side of the second nanobeams in the second orientation direction that is opposite to a side in which the third nanobeams are disposed.

34. The optical system of any of Embodiments 33, wherein the fourth nanobeams extend in a fourth orientation direction that is rotated in a counterclockwise direction relative to the one or more first nanobeams by an angle greater than the smallest angle of rotation in the counterclockwise direction of the second nanobeams relative to the one or more first nanobeams when viewed a direction of propagation of an incident light.

35. The optical system of Embodiment 34, wherein the fourth orientation direction and the third orientation direction are rotated by about 90 degrees relative to each other.

36. The optical system of any of Embodiments 1-35, wherein the one or more first nanobeams and the second nanobeams comprise a bilayer comprising a lower layer having a first refractive index and an upper layer having a second refractive index lower than the first refractive index.

37. The optical system of Embodiment 36, wherein the upper layer is formed of a material having a refractive index lower than about 2.0.

38. The optical system of any of Embodiments 36-37, wherein the upper layer contains silicon or carbon.

39. The optical system of any of Embodiments 1-38, wherein the one or more first nanobeams and the second nanobeams are buried in a transparent spacer layer.

40. The optical system of Embodiment 39, wherein the transparent spacer layer has a refractive index smaller than a refractive index of a bulk material of one or more first nanobeams and the second nanobeams.

41. The optical system of any of Embodiments 1-38, wherein a metallic reflective layer is formed over the one or more first nanobeams and the second nanobeams.

42. An optical system comprising:
 a waveguide configured to propagate visible light, the wave guide comprising:
  a substrate having thereon a metasurface according to any of Embodiments 1-41, wherein the one or more first nanobeams and the second nanobeams are arranged to diffract light at a diffraction angle relative to the direction of an incident light and to cause the diffracted light to propagate in the substrate under total internal reflection.

43. The waveguide of Embodiment 42, wherein the substrate is formed of a material whose refractive index is less than a bulk refractive index of the material from which the one or more nanobeams and the second nanobeams are formed, thereby causing the diffracted light to propagate in the substrate under total internal reflection.

44. The waveguide of any of Embodiments 42-43, wherein the diffraction angle exceeds 50 degrees.

45. The waveguide of any of Embodiment 42-44, wherein the substrate is formed of a material whose refractive index is smaller than a bulk refractive index of the material from which the one or more nanobeams and the second nanobeams are formed by at least 0.5.

46. The waveguide of any of Embodiments 42-45, wherein the substrate has a refractive index greater than 1.5.

47. A head-mounted display device configured to project light to an eye of a user to display augmented reality image content, the head-mounted display device comprising:
 a frame configured to be supported on a head of the user;
 a display disposed on the frame, at least a portion of the display comprising:
  one or more waveguides, the one or more waveguides being transparent and disposed at a location in front of the user's eye when the user wears the head-mounted display device such that the transparent portion transmits light from a portion of an environment in front of the user to the user's eye to provide a view of the portion of the environment in front of the user;
  one or more light sources; and
  at least one diffraction grating configured to couple light from the light sources into the one or more waveguides or to couple light out of the one or more waveguides, the diffraction grating comprising a metasurface according to any of Embodiments 1-41.

48. The device of Embodiment 47, wherein the one or more light sources comprises a fiber scanning projector.

49. The device of any of Embodiments 47-48, the display configured to project light into the user's eye so as to present image content to the user on a plurality of depth planes.

50. A method of fabricating an optical system, comprising:
providing a substrate;
forming on the substrate a metasurface comprising a plurality of unit cells, the unit cells consisting of two to four sets of nanobeams, wherein forming the unit cells comprises:
forming a first set of nanobeams comprising one or more first nanobeams; and
forming a second set of nanobeams adjacent to the one or more first nanobeams, the second set of nanobeams comprising a plurality of second nanobeams that are separated from each other by a sub-wavelength spacing,
wherein the one or more first nanobeams and the plurality of second nanobeams are elongated in different orientation directions, and
wherein the unit cells repeat at a period less than or equal to about 10 nm to 1 µm.

51. The method of Embodiment 50, wherein forming the one or more first nanobeams and forming the second nanobeams comprises lithographically defining the first and second nanobeams.

52. The method of Embodiment 50, wherein forming the one or more first nanobeams and forming the second nanobeams comprises forming the first and second nanobeams by nanoimprinting.

53. The method of any of Embodiments 50-52, wherein forming the one or more first nanobeams and forming the second nanobeams are performed simultaneously.

54. The method of any of Embodiments 50-53, wherein the one or more first nanobeams have the same width.

55. The method of any of Embodiments 50-54, wherein the second nanobeams of each unit cell have the same width.

56. The method of any of Embodiments 50-55, wherein the units cells have a period less than or equal to a wavelength in the visible spectrum.

57. An optical system comprising:
a metasurface configured to diffract visible light having a wavelength, the metasurface comprising:
a plurality of repeating unit cells, each unit cell comprising:
a first set of nanobeams formed by one or more first nanobeams; and
a second set of nanobeams formed by a plurality of second nanobeams disposed adjacent to the one or more first nanobeams and separated from each other by a sub-wavelength spacing,
wherein the one or more first nanobeams and the plurality of second nanobeams are elongated in different orientation directions, and
wherein the unit cells repeat at a period less than or equal to the wavelength.

58. The optical system of Embodiment 57, further comprising a light source configured to emit light of the wavelength to the metasurface.

59. The optical system of Embodiment 58, further comprising a spatial light modulator configured to modulate light from the light source and to output the modulated light to the metasurface.

60. The optical system of any of Embodiments 57-59, wherein the wavelength corresponds to blue light, green light or red light.

61. An optical system comprising:
a metasurface configured to diffract visible light having a wavelength, the metasurface comprising:
a plurality of repeating unit cells, each unit cell comprising:
a first set of nanobeams, wherein two or more of the first nanobeams have different widths; and
a second set of nanobeams, wherein two or more of the second nanobeams have different widths, the second nanobeams disposed adjacent to the first nanobeams and separated from each other by a sub-wavelength spacing,
wherein the first nanobeams and the second nanobeams have different orientations.

62. The optical system of Embodiment 61, further comprising a light source configured to emit light of the wavelength to the metasurface.

63. The optical system of Embodiment 62, further comprising a spatial light modulator configured to modulate light from the light source and to output the modulated light to the metasurface.

64. The optical system of any of Embodiments 61-63, wherein the wavelength corresponds to blue light, green light, or red light.

65. The optical system of Embodiment 61, wherein the first set of nanobeams and the second set of nanobeams are arranged such that the metasurface is configured to diffract visible light into a single order of diffracted light.

66. The optical system of any of Embodiments 61-65, wherein the first set of nanobeams comprises a pair of first nanobeams having a first width and a second width, respectively, and wherein the second set of nanobeams comprises alternating second nanobeams having a third width and a fourth width.

67. The optical system of any of Embodiments 61-66, wherein the unit cells repeat at a period less than or equal to about 10 nm to 1 µm.

68. The optical system of any of Embodiments 61-68, wherein the unit cells repeat at a period less than or equal to the wavelength, wherein the wavelength is within the visible spectrum.

69. The optical system of any of Embodiments 61-68, wherein the first nanobeams and the second nanobeams are oriented at an angle of orientation relative to each other to cause a phase difference between visible light diffracted by the first set of nanobeams and the visible light diffracted by the second set of nanobeams.

70. The optical system of Embodiment 69, wherein the phase difference is twice the angle.

71. The optical system of any of Embodiments 69-70, wherein the angle of orientation is about 90 degrees.

72. The optical system of any of Embodiments 61-67, wherein the first nanobeams and the second nanobeams have a height smaller than the wavelength.

73. The optical system of any of Embodiments 61-72, wherein the first nanobeams and the second nanobeams are formed of a material whose bulk refractive index is higher than 2.0 at the wavelength.

74. The optical system of any of Embodiments 61-73, wherein the first nanobeams and the second nanobeams are formed of a semiconductor material or an insulating material.

75. The optical system of any of Embodiments 61-74, wherein the first nanobeams and the second nanobeams are formed of titanium dioxide.

76. The optical system of any of Embodiments 61-75, wherein the first nanobeams and the second nanobeams are formed of a silicon-containing material.

77. The optical system of any of Embodiments 61-76, wherein the first nanobeams and the second nanobeams are formed of a material selected from the group consisting of monocrystalline silicon, polycrystalline silicon, amorphous silicon, silicon carbide and silicon nitride.

78. The optical system of any of Embodiments 61-77, wherein the first nanobeams and the second nanobeams are configured to diffract visible light at a diffraction efficiency greater than 10% at a diffraction angle greater than 50 degrees relative to a surface normal plane.

79. The optical system of Embodiment 78, wherein the first nanobeams and the second nanobeams are configured to diffract light at the diffraction efficiency for the incident light having a range of angles of incidence which exceeds 40 degrees.

80. The optical system of Embodiment 79, wherein the surface normal plane extends in the first orientation direction.

81. The optical system of Embodiment 80, wherein the first nanobeams and the second nanobeams are configured to diffract light in a transmission mode, wherein the intensity of diffracted light on an opposite side of the first nanobeams and the second nanobeams as a light-incident side is greater compared to the intensity of diffracted light on a same side of the first nanobeams and the second nanobeams as the light-incident side.

82. The optical system of Embodiment 80, wherein the first nanobeams and the second nanobeams are configured to diffract light in a reflection mode, wherein the intensity of diffracted light on a same side of the first nanobeams and the second nanobeams as a light-incident side is greater compared to the intensity of diffracted light on an opposite side of the first nanobeams and the second nanobeams as the light-incident side.

83. The optical system of any of Embodiments 61-82, wherein the first nanobeams and the second nanobeams are formed on a substrate and formed of a material whose bulk refractive index is greater than a refractive index of the substrate by at least 0.5.

84. The optical system of Embodiment 83, wherein the substrate has a refractive index greater than 1.5.

85. The optical system of any of Embodiments 83-84, wherein the substrate is configured such that light diffracted by the first nanobeams and the second nanobeams propagate in the second direction under total internal reflection.

86. The optical system of any of Embodiments 61-85, wherein the first nanobeams and the second nanobeams have a substantially rectangular cross-sectional shape.

87. The optical system of any of Embodiments 61-85, wherein the first nanobeams are immediately adjacent to a pair of nanobeams such that the second nanobeams are directly interposed between adjacent pairs of first nanobeams.

88. The optical system of any of Embodiments 61-87, further comprising a waveguide configured to propagate visible light, wherein the metasurface is disposed over the waveguide, wherein the metasurface comprises the first nanobeams and the second nanobeams arranged to diffract light at a diffraction angle relative to an incident direction of light to cause the diffracted light to propagate in the substrate under total internal reflection.

89. The optical system of any of Embodiment 61-88, wherein the substrate is formed of a material whose refractive index is smaller than a bulk refractive index of the material from which the first nanobeams and the second nanobeams are formed by at least 0.5.

90. A head-mounted display device configured to project light to an eye of a user to display augmented reality image content, the head-mounted display device comprising:
  a frame configured to be supported on a head of the user;
  a display disposed on the frame, at least a portion of the display comprising:
    one or more waveguides, the one or more waveguides being transparent and disposed at a location in front of the user's eye when the user wears the head-mounted display device such that the transparent portion transmits light to the user's eye to provide a view of the portion of the environment in front of the user;
    one or more light sources; and
    at least one diffraction grating configured to couple light from the light sources into the one or more waveguides or to couple light out of the one or more waveguides, the diffraction grating comprising a metasurface according to any of Embodiments 61-87.

91. The display device of Embodiment 90, wherein the one or more light sources comprises a fiber scanning projector.

92. The display device of any of Embodiments 90-91, wherein the display is configured to project light into the user's eye so as to present image content to the user on a plurality of depth planes.

93. A method of fabricating a metasurface, comprising:
  providing a substrate;
  forming on the substrate a metasurface having a plurality of unit cells, forming the metasurface comprising:
    forming a first set of nanobeams comprising two or more first nanobeams having different widths; and
    forming a second set of nanobeams comprising two or more second nanobeams having different widths, the second nanobeams disposed adjacent to the first nanobeams and separated from each other by a sub-wavelength spacing,
    wherein the first nanobeams and the second nanobeams have different orientations.

94. The method of Embodiment 93, wherein forming the first nanobeams and forming the second nanobeams comprises simultaneously lithographically defining the first and second nanobeams.

95. The method of Embodiment 93, wherein forming the first nanobeams and forming the second nanobeams comprises forming the first and second nanobeams by nanoimprinting.

96. The method of any of Embodiments 93-95, wherein forming the first nanobeams and forming the second nanobeams are performed simultaneously.

97. The method of any of Embodiments 93-96, wherein the units cells have a periodicity less than or equal to a wavelength in the visible spectrum.

BRIEF DESCRIPTION OF THE DRAWINGS

FIGS. 12A-12H illustrate changes in polarization vectors of an incident light corresponding to rotations in the fast axes of a waveplate by an angle θ of 0, π/4, π/2, 3π/4, π, 5π/4, 3π/2 and 7π/4, respectively.

FIGS. 13A and 13B illustrate a cross-sectional side view and a top-down view, respectively, of a diffraction grating comprising a metasurface having 2-phase level geometric phase optical elements, according to some embodiments.

DETAILED DESCRIPTION

Figure 1:
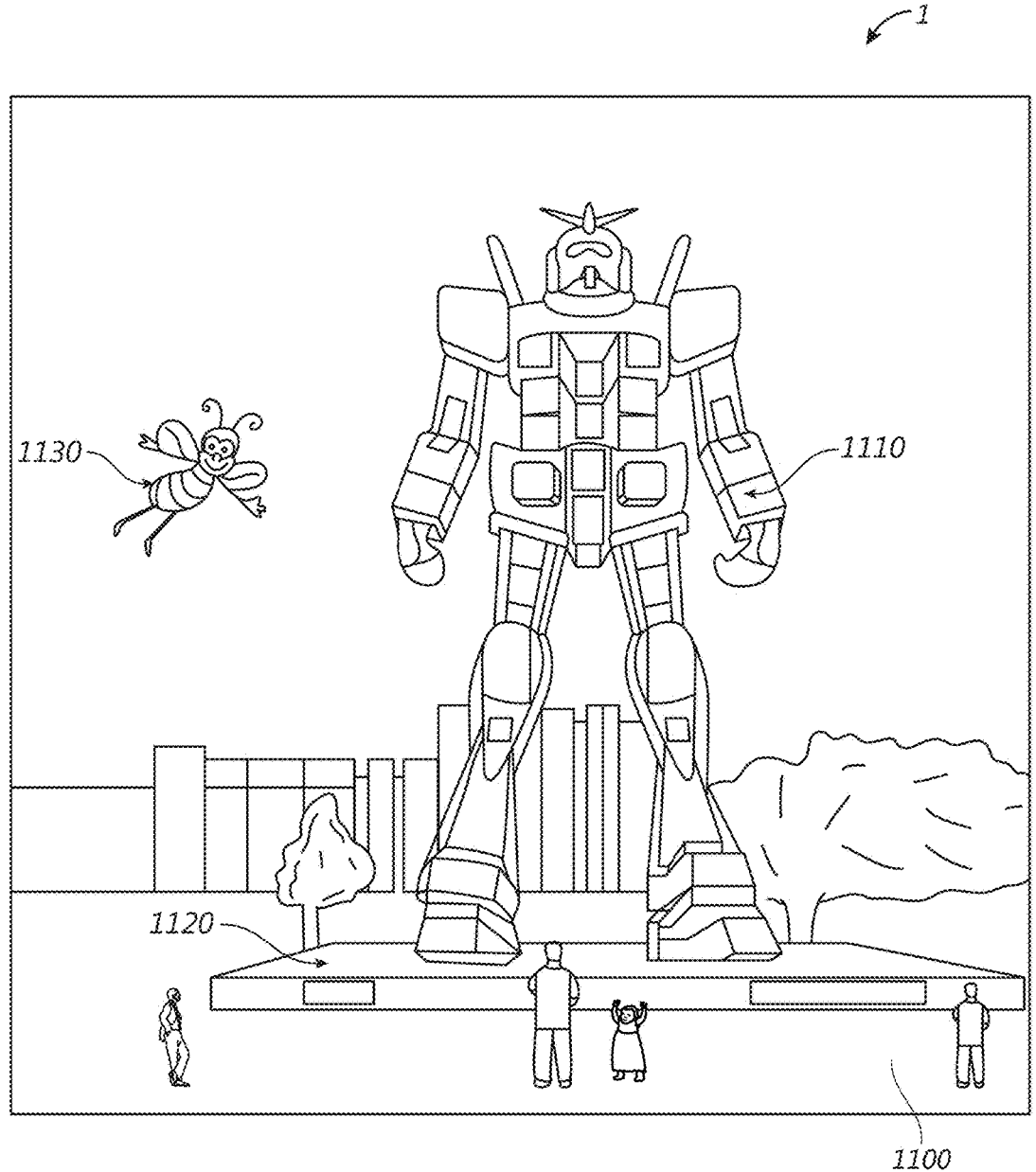
FIG. 1 illustrates a user's view of augmented reality (AR) through an AR device.

Optical systems, such as display systems, often utilize optical elements to control the propagation of light. In some applications, due to demand for compact optical systems, conventional optical elements may no longer be suitable.

Metasurfaces, metamaterial surfaces, provide opportunities to realize virtually flat, aberration-free optics on much smaller scales, in comparison with geometrical optics. Without being limited by theory, in some embodiments, metasurfaces include dense arrangements of surface structures that function as resonant optical antennas. The resonant nature of the light-surface structure interaction provides the ability to manipulate optical wave-fronts. In some cases, the metasurfaces may allow the replacement of bulky or difficult to manufacture optical components with thin, relatively planar elements formed by simple patterning processes.

In some embodiments, metasurfaces for forming diffractive gratings are disclosed. The metasurfaces may take the form of a grating formed by a plurality of repeating unit cells. Each unit cell may comprise two sets or more of nanobeams elongated in crossing directions: one or more first nanobeams elongated in a first direction and a plurality of second nanobeams elongated in a second direction different from the first direction. For example, as seen in a top-down view, the first direction may be generally along a y-axis, and the second direction may be generally along an x-axis. In some embodiments, the unit cells may comprise four sets of nanobeams: one or more first nanobeams elongated in the first direction, a plurality of second nanobeams elongated in the second direction, a plurality of third nanobeams elongated in a third direction, and a plurality of fourth nanobeams elongated in a fourth direction. As an example, the first and second directions may form a first angle relative to one another (e.g., 90°), and the first and third directions and first and fourth directions may form opposite angles to one another. In some embodiments, the metasurfaces may be symmetric in the sense that each of the first nanobeams, where there are multiple first nanobeams, have the same width. In some other embodiments, the metasurfaces may be described as being asymmetric in the sense that at least one of the first nanobeams in a unit cell, where there are multiple first nanobeams, has a different width from at least one other of the first nanobeams. In some embodiments, the unit cells of the symmetric or asymmetric metasurfaces have a periodicity in the range of 10 nm to 1 μm, including 10 nm to 500 nm or 300 nm to 500 nm, and may be less than the wavelengths of light that the metasurface is configured to diffract or which are directed to the metasurface for, e.g., incoupling into or outcoupling out of a waveguide. Advantageously, as it has been found that the metasurfaces disclosed herein provide diffraction of light with high diffraction angles and high diffraction efficiencies over a broad range of incident angles and for incident light with circular polarization. In particular, in some embodiments, asymmetric metasurfaces can steer the diffracted light into one of a plurality of diffraction orders while reducing the other(s) of the plurality of diffraction orders. In addition, in some embodiments, the metasurfaces diffract light with high wavelength selectivity.

In some embodiments, the metasurfaces may be utilized in wearable display systems to provide compact optical elements. AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" display is a display that may be mounted on the head of a viewer.

Reference will now be made to the drawings, in which like reference numerals refer to like parts throughout.

Example Display Systems

Figure 2:
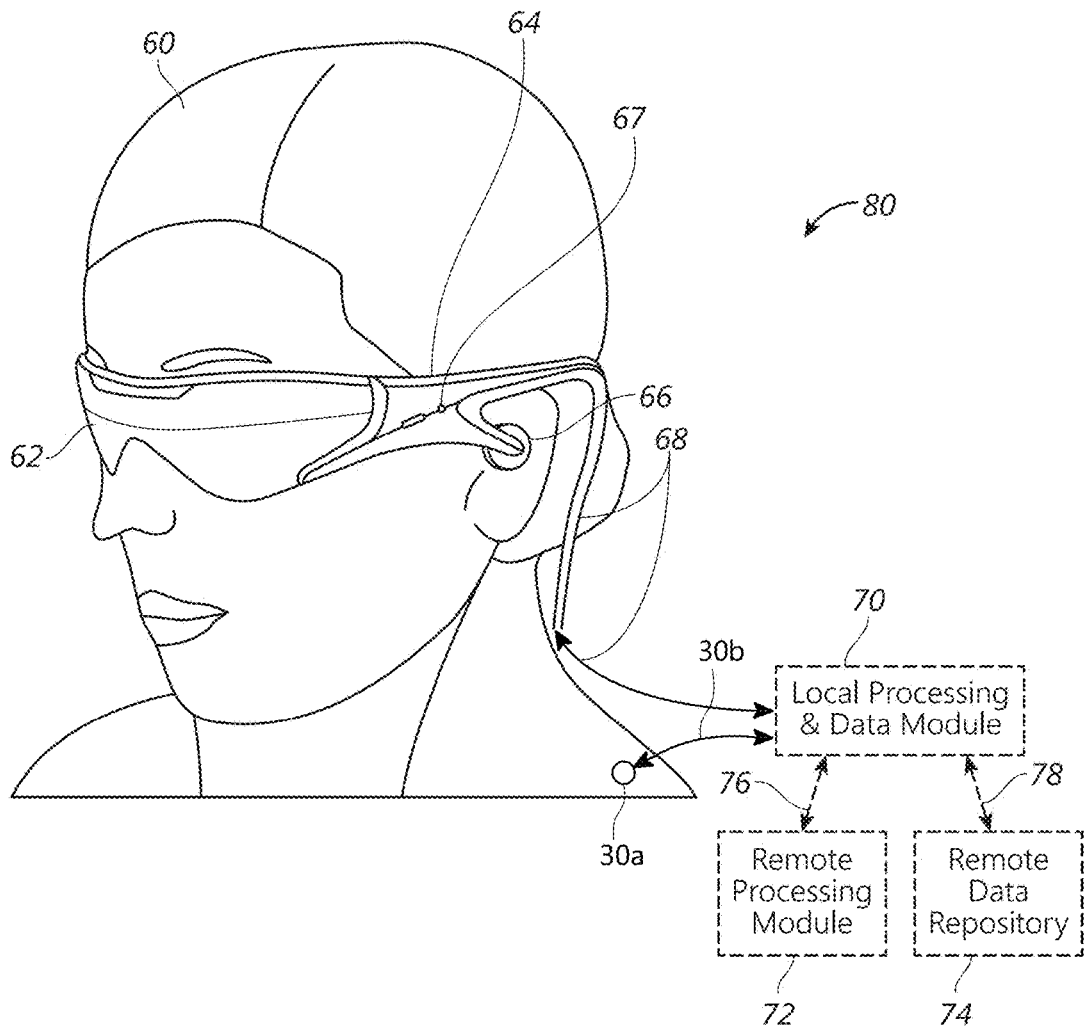
FIG. 2 illustrates an example of wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
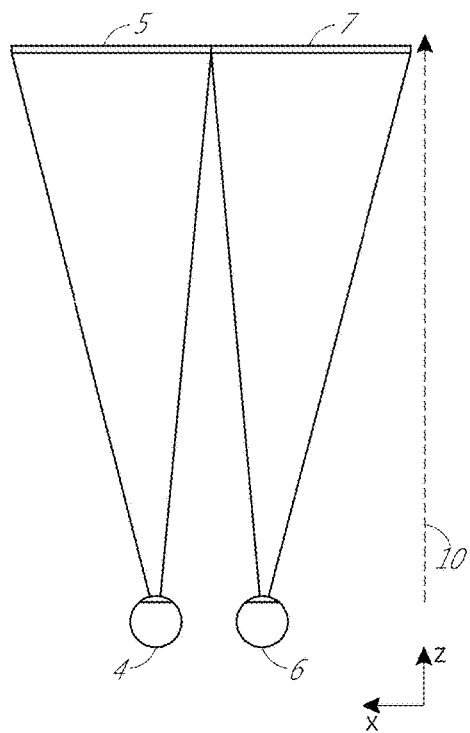
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
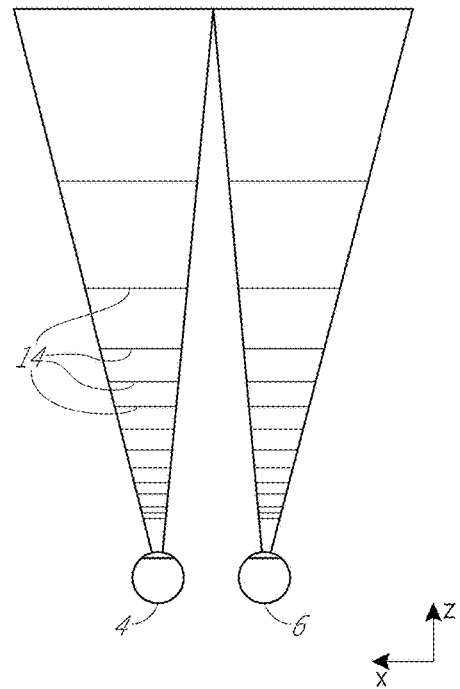
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
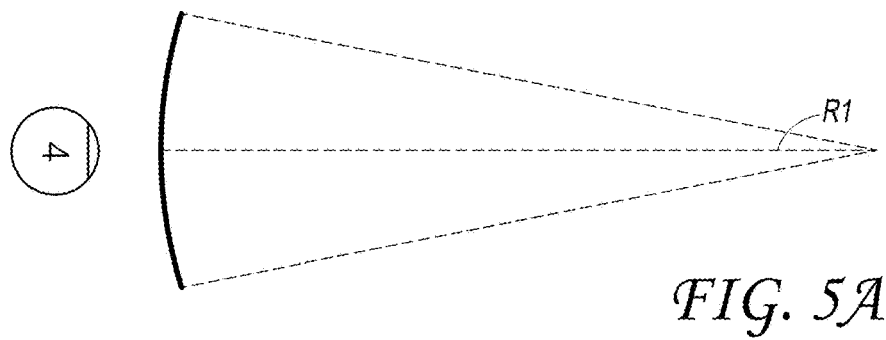
FIGS. 5A-5C illustrate relationships between radius of curvature and focal radius.
Figure 5B:
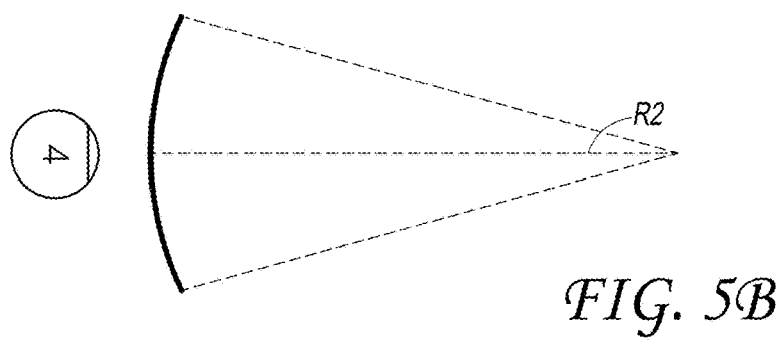
Figure 5C:
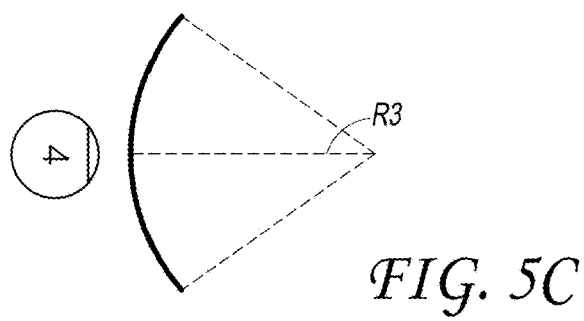

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
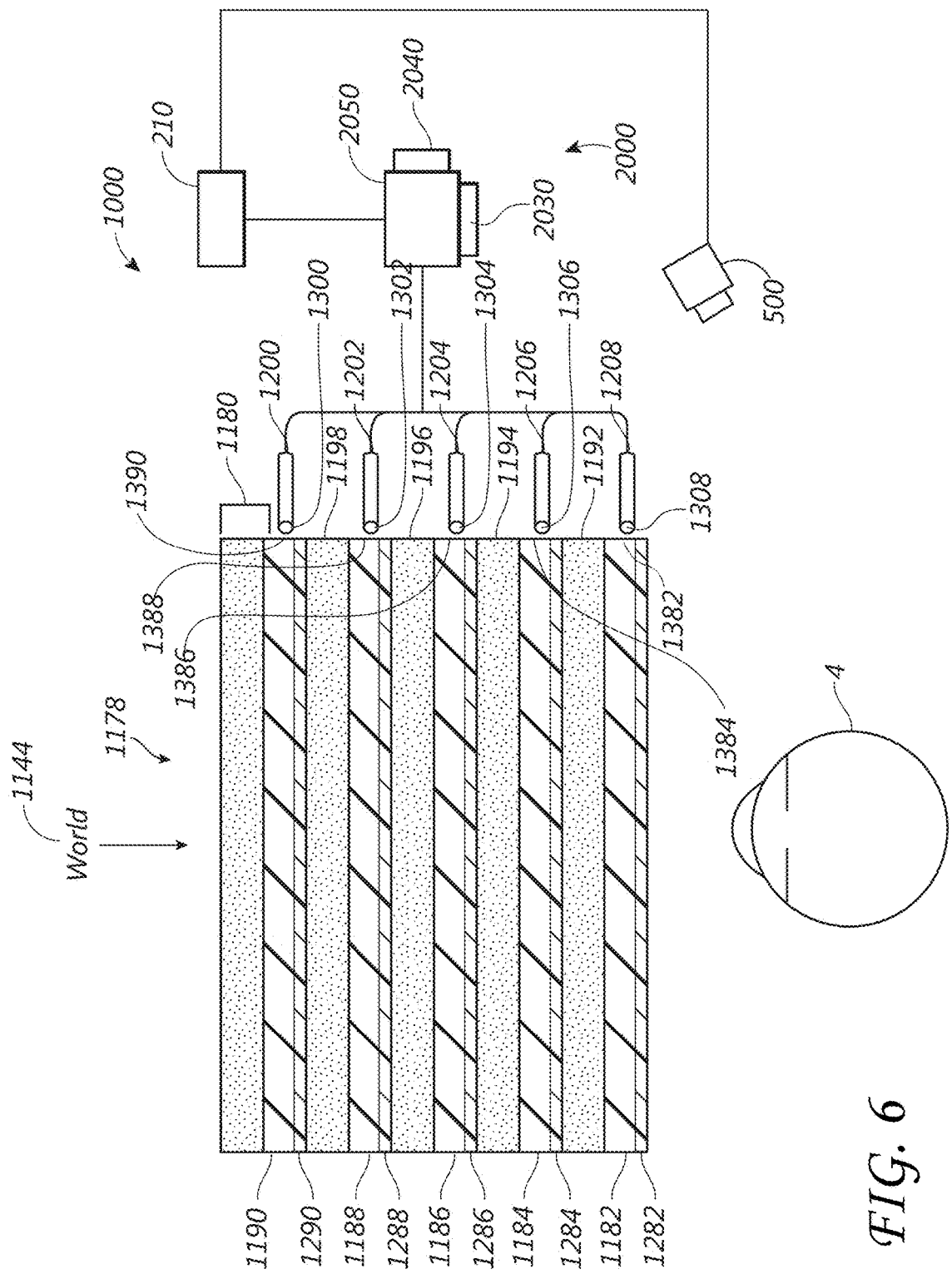
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310. Examples of spatial light modulators include liquid crystal displays (LCD) including a liquid crystal on silicon (LCOS) displays.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
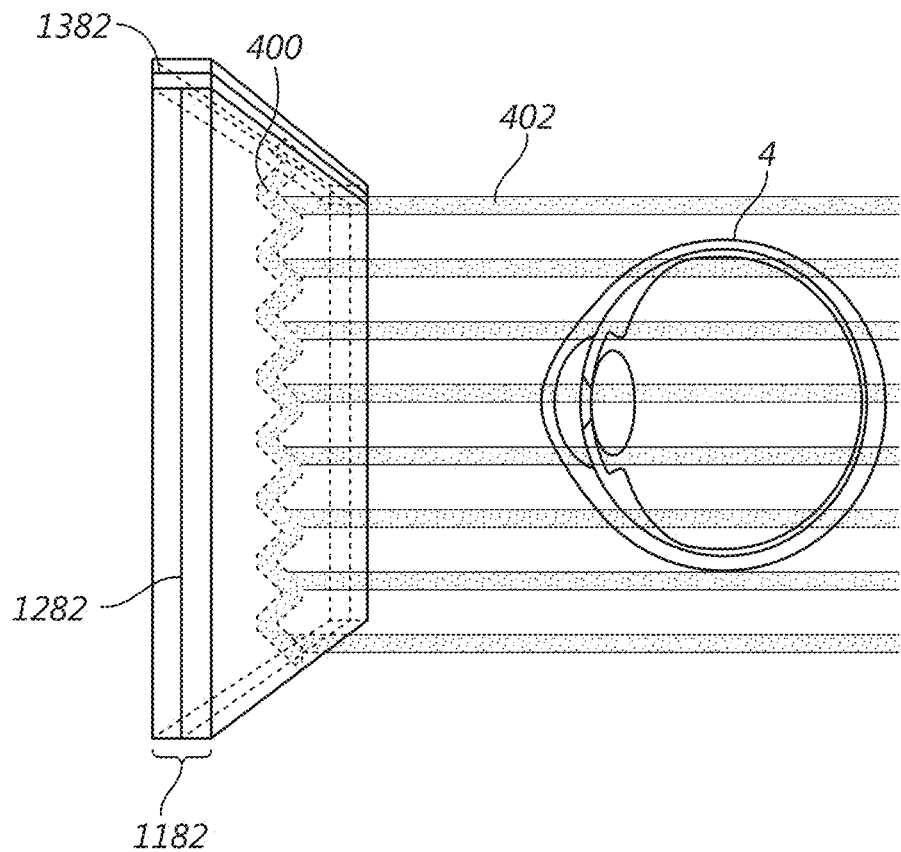
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
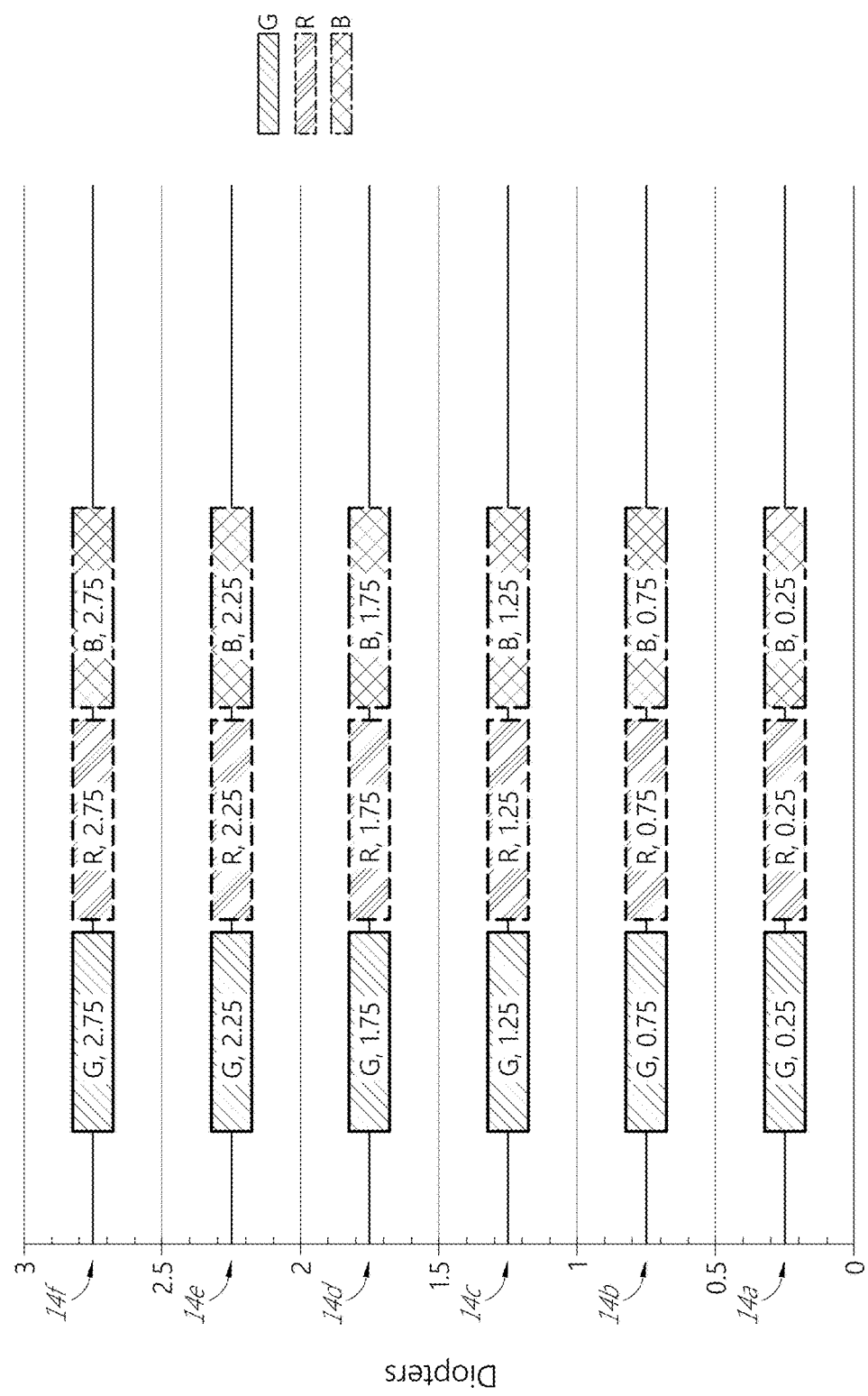
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
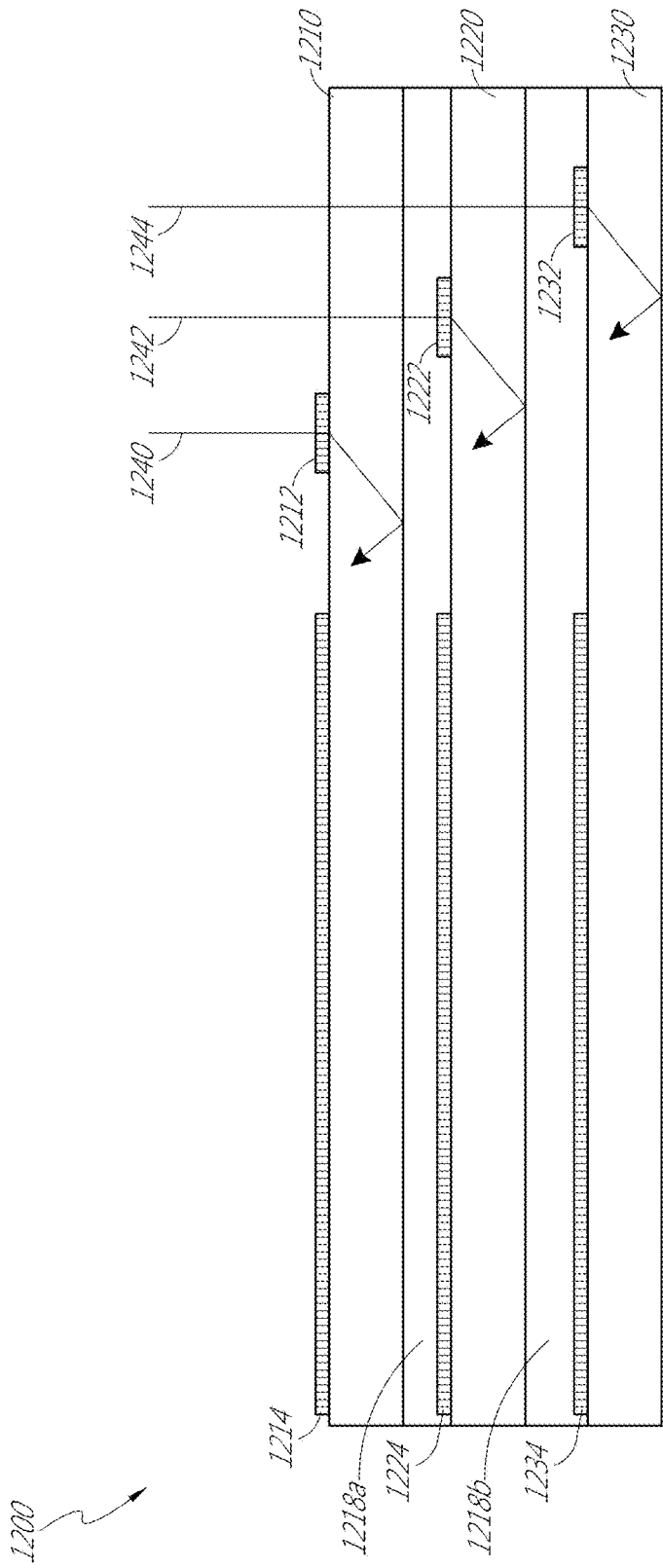
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 1242 and 1244, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
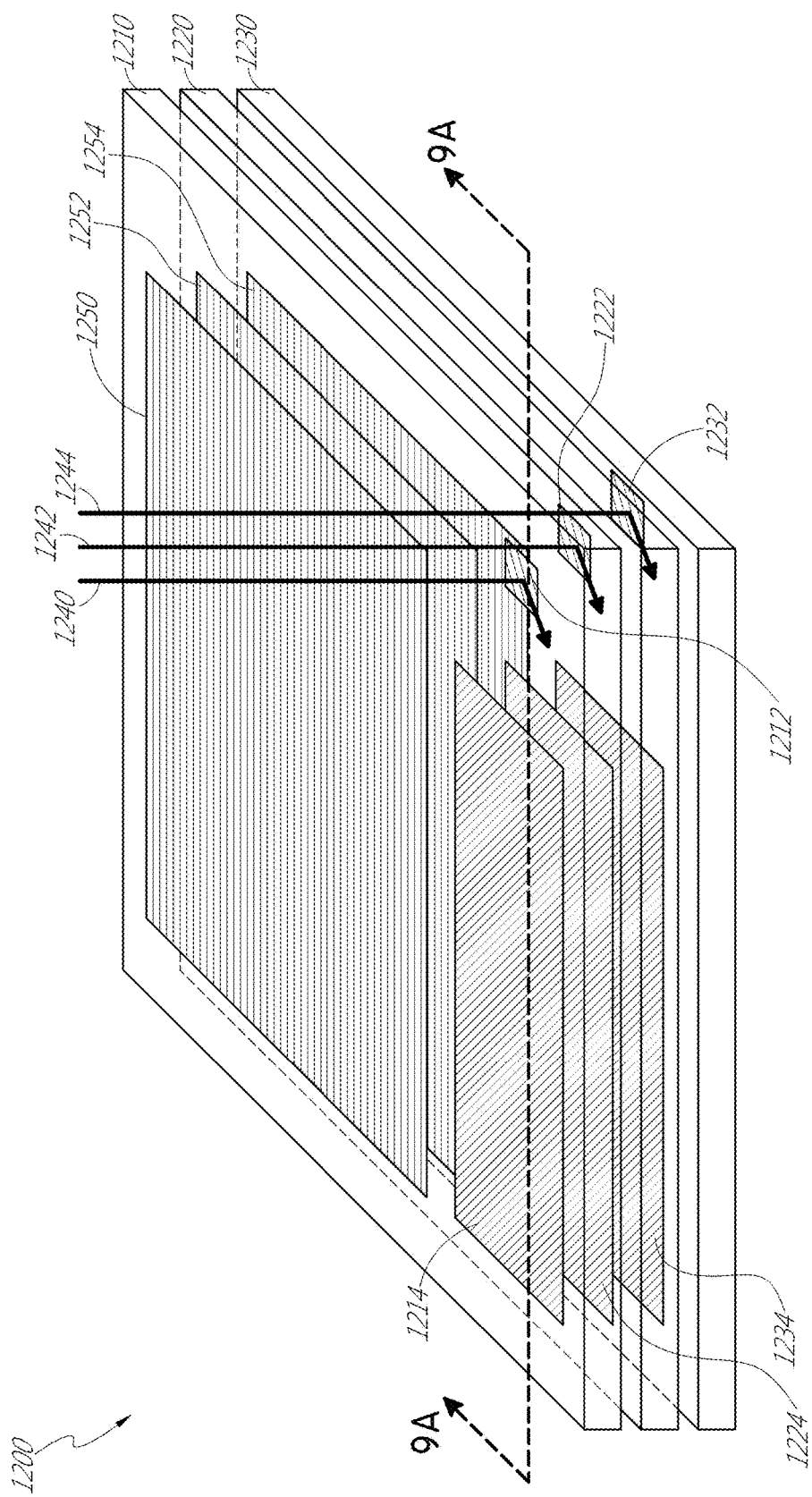
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
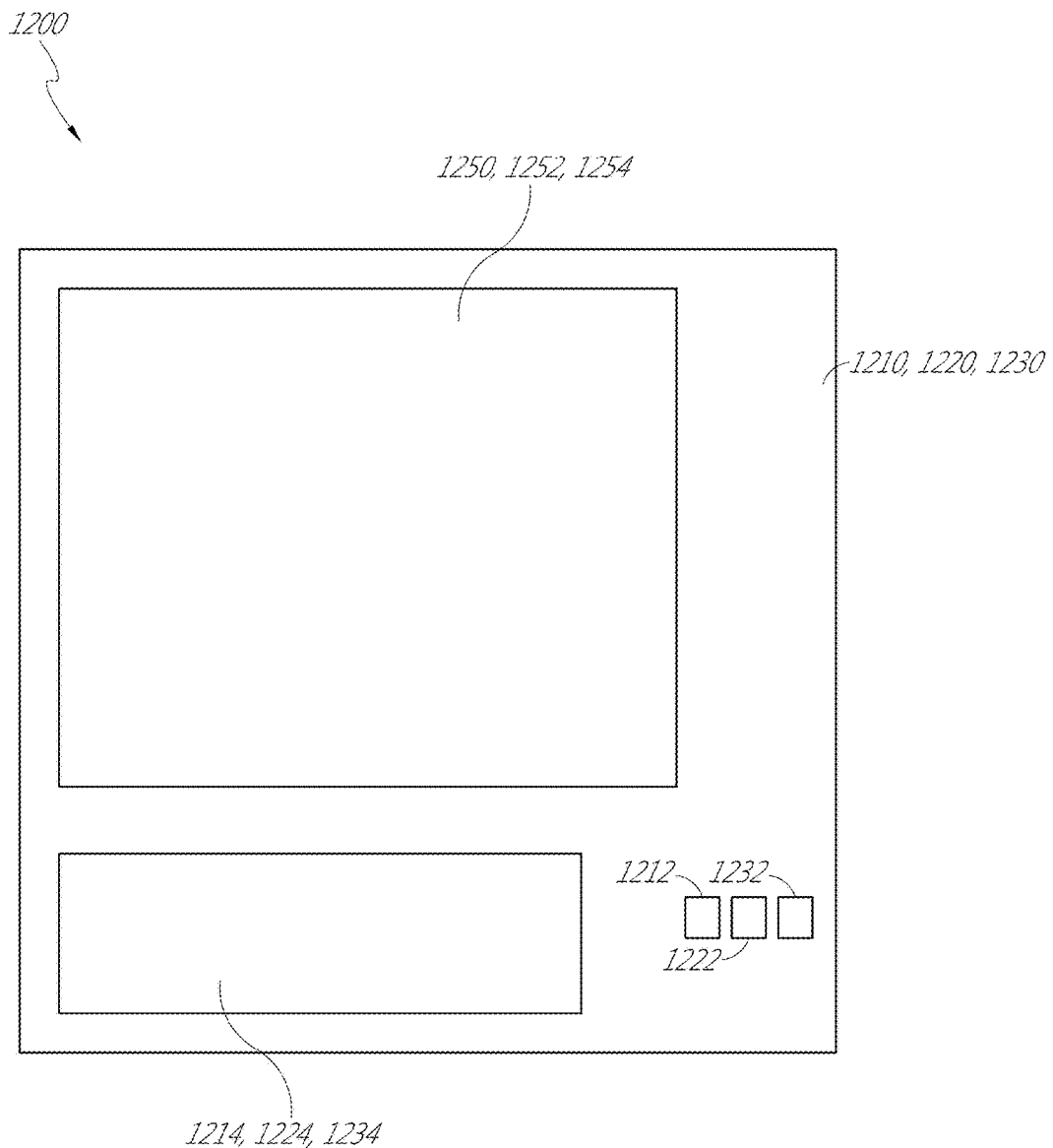
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Metasurfaces and Optical Elements Based on Metasurfaces

Display systems may employ various optical elements for controlling the propagation of light. However, in some contexts, such as display systems including a head-mounted display device (e.g., the display system 80 described supra with reference to FIG. 2), conventional optical elements may not be desirable or suitable, owing to their relatively heavy weight, large size, manufacturing challenges, and/or deficiencies in optical properties such as diffraction angles and diffraction efficiency.

For example, as described above with reference to FIGS. 9A-9C, display systems according to various embodiments may include optical elements (e.g., incoupling optical elements, light distributing elements and outcoupling optical elements), which may include diffraction gratings. Furthermore, as further described above with reference to FIGS. 9A-9C, light that is coupled into a corresponding waveguide preferably propagates within the waveguide by total internal reflection (TIR). To achieve TIR, it may be desirable for the diffraction grating to have relatively high diffraction angles relative to a surface normal. In addition, high diffraction efficiencies are desirable to provide good light intensity and image brightness. However, diffraction gratings capable of achieving high diffraction angles and high diffraction efficiencies for visible light remain a challenge. To address these and other needs, embodiments of optical elements disclosed herein, e.g., diffraction gratings, utilize metasurfaces.

Metasurfaces may include surface structures that can locally modify the polarization, phase and/or amplitude of light in reflection or transmission. The metasurfaces may include an array of subwavelength-sized and/or subwavelength-spaced phase shift elements whose patterns are configured to control the wavefront of light, such that various optical functionalities can be derived therefrom, including beam shaping, lensing, beam bending, and polarization splitting. The factors that can be used to manipulate the wavefront of the light include the material, size, geometry and orientation of the surface structures. By arranging the surface structures with distinct scattering properties on a surface, space-variant metasurfaces can be generated, throughout which optical wavefronts can be substantially manipulated.

Figure 10A:
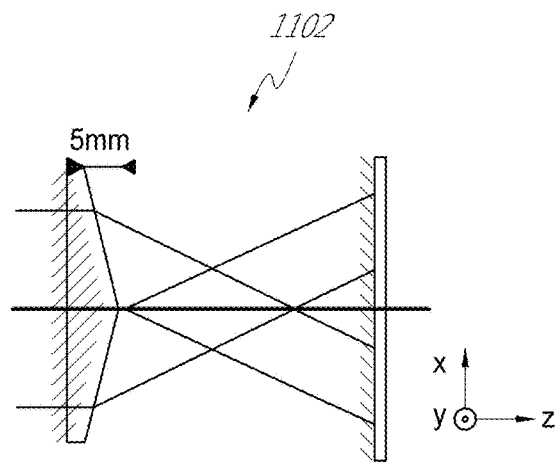
FIG. 10A schematically illustrates a cross-sectional view of an axicon as an example of a conventional optical element.
Figure 10B:
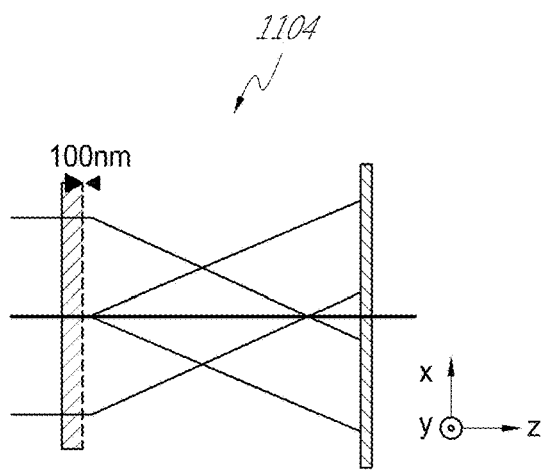
FIG. 10B schematically illustrates a cross-sectional view of a metasurface-based axicon as an example of an optical element formed of a metasurface.
Figure 10C:
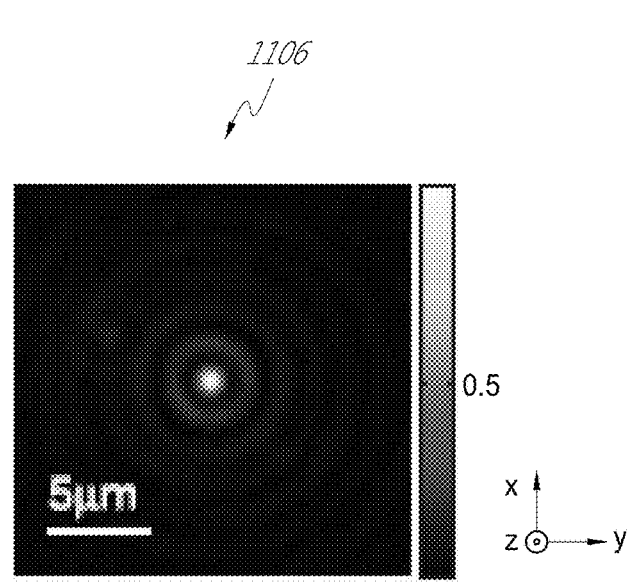
FIG. 10C illustrates the transmitted beam profile resulting when the metasurface-based axicon of FIG. 10B is illuminated with a collimated Gaussian left circularly polarized (LCP) light beam.

In conventional optical elements such as lenses and waveplates, the wavefront is controlled via propagation phases in a medium much thicker than the wavelength. Unlike conventional optical elements, metasurfaces instead induce phase changes in light using subwavelength-sized resonators as phase shift elements. Because metasurfaces are formed of features that are relatively thin and uniform in thickness, they can be patterned across a surface using thin film processing techniques such as semiconductor processing techniques, as well as direct-printing techniques such as nanoimprint techniques. One example of replacing a conventional optical element with a metasurface is illustrated with reference to FIGS. 10A-10C. FIG. 10A schematically illustrates a cross-sectional view of a conventional optical element, e.g., a glass axicon 1102. As illustrated, a typical conventional optical element such as a glass axicon formed of, e.g. a glass lens, can be a few millimeters in thickness. In contrast, FIG. 10B schematically illustrates a cross-sectional view of an optical element, e.g., a metasurface axicon 1104, which may be formed of a metal or semiconductor metasurface and disposed on a substrate, e.g., a quartz substrate. Compared to the conventional axicon 1102, the metasurface axicon 1104 can be about tens to hundreds of nanometers thick, making them suitable for optical systems requiring compact optical elements, such as a head-mounted display device. FIG. 10C illustrates the transmitted, nondiffracting Bessel beam profile 1106 that results when the metasurface axicon 1104 is illuminated with a collimated Gaussian left circularly polarized (LCP) light beam at a 550-nm wavelength. As illustrated, a desired beam profile 1106 can be achieved using a metasurface axicon that can be orders of magnitude thinner compared to a conventional axicon. Similar results can be obtained for various other optical elements, such as gratings.

Waveplates Based on Geometric Phase Metasurfaces

Without being bound to any theory, when a light beam is taken along a closed cycle in the space of polarization states of light, it may acquire a dynamic phase from the accumulated path lengths as well as from a geometric phase. The dynamic phase acquired from a geometric phase is due to local changes in polarization. Some optical elements based on a geometric phase to form a desired phase front may be referred to as Pancharatnam-Berry phase optical elements (PBOEs). PBOEs may be constructed from wave plate elements for which the orientation of the fast axes depends on the spatial position of the waveplate elements.

Without be limited by theory, by forming a metasurface with half-wave plates formed of geometric phase optical elements, e.g., PBOEs, with their fast axes orientations according to a function θ(x,y), an incident circularly polarized light beam may be fully transformed to a beam of opposite helicity having a geometric phase equal to $\phi_g$(x,y)=+/−2θ(x,y). By controlling the local orientation of the fast axes of the wave plate elements between 0 and π, phase pickups/retardadations may be achieved that cover the full 0-to-2π range, while maintaining relatively high and uniform transmission amplitude across the entire optical element, thereby providing a desired wavefront.

Figure 11A:
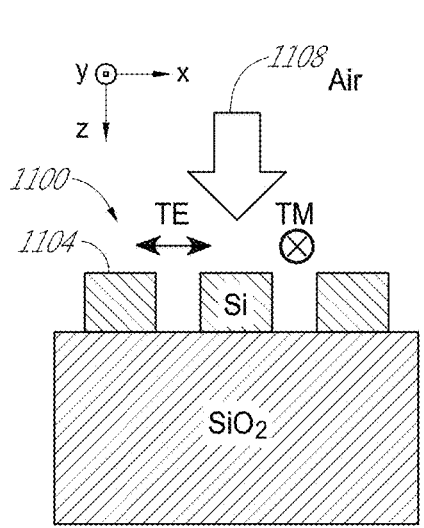
FIG. 11A illustrates an example waveplate formed of a metasurface comprising a plurality of nanobeams, under top-down illumination by incident light having a transverse electric (TE) polarization and an orthogonal transverse magnetic (TM) polarization.

An example of a waveplate based on geometric phase, and the resulting phase pick-up/retardation and absorption, is illustrated with reference to FIGS. 11A-11D. FIG. 11A illustrates an example waveplate 1100 formed of a metasurface comprising a plurality of nanobeams 1104, under top-down illumination by incident light 1108 under a transverse electric (TE) polarization (with the electric field polarized normal to the length of the structure) and an orthogonal transverse magnetic (TM) polarization. The thickness of the resonant structures may be small compared with the freespace wavelength of the incident light 1104. In the illustrated example, the nanobeams 1104 are 120 nm wide in the x-direction and 100 nm thick in the z-direction. In the illustrated example, the nanobeams 1104 are formed of Si, which has been found to support a relatively strong resonance within the wavelength range of interest as described with reference to FIGS. 11B-11D.

Figure 11C:
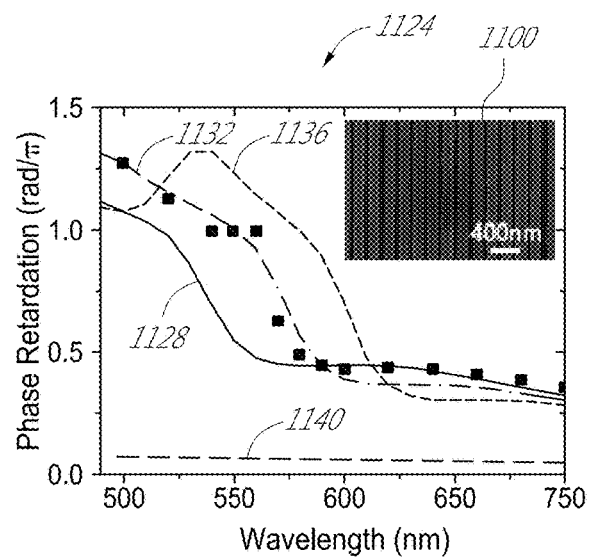
FIG. 11C illustrates simulated phase retardation of a TM-polarized light with respect to a TE-polarized light beam resulting from the example waveplate of FIG. 11A.
Figure 11B:
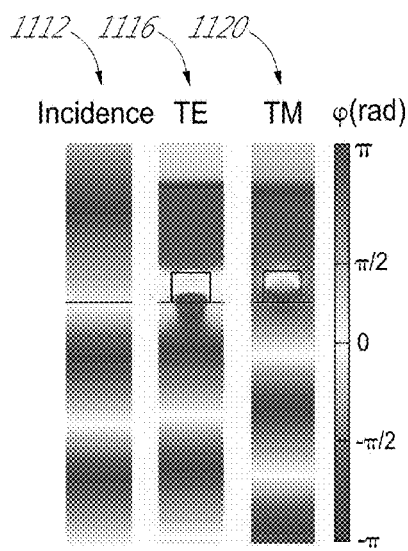
FIG. 11B illustrates simulated phase wavefronts resulting from the example waveplate illustrated with reference to FIG. 11A

FIG. 11B illustrates simulated phase wavefronts resulting from the waveplate 1100 illustrated above with reference to FIG. 11A. Compared to the finite element simulation 1112 of the incident wavefront, the finite element simulation 1116 shows that the wavefront of a TE-polarized light beam at 550 nm is delayed by 0.14π. The simulation 1120 of the wavefront shows that the wavefront of a TM-polarized light is delayed even further, by 1.15π. As a result, the phase retardation between the two orthogonal polarizations is about π, and the beam array serves as a half waveplate.

FIG. 11C illustrates simulated spectra of phase retardation of a TM-polarized light with respect to a TE-polarized light beam resulting from a waveplate similar to that described above with reference to FIG. 11A. By sweeping the wavelength from 490 to 700 nm, the phase retardation of the wave plate varies from about 0.4π to 1.2π. Simulated spectra 1128, 1132 and 1136 illustrate the phase retardation for blazed gratings comprising nanobeam arrays with beam widths of 100 nm, 120 nm, 140 nm, respectively, for a nominal thickness of the nanobeams 1104 of 100 nm. For comparison, the simulate spectrum 1140 shows a comparatively small phase retardation of 0.063π for a 100-nm thick film of calcite, a naturally birefringent crystal. The square symbols illustrate experimental measurement for an array of 120-nm beams, showing good agreement with the simulations. The inset shows an SEM image of an actually fabricated blaze grating 1100.

Figure 11D:
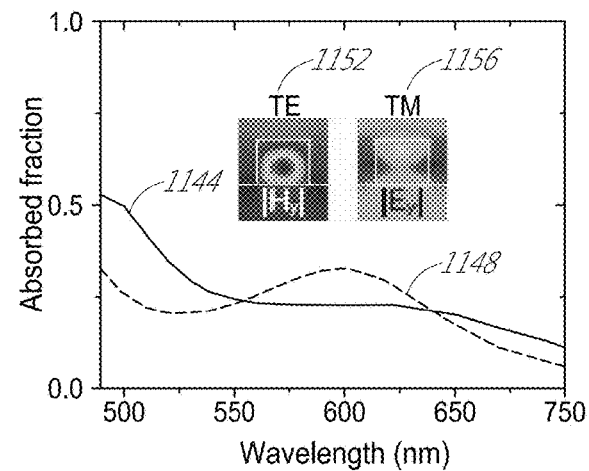
FIG. 11D illustrates simulated absorption spectra of the example waveplate of FIG. 11A, corresponding to the simulated phase retardation illustrated in FIG. 11C.

FIG. 11D illustrates simulated absorption spectra 1144 and 1148 of a waveplate comprising a nanobeam array with a beam width of 120 nm, corresponding to the phase retardation spectrum 1132 of FIG. 11C, under TM and TE illumination, respectively. Insets 1152 and 1156 illustrate magnetic field distribution |Hy| of TE illumination and electrical field distribution |Ey| of TM illumination at a wavelength of 600 nm, respectively.

Referring to FIGS. 11C and 11D, without being bound to any theory, the substantial swing in the phase retardation as illustrated, e.g., by the phase retardation spectrum 1132, may be attributed to a relatively strong resonance under TE illumination, as indicated by the absorption spectrum 1148 and a relatively weak second-order TM resonance, as indicated by the absorption spectrum 1144. The order of the resonance is determined by the number of field maxima inside the nanobeam (FIG. 11D, insets). As illustrated, the array's TE absorption resonance as illustrated by, e.g., absorption spectrum 1148, and the associated swing in the phase retardation as illustrated by, e.g., the phase retardation spectrum 1132, may be spectrally tuned in part by changing feature sizes of the nanobeams 1104, including the width.

In the following, with reference to FIGS. 12A-12H, a construction 1200 of a geometric PB phase based on geometrically rotated waveplate elements is described. In particular, the PB phase configured as a half-wave plate with a phase retardation of π is described. The eight half-waveplate elements may be arranged as being equally spaced and feature a constant orientation-angle difference Δθ between neighboring waveplates. For illustrative purposes, the bottom row schematically depicts the rotation of the polarization vector of an incident light beam with left circular polarization, i.e. a |LCP> state. The middle row illustrates half-wave plate elements constructed from nanobeam arrays similar to those described with reference to FIGS. 11A-11D, with their fast axis oriented at different angles θ relative to the vertical axis. The top row schematically illustrates corresponding polarization vectors of the light behind transmitted through the waveplate elements. Circular polarizations and anti-clockwise orientation angles of fast axis of waveplate are defined from the point of view of the light source.

Still referring to FIGS. 12A-12H, the incident light beam may be described by polarization vectors 1204 and 1208 having equal amplitudes in the x and y directions, respectively, and a phase delay 1212 of π/2 between the polarization vectors. In operation, the half waveplate works by shifting the phase between the two perpendicular polarizations by a phase of π. The net result of this action is to flip the electric field directed along the slow axis and to maintain the electric field along the fast axis. This action may also be viewed as one in which the original polarization vector is flipped to its mirror image with the fast axis serving as the mirror. When considering a helical incident state in which a polarization vector that rotates in time, one may see that the action of the waveplate is to switch helicity from |LCP> to |RCP>, or vice versa.

Referring to the bottom row of FIG. 12A, the electric field of an incident |LCP> beam is directed upward in the positive y axis at an initial time t=$t_0$, as indicated by the vector 1204. A quarter of an optical cycle later (i.e., π/2), the light is directed along the negative y-direction, as represented by the vector 1208. The action of the waveplate in the middle row of FIG. 12A is to mirror the vectors 1204 and 1208 in a mirror placed in the plane of the fast axis and the propagation direction of the light. The action of this mirror is to flip the vector 1204 to the positive x-direction and to keep the vector 1208 in the original direction. As a result, the |LCP> beam is transformed into a |RCP> beam.

FIGS. 12B-12H illustrate how the polarization vectors of an |LCP> beam changes when the fast axes of the waveplates are rotated by an angle θ of π/4, π/2, 3π/4, π, 5π/4, 3π/2 and 7π/4, respectively. Independent of the rotation angle, a |RCP> output beam is produced. However, the produced phase delay of the vectors 1204 and 1208 with reference to FIG. 12A is given by $\varphi_g$=2θ. For example, when θ=π/2 as shown in FIG. 12E, the action of the waveplate it to keep the vector 1204 in the same direction while flipping the vector 1208 from the negative y-direction into the positive y-direction. This produces a |RCP> beam that is delayed by $\varphi_g$=2θ=π for incident light of LCP. As such, for the illustrated half waveplate, it will take half an optical cycle longer before the state shown in FIG. 12A is reached.

Thus, as an illustrative example, after passing through the eight half-waveplate elements that are equally spaced and feature a constant orientation-angle difference, e.g., Δθ=π/8 between neighbors, the transmitted RCP waves display a constant phase difference $\Delta\varphi_g$=π/4 between neighboring waveplates. By using eight waveplate elements with fast-axes orientation varying between 0 and π, phase retardations/pickups may be achieved that covers the full 0-2π range. However, fabricating half-wave plate elements having a high diffraction angle for visible light may be challenging. This is because the diffraction angle depends, among other things, on the length of a period of periodically repeating waveplate elements, and forming the relatively high number of half-waveplate elements within a relatively small length of the period may be difficult due to spatial constraints. In the following, embodiments of diffraction grating in which phase retardations/pickups may be achieved that covers the full 0-2π range at relatively high diffraction angles and diffraction efficiencies, as well as uniformity of diffraction efficiencies across a relatively wide angle of incidence.

Diffraction Gratings Based on Geometric Phase Metasurfaces

Applications of the metasurfaces comprising PBOEs include diffraction gratings, e.g., blazed gratings, focusing lenses, and axicons, among various other applications. As described herein, a blazed grating is capable of steering a light beam into several diffracted orders. The blazed grating may be configured to achieve high grating efficiency in one or more diffraction orders, e.g., +1 and/or −1 diffraction orders, thus resulting in the optical power being concentrated in the desired diffraction order(s) while the residual power in the other orders (e.g., the zeroth) is low. In the present disclosure, various embodiments of metasurfaces comprising PBOEs configured as diffraction gratings are described. The diffraction gratings according to various embodiments have a combination of desirable optical properties, including one or more of high diffraction angle, high diffraction efficiency, a wide range of acceptance angle and a highly uniform diffraction efficiency within the range of acceptance angle. These desirable optical properties may result from a combination of various inventive aspects, including the material, dimensions and geometric configurations of the elements of the metasurfaces.

As described herein, visible light may include light having one or more wavelengths in various color ranges, including red, green, or blue color ranges. As described herein, red light may include light of one or more wavelengths in the range of about 620-780 nm, green light may include light of one or more wavelengths in the range of about 492-577 nm, and blue light may include light of one or more wavelengths in the range of about 435-493 nm. Thus, visible may include light of one or more wavelengths in the range of about 435 nm-780 nm.

As described herein, features, e.g., as nanobeams, lines, line segments or unit cells, that are parallel, nominally parallel or substantially parallel, refer to features having elongation directions that differ by less than about 10%, less than about 5% or less than about 3% in the elongation directions. In addition, features that are perpendicular, nominally perpendicular or substantially perpendicular refer to features having elongation directions that deviate from 90 degrees in the elongation directions by less than about 10%, less than about 5% or less than about 3%.

As described herein, structures configured to diffract light, such as diffraction gratings, may diffract light in a transmission mode and/or reflection mode. As described herein, structures that are configured to diffract light in transmission mode refer to structures in which the intensity of diffracted light on the opposite side of the structures as the light-incident side is greater, e.g., at least 10% greater, 20% greater or 30% greater, compared to the intensity of diffracted light on the same side of the structures as the light-incident side. Conversely, structures that are configured to diffract light in reflection mode refer to structures in which the intensity of diffracted light on the same side of the structures as the light-incident side is greater, e.g., at least 10% greater, 20% greater or 30% greater, compared to the intensity of diffracted light on the opposite side of the structures as the light-incident side.

As described herein, a line, also referred to as a beam or nanobeam, is an elongated structure having a volume. It will be appreciated that the lines are not limited to any particular cross-sectional shape. In some embodiments, the cross-sectional shape is rectangular.

FIGS. 13A and 13B illustrate a cross-sectional side view and a top-down view, respectively, of a diffraction grating 1300 comprising a metasurface having geometric phase optical elements, according to some embodiments. The diffraction grating 1300 comprises a 2-level geometric phase metasurface. The cross-sectional side view illustrated with reference to FIG. 13A is that of a cross-section AA' illustrated in FIG. 13B. The diffraction grating 1300 includes a substrate 1304 having a surface on which a metasurface 1308 configured to diffract light having a wavelength in the visible spectrum is formed. The metasurface 1308 includes one or more first lines or nanobeams 1312 having a first orientation and extending generally in a first lateral direction (e.g., the y-direction) and a plurality of second lines or nanobeams 1316 having a second orientation extending generally in a second direction (e.g., the x-direction). The first lines or nanobeams 1312 may be considered to form a first set of nanobeams and the second lines or nanobeams 1316 may be considered to form a second set of nanobeams. The one or more first lines 1312 and the second lines 1316 are disposed adjacent to one another in the second direction, and the first lines 1312 and the second lines 1316 alternatingly repeat in the second direction at a period less than the wavelength of light which the metasurface is configured to diffract.

Preferably, the first lines 1312 each have the same width. In some embodiments, the second lines 1316 are laterally stacked in the y-direction between adjacent pairs of the one or more first lines 1312. Without be limited by theory, the one or more first lines 1312 and the second lines 1316 are oriented at an angle relative to each other to preferably cause a phase difference between the visible light diffracted by the one or more first lines 1312 and the visible light diffracted by the second lines 1316, where the phase difference between the visible light diffracted by the one or more first lines 1312 and the visible light diffracted by the second lines 1316 is twice the angle.

In some embodiments, similar to the combination of wave plates illustrated above with reference to FIGS. 12A-12H, the phase difference caused by the relative orientations of one or more first lines 1312 relative to the second lines 1316, which may vary between 0 and it, phase pickups/retardations may be achieved that covers the full 0-2π range. In some embodiments, when the one of the one or more first lines 1312 and the second lines 1316 are rotated by it relative to the other, e.g., perpendicular to each other, a phase pickup/retardation of 2π may be achieved between the one or more first lines 1312 and the second lines 1316. That is, unlike FIGS. 12A-12H, phase pickups/retardations covering the full 0-2π range may be achieved based on the 2-level geometric phase metasurface having lines oriented in just two different directions, according to some embodiments. Advantageously, unlike FIGS. 12A-12H, the combination of wave plates illustrated with reference to FIGS. 12A-12H, the foot print occupied by the illustrated metasurface 1308 is more compact, and has a period less than or equal to a wavelength in the visible spectrum, which in turn enables a relatively high diffraction angle θ of the diffracted beams 1338, 1342.

The first lines 1312 and the second lines 1316 are formed of an optically transmissive material. As described herein and throughout the specification, a "transmissive" or "transparent" structure, e.g., a transmissive substrate, may allow at least some, e.g., at least 20, 30, 50, 70 or 90%, of an incident light, to pass therethrough. Accordingly, a transparent substrate may be a glass, sapphire or a polymeric substrate in some embodiments. A "reflective" structure, e.g., a reflective substrate, may reflect at least some, e.g., at least 20, 30, 50, 70, 90% or more of the incident light, to reflect therefrom.

The one or more first lines 1312 and the second lines 1316 may be described as being protrusions, ridges creases or nanowires that protrude out of the page, extend along the page, and having a width. Additionally or alternatively, regions of separation between adjacent first lines 1312 and/or between adjacent second lines 1316 may be described as being depressions, troughs, recesses or trenches that recess into the page and having a spacing. In some embodiments, the first lines 1312 and the second lines 1316 are elongated rectangular structures having a substantially rectangular cross-sectional shape in the y-z plane. However, other embodiments are possible, where the first lines 1312 and the second lines 1316 have cross sectional shape may take on a shape of a circle, an ellipse, a triangle, a parallelogram, a rhombus, a trapezoid, a pentagon or any suitable shape.

In the following, various configurations including dimensions and geometric arrangements of the one or more first lines 1312 and the second lines 1316 are described, whose combined effect is to produce the grating based on geometric phase optical elements with desirable optical properties described herein, including one or more of a relatively high diffraction angle, a relatively high diffraction efficiency, a relatively wide range of acceptance angle and a relatively uniform efficiency within the range of acceptance angle.

Still referring to FIGS. 13A and 13B, in operation, when an incident light beam 1330, e.g., visible light, is incident on the metasurface 1308 at an angle of incidence α measured relative to a plane normal to the surface 1304S and extending in a direction parallel to the first lines 1312, e.g., the y-z plane, the grating 1300 partially transmits the incident light as a transmitted light beam 1334 and partially diffracts the incident light as a diffracted light beam of +1 order 1342 at a diffraction angle $\theta_1$ and a diffracted light beam of −1 order 1338 at a diffraction angle $\theta_2$, where the diffraction angles are measured relative to the same plane for measuring α, e.g., the y-z plan. When one or both of the diffracted light beams 1338 and 1342 are diffracted at a diffraction angle that exceeds a critical angle $\theta_{TIR}$ for occurrence of total internal reflection in the substrate 1304 configured as a waveguide, the diffracted light beams 1338 and 1342 propagate in their respective opposite directions along the x-axis under total internal reflection (TIR) until the light beams reach the OPE's/EPE's 1346, which may correspond to the light distributing elements 730, 740, 750 and the outcoupling optical elements 800, 810, 820 (FIG. 9B).

According to various embodiments, the one or more first lines 1312 and the second lines 1316 are formed of a material that provides low Ohmic loss of photons, such that the diffraction efficiency is at a high level. Without being bound to any theory, among other things, Ohmic loss of photons may depend on whether the first lines 1312 and/or the second lines 1316 are formed of a material that is metallic versus semiconducting or insulating. As described herein, whether a material is metallic, semiconducting or insulating may depend on the electronic energy band structure of the material in energy-wave vector space, or E-k space. An electronic energy band structure may be described as having a highest occupied molecular orbital (HOMO), which may also be referred to as a valence band, and a lowest unoccupied molecular orbital (LUMO), which may also be referred to as a conduction band. An insulator has a difference in energy between a HOMO and a LUMO that substantially exceeds the energy corresponding to a wavelength range the metasurface is configured to diffract. A semiconductor has a difference in energy between a HOMO and a LUMO that is substantially comparable to the energy corresponding to the wavelength range the metasurface is configured to diffract. As described herein, a metal has a difference in energy between a HOMO and a LUMO that is zero or negative. As a result, metals have a substantial concentration of free or delocalized electrons. The free or delocalized electrons may collectively interact with light to generate plasmons, which refers to quasiparticles arising quantization of plasma oscillation of free electrons. When at least one of the dimensions, e.g., the width of the first lines 1312 and the second lines 1316, are sufficiently small, e.g., less than the wavelength of incident light, plasmons may become confined to surfaces and interact strongly with light, resulting in surface plasmons. Under some circumstances, when the frequency of incident photons matches the natural frequency of surface electrons oscillating against the restoring force of positive nuclei, surface plasmon resonance (SPR) may occur, resulting in resonant oscillation of conduction electrons.

Without being bound to any theory, when the one or more first lines 1312 and/or the second lines 1316 are formed of a metal, the Ohmic loss of photons may at least partially be caused by plasmon resonance, which may occur at or near SPR wavelengths. Accordingly, in some embodiments, each of the one or more first lines 1312 and the second lines 1316 are formed of a nonmetallic material, e.g., a semiconductor or an insulator, in which the concentration of free electrons are, e.g., less than about $1 \times 10^{19}/cm^3$, less than about $1 \times 10^{18}/cm^3$, less than about $1 \times 10^{17}/cm^3$, or less than about $1 \times 10^{16}/cm^3$, according to some embodiments. However, embodiments are not so limited and, in some embodiments, one or both of the first lines 1312 and the second lines 1316 may be formed of metals.

Still referring to FIGS. 13A, 13B, the inventors have found that, in some embodiments, it may be advantageous to form the first lines 1312 and the second lines 1316 using a semiconductor or an insulator, which may provide low levels of Ohmic loss arising from plasmon generation and correspondingly increased diffraction efficiency. The resulting first lines 1312 and the second lines 1316 imposes a polarization-dependent phase shift on the transmitted light and modifies both its phase and polarization. Without being bound to any theory, when formed of a semiconductor or an insulator, each of the one or more first lines 1312 and the second lines 1316 may be considered as a waveguide operating as a Fabry-Pérot resonator having an effective refractive index and imposing a polarization-dependent phase shift on the transmitted light. To reduce the Ohmic loss arising from plasmon generation and to increase the diffraction efficiency, the one or more first lines 1312 and the second lines 1316 are formed of a material having certain material properties, including relatively low free electron concentration, relatively high bulk refractive index, as discussed herein.

As discussed above, to provide a high diffraction efficiency, in addition to realizing other advantages, it may be desirable to have the first lines 1312 and/or the second lines 1316 be formed of a material having a relatively lower concentration of free electrons. Accordingly, when formed of a semiconductor or an insulator, under various embodiments, each of the first lines 1312 and the second lines 1316 are not intentionally doped with free-electron generating dopants or, when intentionally doped, they are doped with a dopant, e.g., an n-type dopant, at a concentration less than less than about $1 \times 10^{19}/cm^3$, less than about $1 \times 10^{18}/cm^3$, less than about $1 \times 10^{17}/cm^3$, or less than about $1 \times 10^{16}/cm^3$, according to various embodiments. Without being bound to any theory, the relatively low dopant concentration may be advantageous, e.g., in reducing the Ohmic loss arising from plasmon generation and/or surface plasmon resonance, among other advantages.

Without being bound to any theory, when the first lines 1312 and/or the second lines 1316 are formed of a semiconductor or an insulator, while the Ohmic loss arising from plasmonic absorption may be reduced, some Ohmic loss is still believed to occur from optical absorption arising from photon-absorbing electronic transitions, including elastic and inelastic electronic transitions. For example, optical absorption may occur when a photon having energy greater than a band bap between the HOMO and the LUMO of the semiconductor or the insulator is absorbed, resulting in generation of electron-hole pairs. Accordingly, it may be advantageous to reduce optical absorption arising from photo-absorbing electronic transitions. Accordingly, in some embodiments, the first lines 1312 and/or the second lines 1316 may be formed of a material whose absorption coefficient value is less than about $5 \times 10^5/cm$, less than about $1 \times 10^5/cm$, less than $5 \times 10^4/cm$ or less than $1 \times 10^4/cm$, less than about $5 \times 10^3/cm$, less than about $1 \times 10^3/cm$, less than about $5 \times 10^2/cm$, or formed of a material whose absorption coefficient value is within a range defined by any of the above values, for an incident light having a wavelength in the visible spectrum.

Without being bound to any theory, when the first lines 1312 and the second lines 1316 having subwavelength feature sizes support leaky mode resonances they may confine light, thereby causing phase retardation in the scattered light waves produced under TE and TM illumination. It has been found that the effectiveness of confinement of light in the one or more first lines 1312 and the second lines 1316 may arise from being configured as waveguides operating as resonators, and the resulting diffraction efficiency may depend on, among other factors, the refractive index of the material and subwavelength dimensions of the first lines 1312 and the second lines 1316.

Accordingly, in some embodiments, it may be desirable to have the first lines 1312 and/or the second lines 1316 formed of a material having a bulk refractive index ($n_{1\ bulk}$) having a value higher than 2.0, higher than 2.5, higher than 3.0, higher than 3.3, higher than 3.5, or a value that is in a range between any of these values. In some embodiments, the $n_{1\ bulk}$ is measured at a wavelength, e.g., a visible wavelength, that the diffraction grating 1300 is configured to diffract.

The relatively high refractive index, among other advantages, may be achieved by forming the first lines 1312 and/or the second lines 1316 using certain semiconductor materials. In some embodiments, when formed of a semiconductor material, the first lines 1312 and/or the second lines 1316 may be formed of an elemental Group IV material (e.g., Si, Ge, C or Sn) or an alloy formed of Group IV materials (e.g., SiGe, SiGeC, SiC, SiSn, SiSnC, GeSn, etc.); Group III-V compound semiconductor materials (e.g., GaP, GaAs, GaN, InAs, etc.) or an alloy formed of Group III-V materials; Group II-VI semiconductor materials (CdSe, CdS, ZnSe, etc.) or an alloy formed of Group II-VI materials. Each of these materials may be crystalline, polycrystalline or amorphous.

In some embodiments, the first lines 1312 and/or the second lines 1316 are formed of silicon, e.g., silicon, amorphous silicon or polycrystalline silicon. When formed of silicon, it may be more readily fabricated or integrated using silicon-processing technologies.

The relatively high refractive index, among other advantages, may also be achieved by forming the first lines 1312 and/or the second lines 1316 using certain insulators. When formed of an insulator, the one or more first lines 1312 and/or the second lines 1316 may be formed an oxide which includes a transition metal, e.g., titanium, tantalum, hafnium, zirconium, etc., according to some embodiments, including their stoichiometric and substoichiometric forms. Examples of such oxides include e.g., titanium oxide, zirconium oxide, and zinc oxide.

The first lines 1312 and/or the second lines 1316 may also be formed of an oxide, a nitride or an oxynitride of a Group IV element, e.g., silicon, according to some other embodiments, including their stoichiometric and substoichiometric forms. Examples of such an insulator includes, e.g., silicon oxide ($SiO_x$), silicon nitride ($SiN_x$) and silicon oxynitride ($SiO_xN_y$).

In some embodiments, the first lines 1312 and the second lines 1316 may be formed of the same semiconductor or insulator material, which may be advantageous for simplifying fabrication of the metasurface 1308. However, various embodiments are not so limited, and in some embodiments, the first lines 1312 and the second lines 1316 may be formed of different semiconductor or insulating materials.

With continued reference to FIGS. 13A and 13B, in addition to being formed of various materials described above, the one or more first lines 1312 and the second lines 1316 have particular combination of dimensions to serve as subwavelength-sized resonators that induce phase shifts in light.

In various embodiments, each of $W_{nano1}$ of the first lines 1312 and $W_{nano2}$ of the second lines 1316 is smaller than the wavelength of light the metasurface 1308 is configured to diffract, and is preferably smaller than a wavelength in the visible spectrum. In some embodiments, each of $W_{nano1}$ and $W_{nano2}$ is in the range of 10 nm to 1 µm, 10 nm to 500 nm, 10 nm to 300 nm, 10 nm to 100 nm or 10 nm to 50 nm, for instance 30 nm. According to some embodiments, each of the one or more first lines 1312 has the same width $W_{nano1}$. According to some embodiments, each of the second lines 1316 has the same width $W_{nano2}$. According to some embodiments, the one or more first lines 1312 and the second lines 1316 have the same width, i.e., $W_{nano1}=W_{nano2}$. However, in some other embodiments, $W_{nano1}$ and $W_{nano2}$ may be substantially different. Furthermore, in some embodiments, different ones of the one or more first lines 1312 and/different ones of the second lines 1316 may have different widths.

According to some embodiments, immediately adjacent ones of the one or more first lines 1312 in the second direction are separated by a constant spacing $s_1$. In addition, one of the one or more first lines 1312 and one of the second lines 1316 that are immediately adjacent to one another in the second direction are separated by a constant spacing $s_2$. According to some embodiments, one or both of $s_1$ and $s_2$ are smaller than the wavelength the metasurface 1308 is configured to diffract. In addition, the first lines 1312 and the second lines 1316 have heights $h_{nano1}$ and $h_{nano2}$, respectively. A particular combination of the spacings $s_1$, $s_2$ and the heights $h_{nano1}$ and $h_{nano2}$ may be chosen such that a desired range ($\Delta\alpha$) of angle of incidence $\alpha$, sometimes referred to as a range of angle of acceptance or a field-of-view (FOV), is obtained. As described herein. The desired range $\Delta\alpha$ may be described by a range of angles spanning negative and positive values of a, outside of which the diffraction efficiency falls off by more than 10%, 25%, more than 50%, or more than 75%, relative to the diffraction efficiency at $\alpha=0$. Having the $\Delta\alpha$ within which the diffraction efficiency is relatively flat may be desirable, e.g., where uniform intensity of diffracted light is desired within the $\Delta\alpha$. Referring back to FIG. 13A, the incident light beam 1330 is incident on the metasurface 1308 and surface of the waveguide 1304 at an angle $\alpha$ relative to a surface normal, e.g., the y-z plane. According to some embodiments, as described above, the $\Delta\alpha$ is associated with the angular bandwidth for the metasurface 1308, such that the light beam 1330 within the $\Delta\alpha$ is efficiently diffracted by the metasurface 1308 at a diffraction angle $\theta$ with respect to a surface normal (e.g., the y-z plane). In particular, when $\theta$ is or exceeds $\theta_{TIR}$, the diffracted light propagates within the substrate 1304 under total internal reflection (TIR).

It has been found that $\Delta\alpha$ may depend on a shadowing effect created by adjacent ones of one or more first lines 1312 in the second direction and immediately adjacent ones of the second lines 1316 in the first direction. That is, when the incident light beam 1330 is incident at an angle of incidence $\alpha$ that is greater than a certain value, the incident light beam directed towards a feature may be blocked by an immediately adjacent feature. For example, the $\Delta\alpha$ may be associated with the arctangent of $s_1/h_{nano1}$, $s_2/h_{nano1}$ and/or $s_2/h_{nano1}$. In various embodiments, the ratios $s_1/h_{nano1}$, $s_2/h_{nano1}$ and/or $s_2/h_{nano1}$ are selected such that $\Delta\alpha$ exceeds 20 degrees (e.g., +/−10 degrees), 30 degrees (e.g., +/−15 degrees), 40 degrees (e.g., +/−20 degrees) or 50 degrees (e.g., +/−25 degrees), or is within a range of angles defined by any of these values. The desired ratios $s_1/h_{nano1}$, $s_2/h_{nano1}$ and/or $s_2/h_{nano1}$ may be realized where, e.g., each of $s_1$ and $s_2$ is in the range of 10 nm to 1 µm, 10 nm to 300 nm, 10 nm to 100 nm or 10 nm to 50 nm, for instance 30 nm. Of course, relatively lower values of $s_1$ and $s_2$ may be realized by where $h_{nano1}$ and $h_{nano2}$ have correspondingly relatively lower values.

Advantageously, the relatively high refractive index ($n_1$) of the material of the one or more first lines 1312 and/or the second lines 1316 according to some embodiments allow for a relatively small thickness or height. Accordingly, in various embodiments, the first lines 1312 and the second lines 1316 have $h_{nano1}$ and $h_{nano2}$, which may be in the range of 10 nm to 1 µm, 10 nm to 500 nm, 10 nm to 300 nm, 10 nm to 100 nm and 10 nm to 50 nm, for instance 107 nm, according to some embodiments, depending on the $n_1$. For example, the $h_{nano1}$ and $h_{nano2}$ may be 10 nm to 450 nm where $n_1$ is more than 3.3, and 10 nm to 1 µm where $n_1$ is 3.3 or less. As another example, the height the first lines 1312 and the second lines 1316 may be 10 nm to 450 nm where the nanobeams are formed of silicon (e.g., amorphous or polysilicon).

According to various embodiments, the combination of $s_1$ and $W_{nano1}$ may be selected such that a pitch ($p_{nano1}$) of the one or more first lines 1312, defined as a sum of and $W_{nano1}$, has a value obtained by a sum of $W_{nano1}$ selected from ranges of 10 nm to 1 µm, 10 nm to 500 nm, 10 nm to 300 nm, 10 nm to 100 nm or 10 nm to 50 nm, and $s_1$ selected from ranges of 10 nm to 1 µm, 10 nm to 300 nm, 10 nm to 100 nm or 10 nm to 50 nm, for instance $p_{nano1}=95.5$ nm.

Of course, relatively small values of $s_1$ and $s_2$ may be realized and $h_{nano1}$ and $h_{nano2}$ have correspondingly relatively small values. Advantageously, using a material with relatively high refractive index $n_1$ to form the one or more first lines 1312 and/or the second lines 1316, relatively small values of $s_1$, $s_2$, $h_{nano1}$ and $h_{nano2}$ may be obtained. This is because, as the inventors have found, the $h_{nano1}$ and $h_{nano2}$ may be inversely proportional to the bulk refractive index of the material forming the first lines 1312 and the second lines 1316. Accordingly, for a material having bulk refractive index of 2.0-2.5, 2.5-3.0, 3.0-3.5 and higher than 3.5, the $h_{nano1}$ and $h_{nano2}$ may be in the range of 500 nm to 1 µm, 300 nm to 500 nm, 100 nm to 300 nm and 10 nm to 100 nm, respectively, in various embodiments.

Thus, by the particular combination of a material having a high bulk refractive index $n_1$ of the one or more first lines 1312 and the second lines 1316 and the corresponding dimensions $s_1$, $s_2$, $h_{nano1}$ and $h_{nano2}$, the overall pitch $\Lambda_a$ may also be correspondingly decreased, which in turn increases the diffraction angle $\theta$, as described further below.

Preferably, the $h_{nano1}$ and $h_{nano2}$ are substantially equal, which may be advantageous for fabrication. However, embodiments are not so limited and the $h_{nano1}$ and $h_{nano2}$ may be substantially different.

In various embodiments, the first lines 1312 and/or the second lines 1316 are formed of a material whose bulk refractive index ($n_{1\ bulk}$) is higher than the refractive index $n_2$ of the substrate 1304; i.e., $n_{1\ bulk} > n_2$. In some embodiments, the substrate 1304 may be configured as a waveguide, and may correspond to the waveguides 310, 300, 290, 280, 270 (FIG. 6) and/or waveguides 670, 680, and 690 (FIG. 9A). In such applications, the substrate preferably has a refractive index that is between that of air but less than $n_{1\ bulk}$, e.g., 1.5, 1.6, 1.7, 1.8, 1.9, or higher but less than $n_{1\ bulk}$, which may provide benefits for increasing the $\Delta\alpha$ of a display that forms an image by outputting light from that substrate 1316. Examples of materials for forming the substrate 1304 include silica glass (e.g., doped silica glass), silicon oxynitride, transition metal oxides (e.g., hafnium oxide, tantalum oxide, zirconium oxide, niobium oxide, lithium niobate, aluminum oxide (e.g., sapphire)), plastic, a polymer, or other optically transmissive material having, e.g., a suitable refractive index as described herein.

Without being bound to any theory, when the one or more first lines 1312 and/or the second lines 1316 have subwavelength dimensions as described above, the refractive indices of the first lines 1312 and/or the second lines 1316a may deviate from their bulk refractive index value, i.e., $n_{1\ bulk}$. For instance, for a fundamental mode of resonance, the first lines 1312 and/or the second lines 1316 may have an effective index of refraction, $n_{1\ eff}$, which may vary from about 1 (when the light is mostly in air) to about $n_{1\ bulk}$ (when the light is mostly in the lines and/or segments). Thus, in some embodiments, it is desirable to satisfy the condition that $n_{1\ eff} > n_2$ by a sufficient value. Accordingly, in some embodiments, the materials for the first lines 1312 and/or the second lines 1316 and for the substrate 1304 are selected such that a difference ($n_{1\ bulk} - n_2$) between the bulk refractive index $n_{1\ bulk}$ of the material of the first lines 1312 and/or the second lines 1316, and the refractive index $n_2$ of the substrate 1304, is sufficiently large, e.g., 0.5 or higher, 1.0 or higher, 1.5 or higher, 2.0 or higher, 2.5 or higher, or 3.0 or higher.

Still referring to FIGS. 13A and 13B, the metasurface 1308 may be described as forming a plurality of metasurface unit cells 1320 that repeat at least in the x-direction. As described herein, a metasurface unit cell 1320 may be defined as a footprint having the smallest repeating dimension in the x-direction, which includes the one or more first lines 1312 the second lines 1316. As a example, each unit cell 1320 spans a unit cell width 1320a measured from the left vertical side of the left one of the first lines 1312 of one unit cell 1320 to the left vertical side of the left vertical side of the left one of the first lines 1312 of an immediately adjacent unit cell 1320, and thereby includes a pair of first lines 1312 and a column of second lines 1316 stacked in the y-direction in the illustrated embodiments.

As described herein, the lateral dimension of the metasurface unit cells 1320, or the period of repeating units of the unit cells 1320, may be referred to herein as a unit cell pitch $\Lambda_a$. The pitch $\Lambda_a$ repeats at least twice at regular intervals across the waveguide 1304 in the x-direction. In other words, the unit cell pitch $\Lambda_a$ may be the distance between identical points of directly neighboring unit cells 1320. In various embodiments, the $\Lambda_a$ may be smaller than the wavelength the grating 1300 is configured to diffract, and may be smaller than a wavelength, or any wavelength, in the range of about 435 nm-780 nm. In some embodiments configured to diffract at least red light, the $\Lambda_a$ may be less than a wavelength (or any wavelength) in the range of about 620-780 nm. In some other embodiments configured to diffract at least green light, the $\Lambda_a$ may be less than a wavelength (or any wavelength) in the range of about 492-577 nm. In some other embodiments configured to diffract at least blue light, the $\Lambda_a$ may be less than a wavelength (or any wavelength) in the range of about 435-493 nm. Alternatively, according to various embodiments, the $\Lambda_a$ may be in the range of 10 nm to 1 μm, including 10 nm to 500 nm or 300 nm to 500 nm. It will be appreciated that each of the metasurfaces disclosed herein may be utilized to diffract light and may be part of the display system 250 (FIG. 6) and that the display system 1000 may be configured to direct light to the metasurface having a narrow band of wavelengths. Preferably, the $\Lambda_a$ for a given metasurface is less than the smallest wavelength of the band of wavelengths that a light source of the display system is configured to direct to the metasurface.

It has been found that, in some embodiments, the $\Lambda_a$ may have a value that is less than a ratio $m\lambda/(\sin\alpha + n_2 \sin\theta)$, where m is an integer (e.g., 1, 2, 3 . . . ) and $\alpha$, $n_2$ and $\theta$ each have values described elsewhere in the specification. For example, $\alpha$ may be within the range $\Delta\alpha$ exceeding 40 degrees, $n_2$ may be in the range of 1-2, and $\theta$ may be in the range of 40-80 degrees.

In some embodiments, the $\Lambda_a$ may be substantially constant across the surface 1304S of the grating 1300 formed by a plurality of unit cells. However, embodiments are not so limited and in some other embodiments, $\Lambda_a$ may vary across the surface 1304S.

Still referring to FIG. 13B, in some embodiments, each of the second lines 1316 is shorter length than each of the one or more first lines 1312 by at least a factor of two, three, four or more. However, embodiments in which the second lines 1316 are longer than the one or more first lines 1312 are possible. According to various embodiments, the one or more first lines 1312 may have a length $L_1$ in the range of 200 μm-5 mm nm, 200 μm-1 mm or 1 mm-5 mm. According to various embodiments, the second lines 1316 may have a length $L_2$ in the range of 100 nm-500 nm, 100 nm-300 nm and 300 nm-500 nm. In some embodiments, the one or more first lines 1312 may have a length $L_1$ corresponding to a total lateral dimension of the optical element formed by the metasurface, e.g., corresponding to a length of an incoupling or outcoupling optical element formed by the metasurface comprising the lines 1312. In some embodiments, the second lines have a length $L_2$ that is about 40% to about 60% of a unit cell pitch $\Lambda_a$, for instance about 50% of $\Lambda_a$. In some embodiments, $L_1$ is such that the one or more first lines 1312 span a distance in the y-direction corresponding to five second lines 1316. However, it will be understood that the one or more first lines 1312 may span a distance in the y-direction corresponding to any suitable number of second lines 1316 greater than one, e.g., greater than 10, greater than 20, greater than 50 or greater than 100, or in a range between any of 10, 20 and 100, according to various embodiments.

Still referring to FIGS. 13A and 13B, in some embodiments, each of the second lines 1316 have the same length such that the second lines 1316 extend in the x-direction and coterminate without crossing any of the one or more first lines 1312. However, embodiments in which the second lines 1316 have different lengths are possible.

Still referring to the illustrated embodiment of FIG. 13A, the direction of extension (y-direction) of the one or more first lines 1312 is substantially perpendicular to the direction of extension (x-direction) of the second lines 1316. That is, the second lines 1316 are rotated relative to the one or more first lines 1312 by and angle of rotation of $\pi/2$ when viewed a direction of propagation of an incident light (i.e., into the page). However, embodiments are not so limited, and the second lines 1316 may extend in any direction that is rotated in a counterclockwise direction by an angle smaller than $\pi/2$ when viewed a direction of propagation of an incident light (i.e., into the page). For example, the second lines 1316 may be rotated relative the one or more first lines 1312 in a similar manner that the nanobeams of wave plates illustrated in FIGS. 12B-12H are rotated relative to the waveplate illustrated in FIG. 12A. For example, the second lines 1316 may be rotated by relative to the one or more first lines 1312 by an angle of rotation θ of $\pi/4$, $\pi/2$, $3\pi/4$, $\pi$, $5\pi/4$, $3\pi/2$ and $7\pi/4$, respectively. Thus, when an |LCP> beam is incident on the metasurface 1308 having the first and second lines 1312 and 1316, a |RCP> output beam is produced, where the resulting phase delay of the polarization vectors corresponding to TE and TM polarizations may have a value of $\varphi_g=2\theta$, where θ is the angle of rotation changes when the fast axes of the waveplates are rotated by an angle of rotation θ. In particular, for the illustrated embodiment, the second lines 1316 that rotated by $\theta=\pi/2$ relative to the one or more first lines 1312 diffracts an incident light beam, e.g., an |LCP> beam, whereby a diffracted |RCP> beam is generated, where the diffracted beam is delayed by $\varphi_g=2\theta=\pi$ by the second lines 1316. Thus, as the illustrated embodiment, after passing through the metasurface 1308 in which the alternating one or more first lines 1312 and the second lines 1316 in the x-direction have a constant orientation-angle difference of $\Delta\theta=\pi/2$, the transmitted RCP waves display a constant phase difference $\Delta\varphi_g=\pi$ between adjacent ones of the one or more first lines 1312 and the second lines 1316. As a result, by having the fast-axes orientation vary between 0 and π, phase pickups/retardations that covers the full 0-2π range may be achieved, but with a much more compact unit cell pitch and higher diffraction angles compared to the illustrated example in FIGS. 12A-12H.

Display Devices Having Geometric Phase Metasurface-Based Gratings

As disclosed herein, in various embodiments described above, the metasurface 1308 may be implemented as an incoupling optical element (e.g., as one or more of the incoupling optical elements 700, 710, 720 (FIG. 9A)) to incouple incident light such that the light propagates through the substrate 1304 via total internal reflection. However, in recognition that the metasurface 1308 may also be configured to deflect light impinging on it from within the substrate 1304, in some embodiments, the metasurfaces disclosed herein may be applied to form outcoupling optical elements, such as one or more of the outcoupling optical elements 570, 580, 590, 600, 610 (FIG. 6) or 800, 810, 820 (FIG. 9B) instead of, or in addition to, forming an incoupling optical element at different locations on the surface 2000*a*. In some other embodiments, the metasurface 1308 may be utilized as light distributing elements (e.g., OPE's) 730, 740, 750 (FIG. 9B). Where different waveguides have different associated component colors, it will be appreciated that the outcoupling optical elements and/or the incoupling optical elements associated with each waveguide may have a geometric size and/or periodicity specific for the wavelengths or colors of light that the waveguide is configured to propagate. Thus, different waveguides may have metasurfaces with different arrangements of the one or more first lines 1312 and the second lines 1316. In particular, the different arrangements may depend on the wavelength or the color of the incident light beam. For example, depending on the color of the incident light beam, the $\Lambda_a$ may be configured differently according to the wavelength the grating 1300 is configured to diffract. For example, for diffracting at least red light, green light or blue light, the metasurface 1308 may be configured to have a $\Lambda_a$ that is less than wavelengths in the range of about 620-780 nm, less than wavelengths in the range of about 492-577 nm, and less than wavelengths in the range of about 435-493 nm, respectively. To scale the $\Lambda_a$, parameters such as refractive indices, widths, heights and spacings of the one or more first lines 1312 and/or the second lines 1316 may be adjusted proportionally. Alternatively, $\Lambda_a$ may be kept relatively uniform for different wavelengths of the incident light by compensating for one or more of sin α, n2 and sin θ, as described above.

Figure 14:
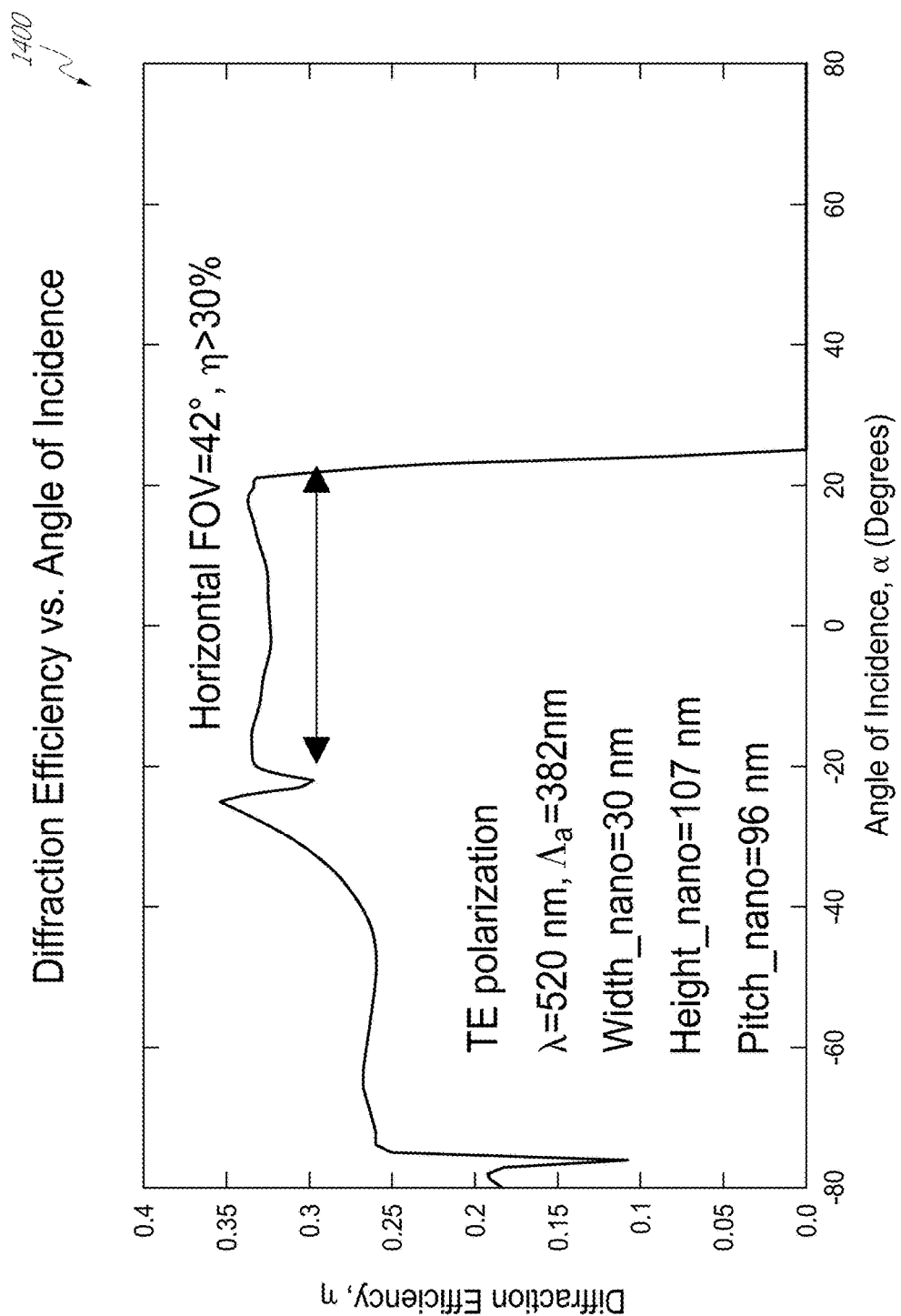
FIG. 14 illustrates a simulated diffraction efficiency versus angle of incidence (α) for an exemplary diffraction grating described with reference to FIGS. 13A and 13B.

FIG. 14 illustrates a simulation 1400 of diffraction efficiency versus angle of incidence α for an exemplary diffraction grating in accordance with various embodiments of the diffraction grating 1300 described above with reference to with reference to FIGS. 13A and 13B. In particular, the simulation 1400 displays the diffraction efficiency (η) of T-1 order diffracted TE polarized green light (λ=520 nm) simulated for a diffraction grating having one or more first lines and second lines formed of polycrystalline silicon on a substrate having $n_2=1.77$, $\Lambda_a=382$ nm, $h_{nano1}=h_{nano2}=107$ nm, $W_{nano1}=W_{nano2}=30$ nm, $p_{nano1}=96$ nm and $s_1=66$ nm, under transmission mode. As illustrated, the range of angle of incidence (Δα), or field of view (FOV), is relatively wide and exceeds about 40 degrees, outside of which the diffraction efficiency η falls off by about 10% from an efficiency of about 32% at α=0.

Figures 15A, 15B:
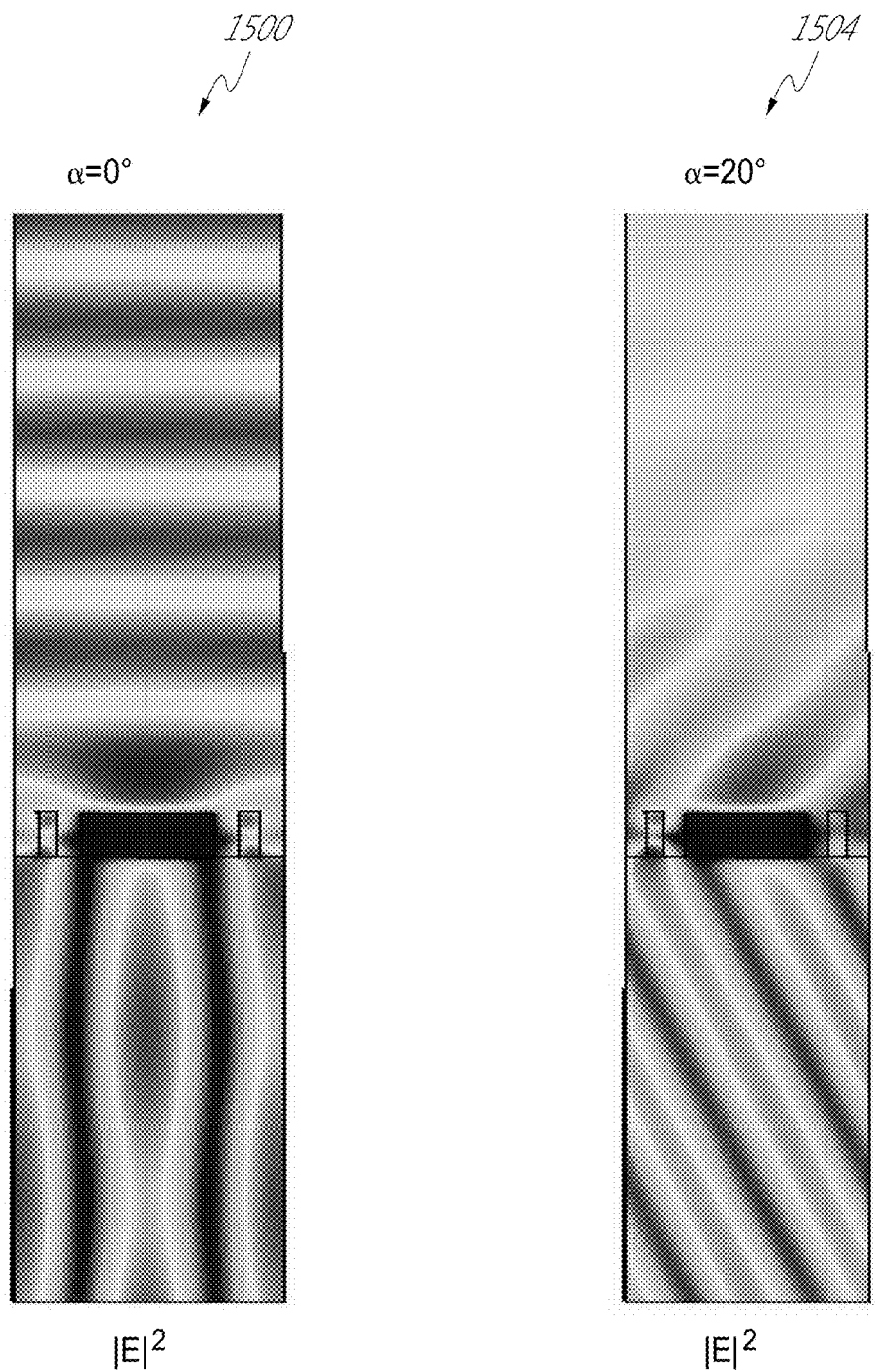
FIGS. 15A and 15B illustrate two-dimensional simulations of phase wavefronts for TE-polarized light upon transmission through the diffraction grating described with reference to FIGS. 13A and 13B.

FIGS. 15A and 15B illustrate 2-dimensional simulations 1500 and 1504 of phase wavefronts for TE polarized, 520 nm wavelength light being transmitted through the diffraction grating 1300 described above with reference to FIGS. 13A and 13B, which corresponds to the simulation 1400 illustrated above with reference to FIG. 14. In particular, the simulations 1500 and 1504 correspond to illumination conditions in which the angle of incidence α is 0 degrees and 20 degrees, respectively.

As described more in detail infra, fabrication of diffraction gratings disclosed herein may involve patterning processes that include photolithography and etch. A photolithography process may include depositing a masking layer, such as a photoresist and/or a hard mask (which may serve as an antireflective coating), on or over a layer of high refractive index material from which the one or more first lines 1312 and the second lines 1316 are formed. Subsequently, the mask layer may be developed and/or patterned first into a pattern of masking layer, which serves as a template for patterning the underlying layer of high refractive index material. Subsequently, using the patterned masking layer as a template, the underlying layer of high refractive index material is patterned into the first and second lines. In various embodiments, the patterned masking layer is removed, thereby leaving the first and second lines. However, under some circumstances, it may be difficult or undesirable to remove the patterned masking layer from the patterned first and second lines. For example, removal process for some masking layers may undesirably damage the surfaces of first and second lines and/or the surfaces of the exposed substrate. Accordingly, inventors have found that, under some circumstances, the patterned masking layer may be left-in. In the following, with reference to FIGS. 16A-16D, embodiments of a diffracting grating are described, in which masking layers are left-in.

Figure 16A:
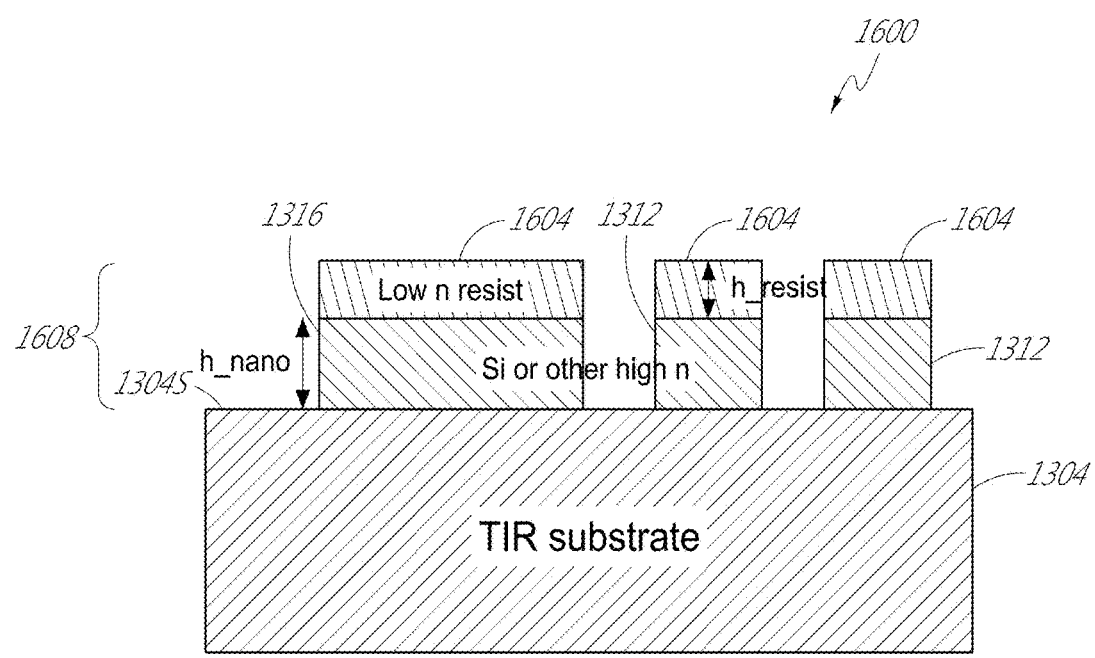
FIG. 16A illustrates a cross-sectional side view of a diffraction grating comprising a metasurface having geometric phase optical elements, according to some embodiments, in which a masking layer is left-in, according to some embodiments.

FIG. 16A illustrates a cross-sectional side view of a diffraction grating 1600 comprising a metasurface having geometric phase optical elements, according to some embodiments, in which the masking layers are left-in after forming the one or more first lines and the second lines by, e.g., photolithography and etching. In particular, it has been found that leaving-in a masking layer having a relatively low refractive index may advantageously have little or no impact on the resulting optical response, including diffraction efficiency versus angle of incidence (η vs α) behavior. Similar to the diffraction grating 1300 illustrated above with reference to FIGS. 13A and 13B, the diffraction grating 1600 includes a substrate 1304 having a surface 1304S, on which a metasurface 1608 configured to diffract light having a wavelength in the visible spectrum is formed. The metasurface 1608 includes one or more first lines 1312 extending in a first lateral direction (e.g., the y-direction) and a plurality of second lines 1316 extending in a second direction (e.g., the x-direction). The arrangement of the metasurface 1608 may be substantially similar to the arrangement of the metasurface 1308 illustrated above with reference to FIGS. 13A and 13B, except, in the metasurface 1608 of FIG. 16A, on the one or more first lines 1312 and on the second lines 1316 are masking layers 1604 that had been patterned as a template for etching to form the one or more first lines 1312 and the second lines 1316. According to some embodiments, the masking layers 1604 may be photoresist or hard mask layers having a relatively low refractive index, which is lower than the refractive index of the material of the one or more first lines 1312 and the second lines 1316. According to some embodiments, the masking layer 1604, which may be a hard mask and/or an anti-reflective layer (ARC), has a refractive index whose value is lower than about 2.0, lower than about 1.8, lower than about 1.6 or lower than about 1.4, or whose value is within a range defined by any of these values. According to some embodiments, the masking layer 1604 may be formed of a silicon-containing or a silica-containing masking layer.

Figure 16B:
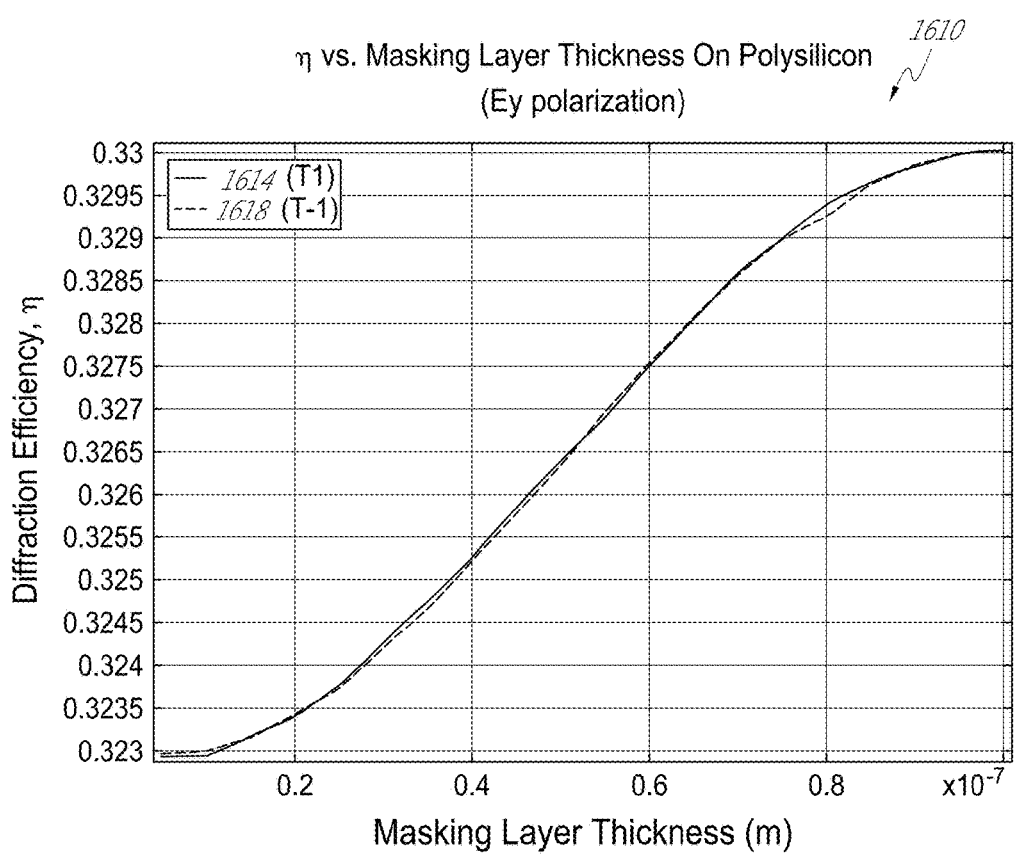
FIG. 16B illustrates simulated diffraction efficiency (η) versus the thickness of the masking layer for the exemplary diffraction grating illustrated in FIG. 16A.

FIG. 16B illustrates simulations 1610 of diffraction efficiency (η) versus the thickness of the masking layer 1604 (FIG. 16A) for an exemplary diffraction grating similar to the diffraction grating illustrated above with reference to FIGS. 13A and 13B, except, for the simulated diffraction grating, a masking layer 1604 is disposed on the one or more first lines 1312 and on the second lines 1316 (FIGS. 13A and 13B). In particular, the simulation 1610 displays the diffraction efficiency (η) for TE polarized green light (λ=520 nm) simulated for a diffraction grating having one or more first lines and second lines formed of silicon on a substrate having $n_2$=1.77 and having formed thereon a masking layer formed of $SiO_2$ ranging from 0 to 90 nm in thickness, where Δα=382 nm, $h_{nano1}$=$h_{nano2}$=107 nm, $W_{nano1}$=$W_{nano2}$=30 nm, $p_{nano1}$=96 nm and $s_1$=66 nm, under transmission mode. The simulations 1610 illustrate the simulated diffraction efficiency curves 1614 and 1618 corresponding to transmitted diffraction orders T1 and T−1 at α=0, respectively. The simulations 1610 illustrates that the presence of the masking layer having a thickness up to 90 nm has almost negligible effect (~1% or less) on the diffraction efficiency. For example, η ranges by less than about 1% at α=0 for the masking layer having a thickness up to 90 nm.

Figure 16C:
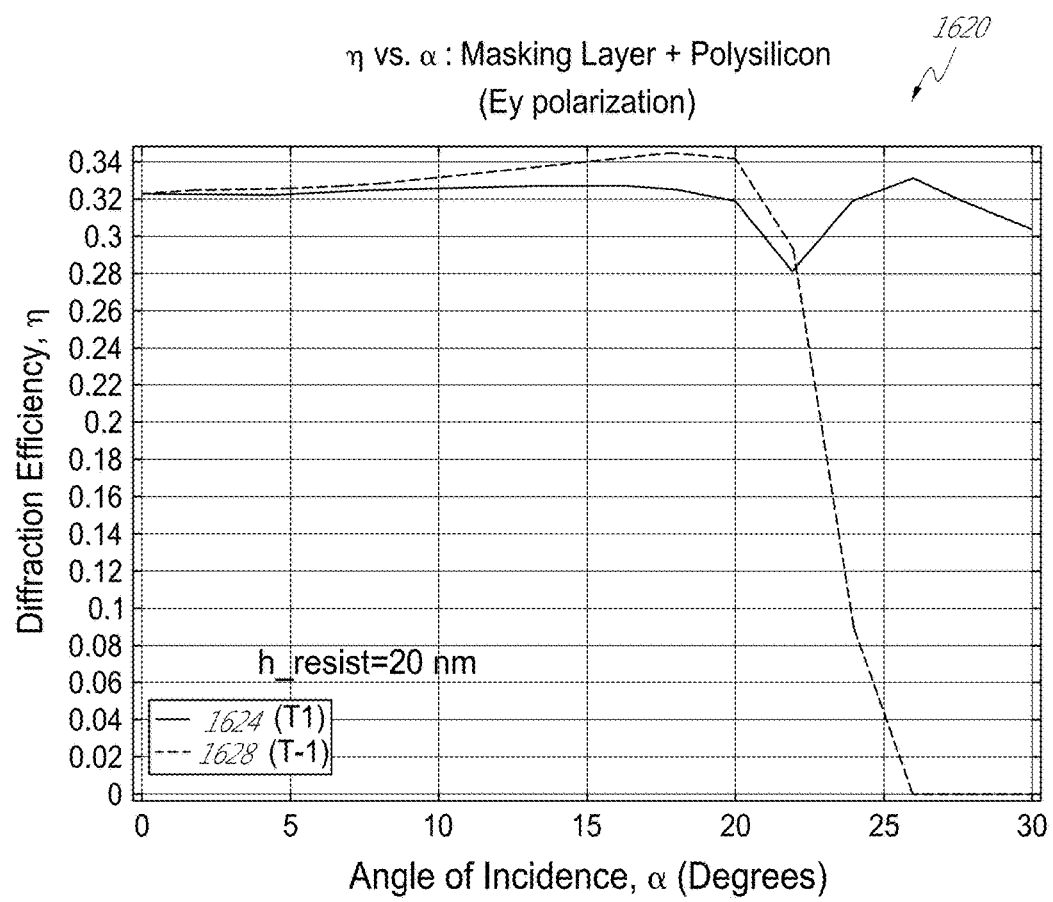
FIG. 16C illustrates simulated diffraction efficiency (η) versus angle of incidence (α) for an exemplary diffraction grating illustrated in FIG. 16A, in which the left-in masking layer is 20 nm thick, according to some embodiments.

FIG. 16C illustrates simulations 1620 of diffraction efficiency (η) versus angle of incidence α for an exemplary diffraction grating simulated with reference to FIG. 16A, except, for the simulated diffraction grating, a masking layer 1604 having a fixed thickness of 20 nm is disposed on the one or more first lines 1312 and on the second lines 1316 (FIGS. 13A and 13B). The simulations 1620 illustrate the simulated diffraction efficiency curves 1614 and 1618 corresponding to transmitted diffraction orders T1 and T−1, respectively. Compared to the simulation 1400 described above with reference to FIG. 14 for the T−1 diffraction order, the simulated diffraction efficiency 1628 illustrates that the presence of the 20 nm-thick masking layer has almost negligible effect (~1% or less) on the diffraction efficiency or on the field of view. For example, η is about 32% at α=0, which falls off by about 10% from at +α=21 degrees.

Figure 16D:
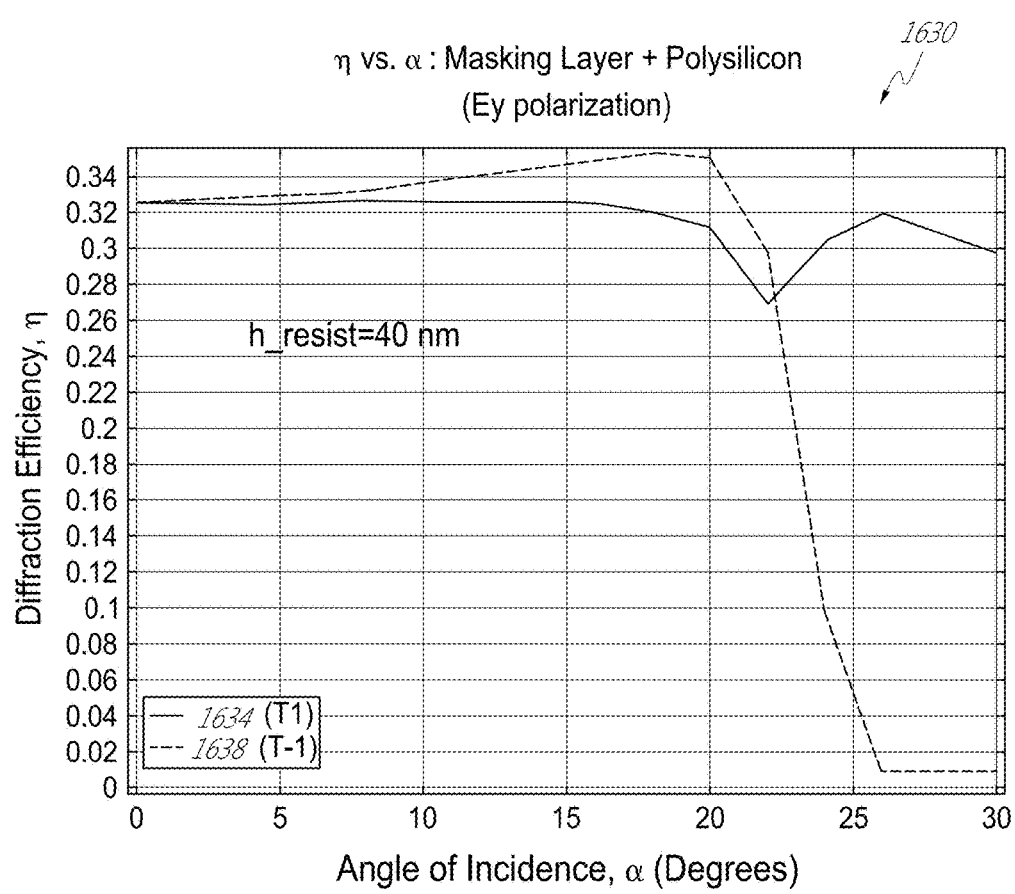
FIG. 16D illustrates simulated diffraction efficiency (η) versus angle of incidence (α) for an exemplary diffraction grating illustrated in FIG. 16A, in which the left-in masking layer is 40 nm thick, according to some embodiments.

FIG. 16D illustrates simulations 1630 of diffraction efficiency (η) versus angle of incidence α for an exemplary diffraction grating simulated with reference to FIG. 16A, except, for the simulated diffraction grating, a masking layer 1604 having a fixed thickness of 40 nm is disposed on the one or more first lines 1312 and on the second lines 1316 (FIGS. 13A and 13B). The simulations 1630 illustrates the simulated diffraction efficiency curves 1624 and 1628 corresponding to transmitted diffraction orders T1 and T−1, respectively. Compared to the simulation 1400 described above with reference to FIG. 14 for T−1 diffraction order, the simulated diffraction efficiency 1628 illustrates that the presence of the 20 nm-thick masking layer has almost negligible effect (~1% or less) on the diffraction efficiency or on the field of view. For example, η is about 32% at α=0, which falls off by about 10% from at +α=21 degrees.

In the following, with reference to FIGS. 17A-20, simulations of diffraction efficiency (η) versus angle of incidence α for exemplary diffraction gratings formed of different high refractive index materials are illustrated, where the diffraction gratings are configured to diffract a green light (e.g., λ=520 nm) in the visible spectrum.

Figure 17A:
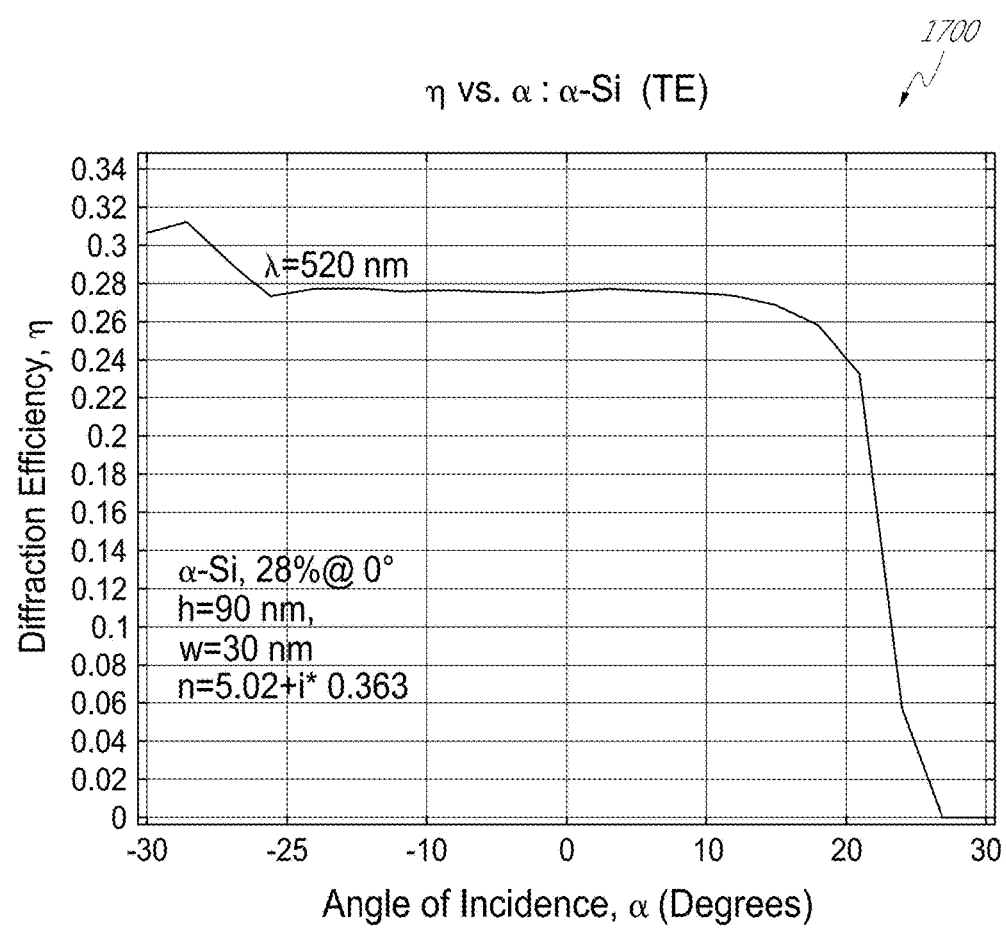
FIGS. 17A and 17B illustrate simulated diffraction efficiencies (η) versus angle of incidence (α) for an exemplary diffraction grating formed of amorphous silicon, for TE and TM polarized green light, respectively, according to some embodiments.
Figure 17B:
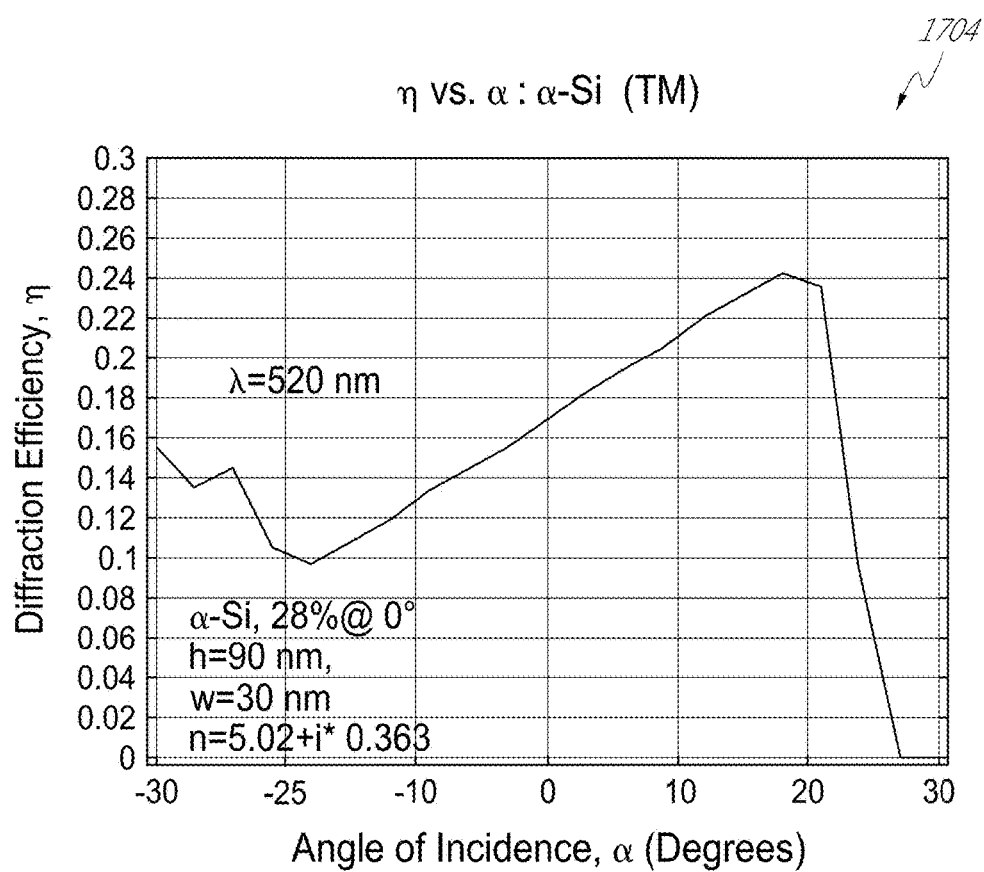

FIGS. 17A and 17B illustrate simulations 1700, 1704 of diffraction efficiency (η) versus angle of incidence (α) for an exemplary diffraction grating formed of amorphous silicon and configured to diffract green visible light. In particular, the simulations 1700 and 1704 display the diffraction efficiency (η) of T−1 order diffracted TE and TM polarized green light at λ=520 nm, respectively, incident on the diffraction grating at the α relative to a surface normal. The simulations 1700 and 1704 were performed for a diffraction grating having one or more first lines and second lines formed of amorphous silicon on a substrate having $n_2$=1.77, where Δα=382 nm, $h_{nano1}$=$h_{nano2}$=90 nm, $W_{nano1}$=$W_{nano2}$=30 nm, $p_{nano1}$=96 nm and $s_1$=66 nm, under transmission mode. The complex refractive index of refraction used for the simulations was n=5.02+0.363i. As illustrated, for the TE polarized green light, the range of angle of incidence (Δα), or field of view (FOV), is relatively wide at about 50 (<−30 to >+20) degrees, outside of which the diffraction efficiency η falls off by about 10% from an efficiency of about 28% at α=0.

Figure 18:
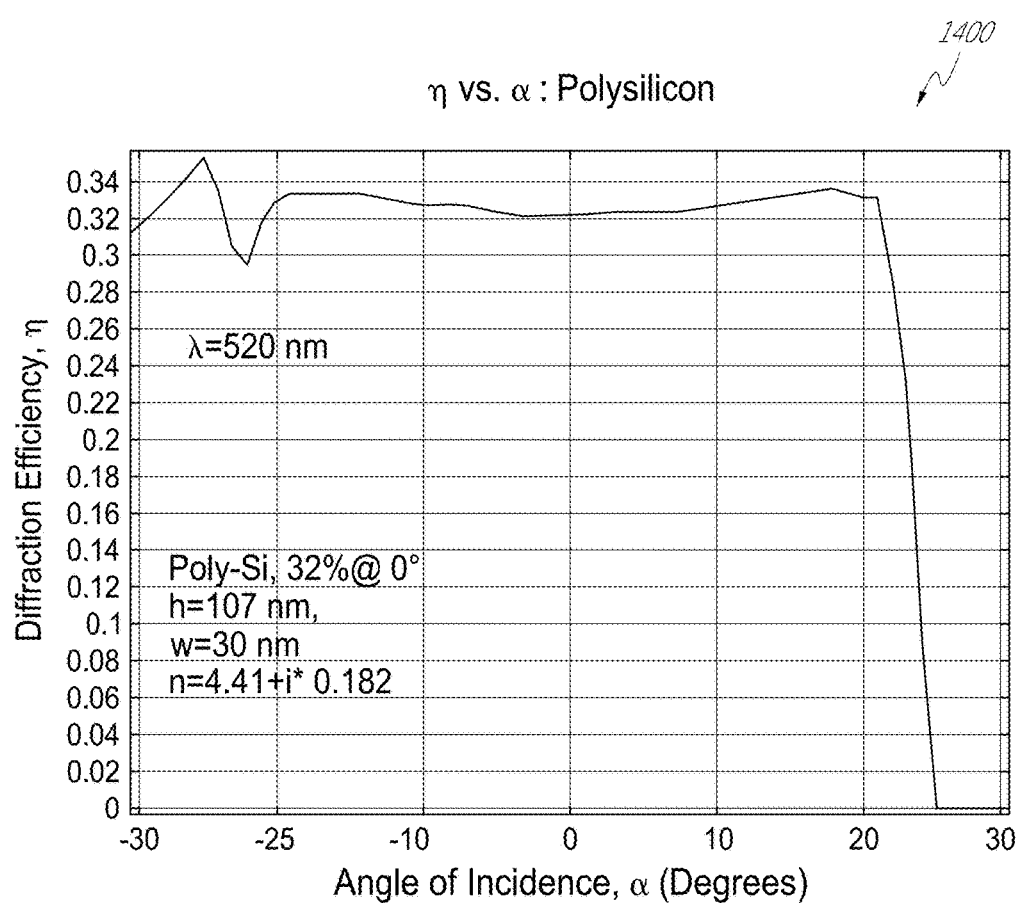
FIG. 18 illustrates simulated diffraction efficiency (η) versus angle of incidence (α) for an exemplary diffraction grating formed of polycrystalline silicon and configured to diffract green light, according to some embodiments.

FIG. 18 illustrates a simulation 1400 of diffraction efficiency (η) versus angle of incidence (α) for an exemplary diffraction grating formed of polycrystalline silicon and configured to diffract green visible light at λ=520 nm, according to some embodiments. The simulation 1400 is the same simulation as that illustrated in FIG. 14, but replotted with different range of x-axis for easy comparison against FIGS. 17A, 19 and 20. The complex refractive index of refraction used for the simulations was n=4.41+0.182i. As illustrated, the range of angle of incidence (Δα), or field of view (FOV), is relatively wide and exceeds about 40 degrees, outside of which the diffraction efficiency η falls off by about 10% from an efficiency of about 32% at α=0.

Figure 19:
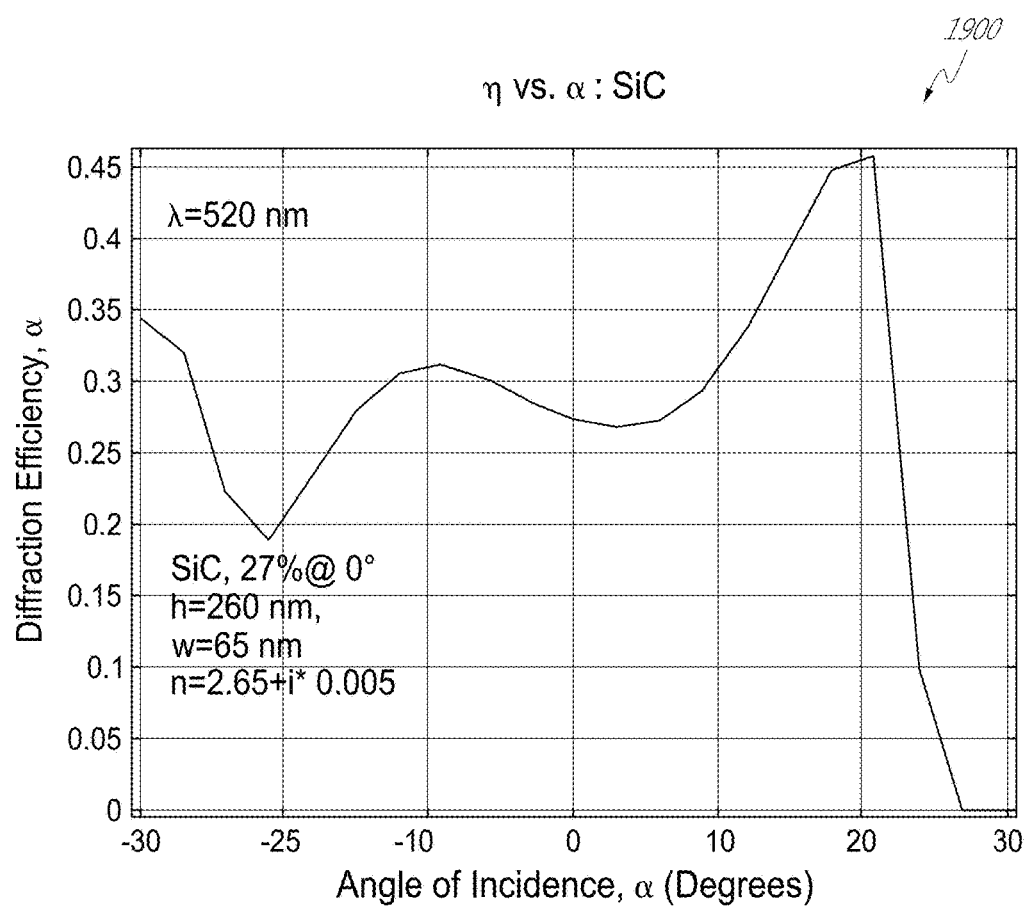
FIG. 19 illustrates simulated diffraction efficiency (η) versus angle of incidence (α) for an exemplary diffraction grating formed of silicon carbide (SiC) and configured to diffract green light, according to some embodiments.

FIG. 19 illustrates a simulation 1900 of diffraction efficiency (η) versus angle of incidence (α) for an exemplary diffraction grating formed of silicon carbide (SiC) and configured to diffract green light, according to some embodiments. In particular, the simulation 1900 displays the diffraction efficiency (η) of T−1 order diffracted TE polarized green light at λ=520 nm incident on the diffraction grating at the α relative to a surface normal. The simulation 1900 was performed for a diffraction grating having one or more first lines and second lines formed of silicon carbide (SiC) on a substrate having $n_2=1.77$, where $\Lambda_a=382$ nm, $h_{nano1}=h_{nano2}=260$ nm, $W_{nano1}=W_{nano2}=65$ nm, $p_{nano1}=96$ nm and $s_1=31$ nm, under transmission mode. The complex refractive index of refraction used for the simulations was $n=2.65+0.005i$. As illustrated, for the TE polarized green light, the range of angle of incidence ($\Delta\alpha$), or field of view (FOV), is relatively wide at about 40 ($\sim$−20 to $\sim$+20) degrees, outside of which the diffraction efficiency η falls off by about 10% from an efficiency of about 27% at $\alpha=0$.

Figure 20:
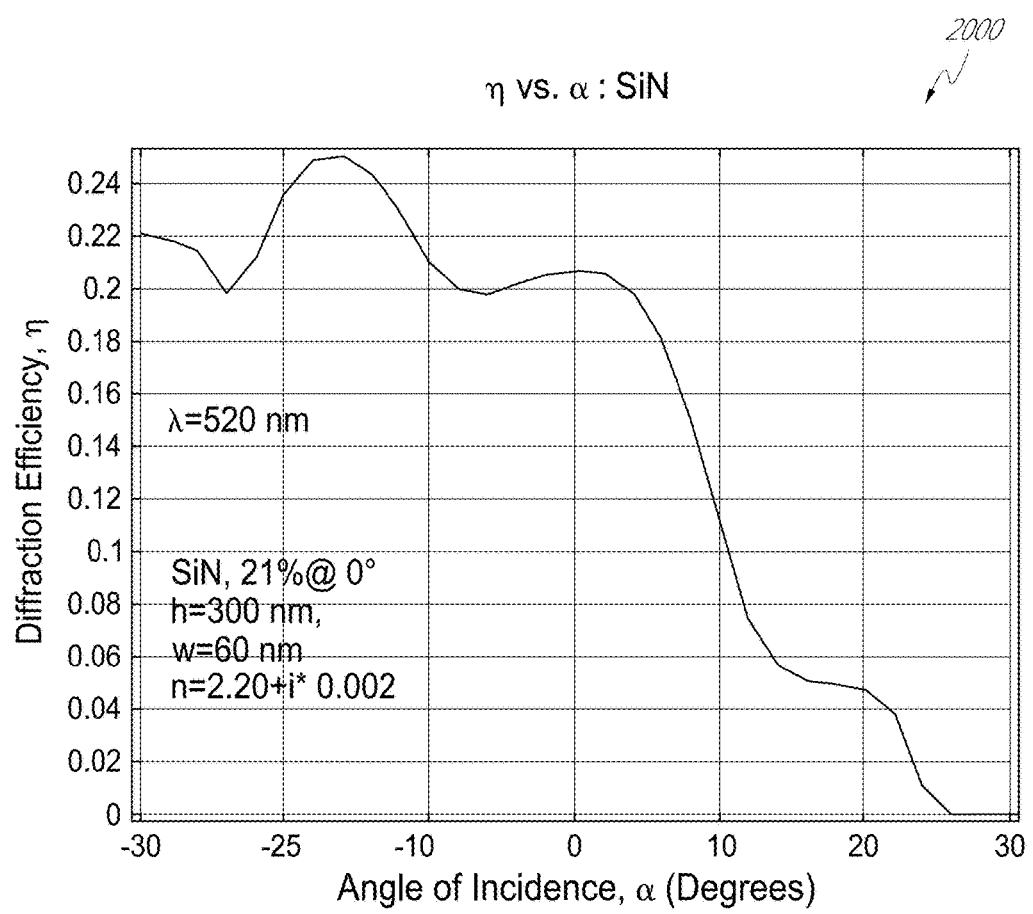
FIG. 20 illustrates simulated diffraction efficiency (η) versus angle of incidence (α) for an exemplary diffraction grating formed of silicon nitride ($Si_3N_4$) and configured to diffract green light, according to some embodiments.

FIG. 20 illustrates a simulation 2000 of diffraction efficiency (η) versus angle of incidence ($\alpha$) for an exemplary diffraction grating formed of silicon nitride (e.g., $Si_3N_4$) and configured to diffract green light, according to some embodiments. In particular, the simulation 2000 displays the diffraction efficiency (η) of T−1 order diffracted TE polarized green light at $\lambda=520$ nm incident on the diffraction grating at the $\alpha$ relative to a surface normal. The simulation 2000 was performed for a diffraction grating having one or more first lines and second lines formed of silicon nitride (e.g., $Si_3N_4$) on a substrate having $n_2=1.77$, where $\Delta\alpha=382$ nm, $h_{nano1}=h_{nano2}=300$ nm, $W_{nano1}=W_{nano2}=60$ nm, $p_{nano1}=96$ nm and $s_1=36$ nm, under transmission mode. The complex refractive index of refraction used for the simulations was $n=2.20+0.002i$. As illustrated, for the TE polarized green light, the range of angle of incidence ($\Delta\alpha$), or field of view (FOV), is relatively wide at >40 ($\sim$<−30 to $\sim$+10) degrees, outside of which the diffraction efficiency η falls off by about 10% from an efficiency of about 21% at $\alpha=0$.

In the following, with reference to FIGS. 21-24, simulations of diffraction efficiency (η) versus angle of incidence ($\alpha$) for exemplary diffraction gratings formed of different high refractive index materials are illustrated, where the diffraction gratings are configured to diffract a blue light (e.g., $\lambda=455$ nm) in the visible spectrum.

Figure 21:
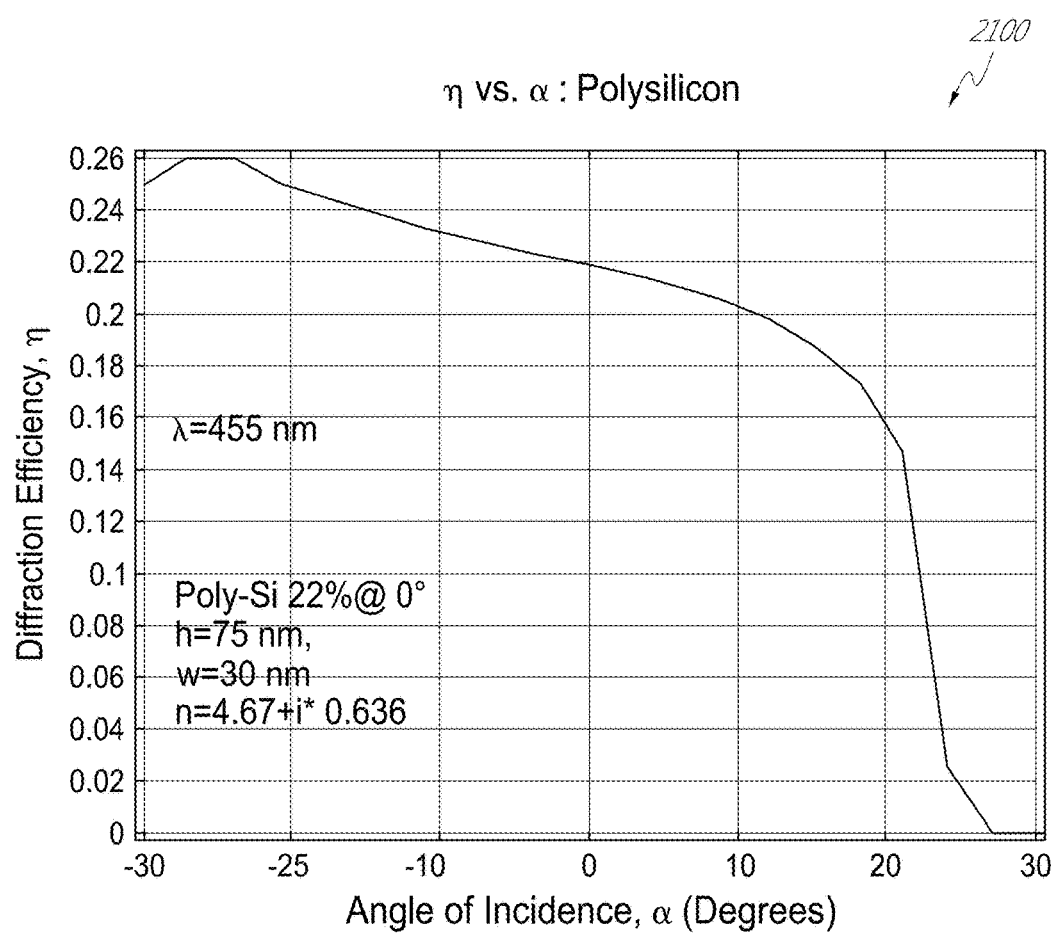
FIG. 21 illustrates simulated diffraction efficiency (η) versus angle of incidence (α) for an exemplary diffraction grating formed of polycrystalline silicon and configured to diffract blue light, according to some embodiments.

FIG. 21 illustrates a simulation 2200 of diffraction efficiency (η) versus angle of incidence ($\alpha$) for an exemplary diffraction grating formed of polycrystalline silicon and configured to diffract blue light, according to some embodiments. In particular, the simulation 2100 displays the diffraction efficiency (η) of T−1 order diffracted TE polarized blue light at $\lambda=455$ nm incident on the diffraction grating at the $\alpha$ relative to a surface normal. The simulation 2100 was performed for a diffraction grating having one or more first lines and second lines formed of polycrystalline silicon on a substrate having $n_2=1.77$, where $\Delta\alpha=334$ nm, $h_{nano1}=h_{nano2}=75$ nm, $W_{nano1}=W_{nano2}=30$ nm, $p_{nano1}=96$ nm and $s_1=66$ nm, under transmission mode. The complex refractive index of refraction used for the simulations was $n=4.67+0.636i$. As illustrated, for the TE polarized green light, the range of angle of incidence ($\Delta\alpha$), or field of view (FOV), is relatively wide at >40 ($\sim$<−30 to $\sim$+10) degrees, outside of which the diffraction efficiency η falls off by about 10% from an efficiency of about 22% at $\alpha=0$.

Figure 22:
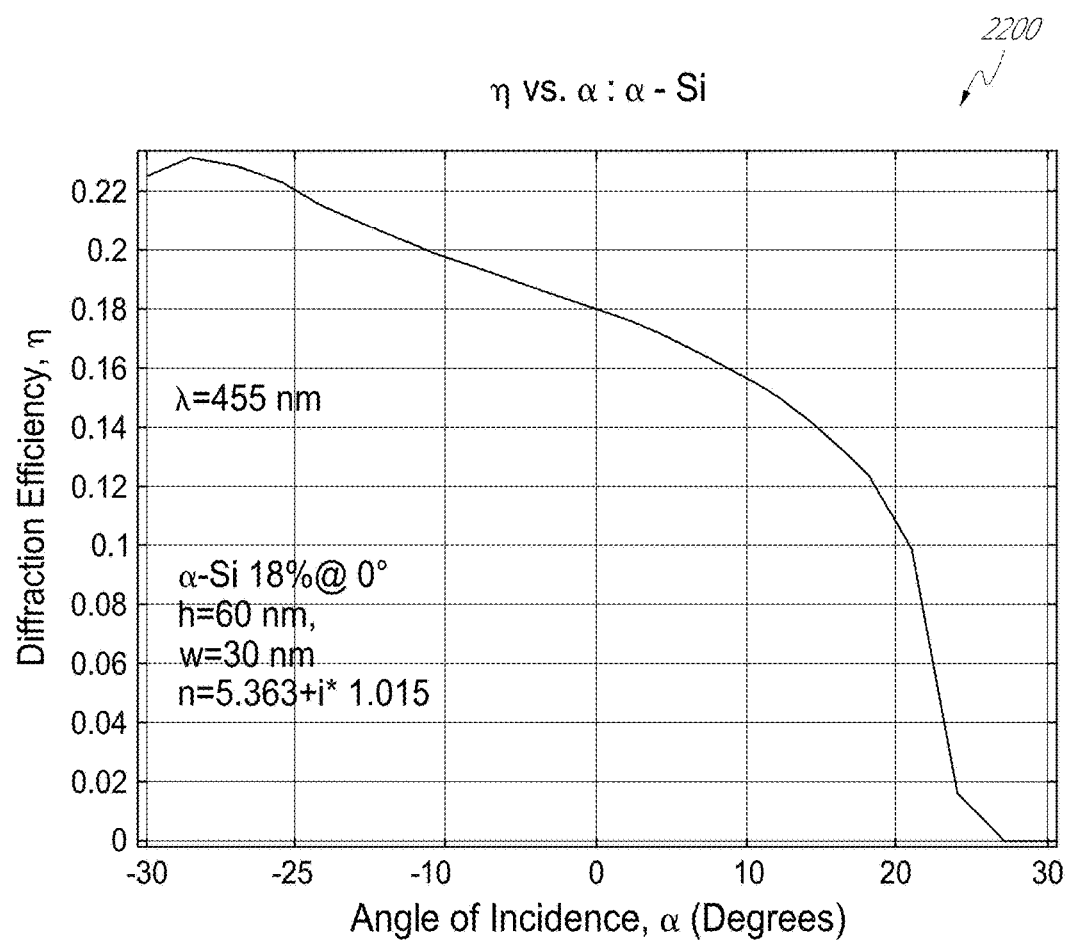
FIG. 22 illustrates simulated diffraction efficiency (η) versus angle of incidence (α) for an exemplary diffraction grating formed of amorphous silicon and configured to diffract blue light, according to some embodiments.

FIG. 22 illustrates a simulation 2200 of diffraction efficiency (η) versus angle of incidence ($\alpha$) for an exemplary diffraction grating formed of amorphous silicon and configured to diffract blue light, according to some embodiments. In particular, the simulation 2200 displays the diffraction efficiency (η) of T−1 order diffracted TE polarized blue light at $\lambda=455$ nm incident on the diffraction grating at the $\alpha$ relative to a surface normal. The simulation 2200 was performed for a diffraction grating having one or more first lines and second lines formed of amorphous silicon on a substrate having $n_2=1.77$, where $\Lambda a=334$ nm, $h_{nano1}=h_{nano2}=60$ nm, $W_{nano1}=W_{nano2}=30$ nm, $p_{nano1}=96$ nm and $s_1=66$ nm, under transmission mode. The complex refractive index of refraction used for the simulations was $n=5.363+1.015i$. As illustrated, for the TE polarized green light, the range of angle of incidence ($\Delta\alpha$), or field of view (FOV), is relatively wide at >40 ($\sim$<−30 to $\sim$+10) degrees, outside of which the diffraction efficiency η falls off by about 10% from an efficiency of about 18% at $\alpha=0$.

Figure 23:
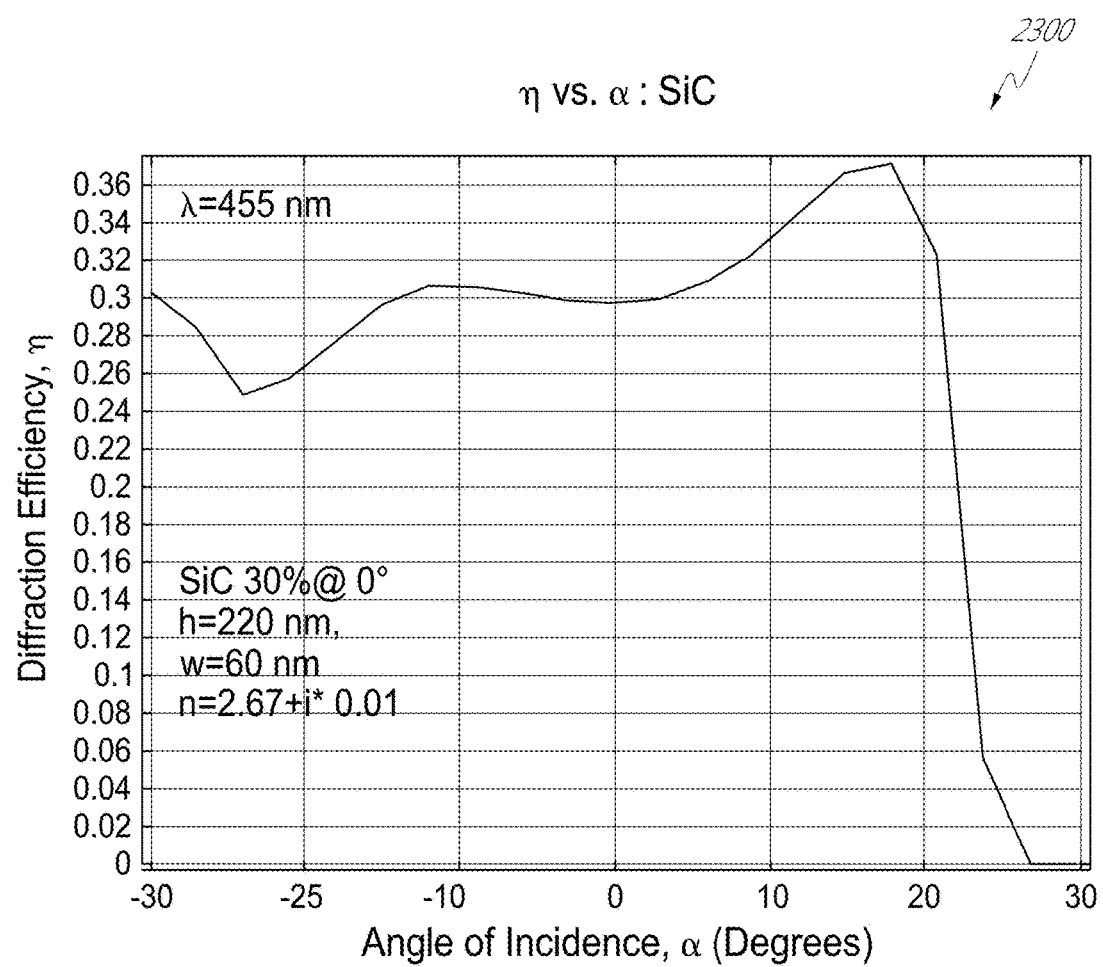
FIG. 23 illustrates simulated diffraction efficiency (η) versus angle of incidence (α) for an exemplary diffraction grating formed of silicon carbide (SiC) and configured to diffract blue light, according to some embodiments.

FIG. 23 illustrates a simulation 2300 of diffraction efficiency (η) versus angle of incidence ($\alpha$) for an exemplary diffraction grating formed of silicon carbide and configured to diffract blue light, according to some embodiments. In particular, the simulation 2300 displays the diffraction efficiency (η) of T−1 order diffracted TE polarized blue light at $\lambda=455$ nm incident on the diffraction grating at the $\alpha$ relative to a surface normal. The simulation 2300 was performed for a diffraction grating having one or more first lines and second lines formed of silicon carbide on a substrate having $n_2=1.77$, where $\Delta\alpha=334$ nm, $h_{nano1}=h_{nano2}=220$ nm, $W_{nano1}=W_{nano2}=60$ nm, $p_{nano1}=96$ nm and $s_1=36$ nm, under transmission mode. The complex refractive index of refraction used for the simulations was $n=2.67+0.01i$. As illustrated, for the TE polarized green light, the range of angle of incidence ($\Delta\alpha$), or field of view (FOV), is relatively wide at about 40 ($\sim$−18 to $\sim$+18) degrees, outside of which the diffraction efficiency η falls off by about 10% from an efficiency of about 30% at $\alpha=0$.

Figure 24:
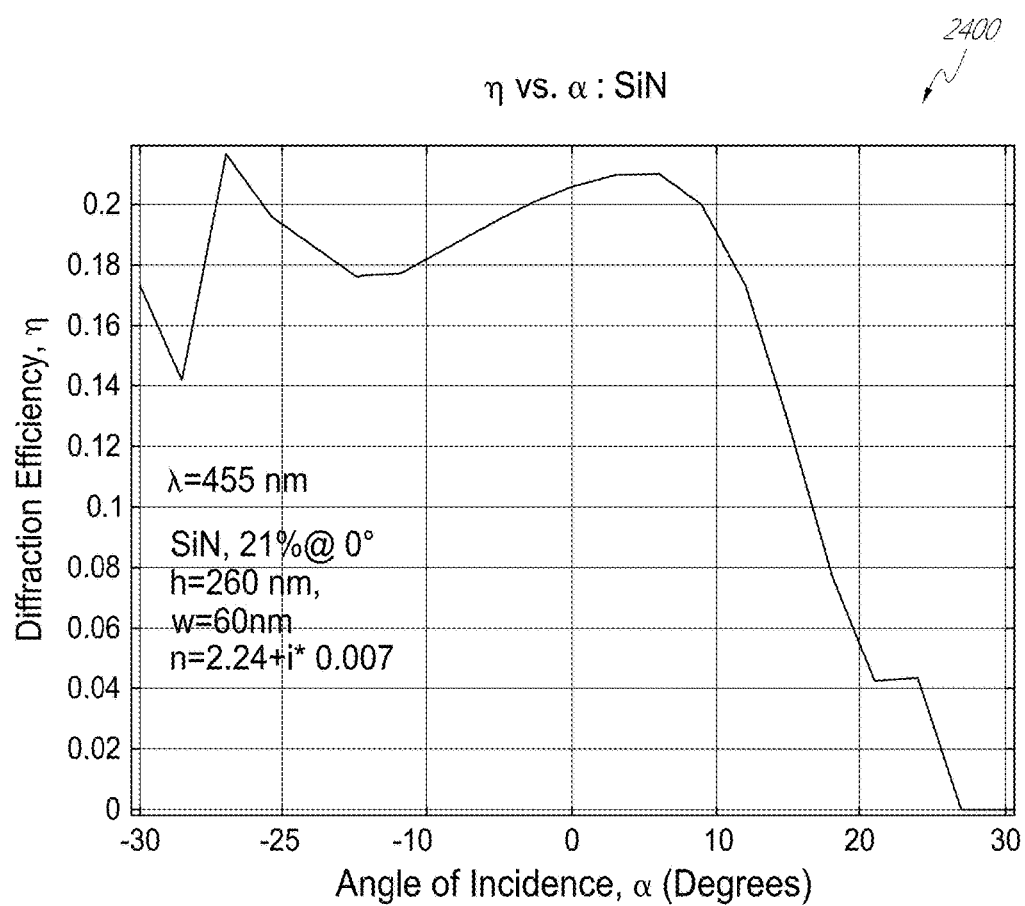
FIG. 24 illustrates simulated diffraction efficiency (η) versus angle of incidence (α) for an exemplary diffraction grating formed of silicon nitride ($Si_3N_4$) and configured to diffract blue light, according to some embodiments.

FIG. 24 illustrates a simulation 2400 of diffraction efficiency (η) versus angle of incidence ($\alpha$) for an exemplary diffraction grating formed of silicon nitride and configured to diffract blue light, according to some embodiments. In particular, the simulation 2400 displays the diffraction efficiency (η) of T−1 order diffracted TE polarized blue light at $\lambda=455$ nm incident on the diffraction grating at the $\alpha$ relative to a surface normal. The simulation 2400 was performed for a diffraction grating having one or more first lines and second lines formed of silicon nitride on a substrate having $n_2=1.77$, where $\Delta\alpha=334$ nm, $h_{nano1}=h_{nano2}=260$ nm, $W_{nano1}=W_{nano2}=60$ nm, $p_{nano1}=96$ nm and $s_1=36$ nm, under transmission mode. The complex refractive index of refraction used for the simulations was $n=2.24+0.007i$. As illustrated, for the TE polarized green light, the range of angle of incidence ($\Delta\alpha$), or field of view (FOV), is relatively wide at about 20 ($\sim$−8 to $\sim$+12) degrees, outside of which the diffraction efficiency η falls off by about 10% from an efficiency of about 21% at $\alpha=0$.

Figure 25:
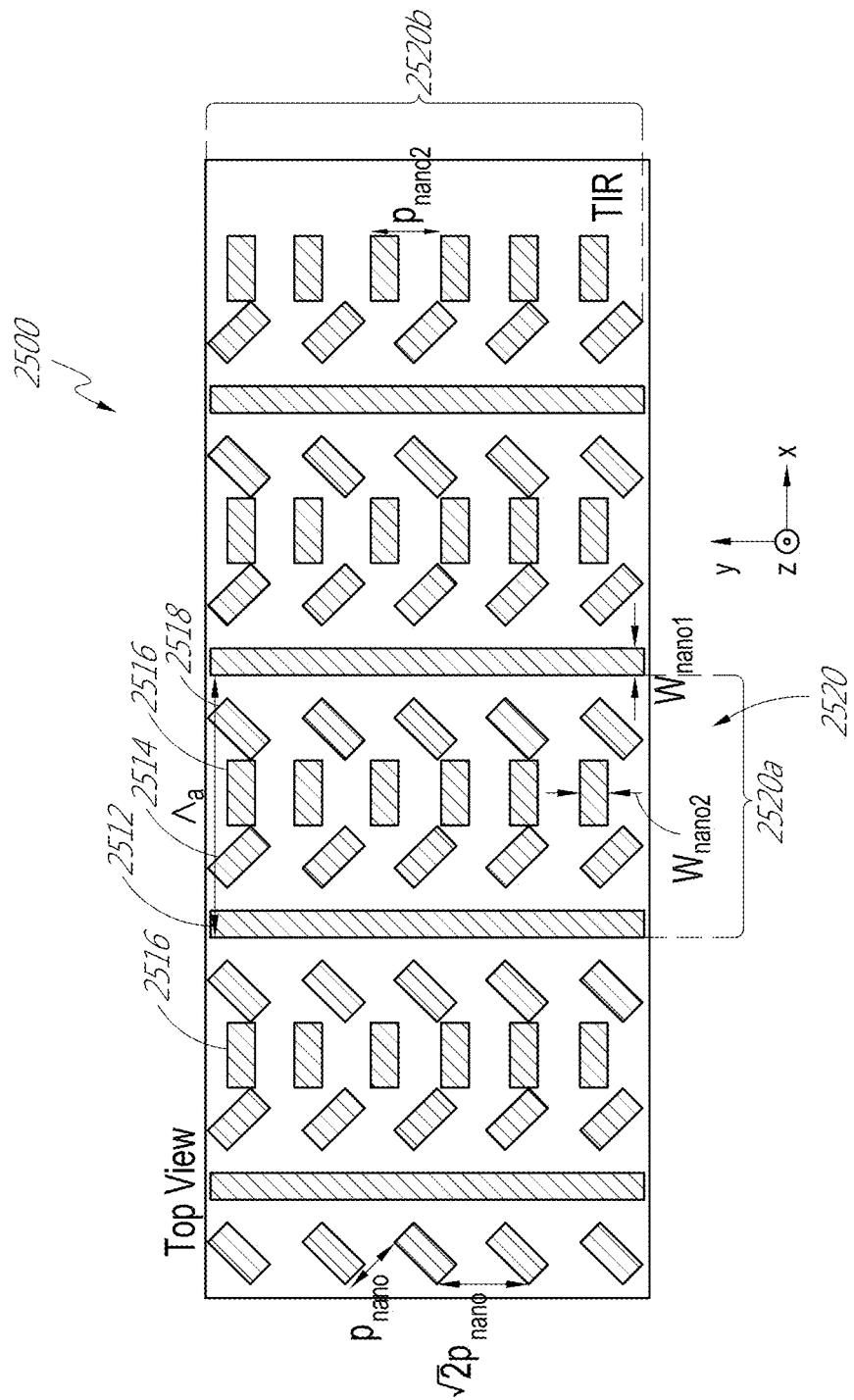
FIG. 25 illustrates a top-down view of a diffraction grating comprising a metasurface having 4-phase level geometric phase optical elements, according to some embodiments.

FIG. 25 illustrate a top-down view of a diffraction grating 2500 comprising a metasurface having geometric phase optical elements, according to some other embodiments. It will be appreciated that some embodiments of metasurfaces disclosed herein may be formed of two to four sets of nanobeams, each extending in a different direction. FIGS. 13A-13B illustrate metasurfaces having two sets of nanobeams, and FIG. 25 illustrates metasurface having four sets of nanobeams. In particular, the diffraction grating 2500 of FIG. 25 comprises a 4-level geometric phase metasurface. Similar to the diffraction grating 1300 described above with reference to FIGS. 13A and 13B, the diffraction grating 2500 includes a substrate, e.g., a waveguide, on which a metasurface configured to diffract light having a wavelength in the visible spectrum is formed. The metasurface includes one or more first lines 2512 extending in a first lateral direction (e.g., the y-direction) and a plurality of second lines 2516 extending in a second direction (e.g., the x-direction). The one or more first lines 2512 and the second lines 2516 are disposed adjacent to one another in the second direction, where the first lines 2512 and the second lines 2516 alternatingly repeat in the second direction at a period less than a wavelength in the visible spectrum which the metasurface is configured to diffract. In some embodiments, the second lines 2516 are laterally stacked in the y-direction between adjacent pairs of first lines 2512. Various features of the one or more first lines 1312 and the second lines 1316 of the diffraction grating 2500 are similar to corresponding features of the diffraction grating 1300 described above with reference to FIGS. 13A and 13B, except for the following differences.

Unlike the diffraction grating 1300 described above with reference to FIGS. 13A and 13B, the diffraction grating 2500 further comprises one or both of a plurality of third lines 2514 each extending in a third direction and a plurality of fourth lines 2518 each extending in a fourth direction. Each of the first, second, third, and fourth directions may be different from one another. The plurality of third lines 2514 may be considered to form a third set of nanobeams and the plurality of fourth lines 2518 may be considered to form a fourth set of nanobeams. The third lines 2514 are disposed on a first side of the second lines 2516 and are interposed in the second direction (e.g., x-axis direction) between one or more first lines 2512 and the second lines 2516. The fourth lines 2518 are disposed on a second side of the second lines 2516 opposite to the first side and are interposed in the second direction (e.g., x-direction) between another one or more first lines 2512 and the second lines 2516.

Unlike the diffraction grating 1300 described above with reference to FIGS. 13A and 13B, the diffraction grating 2500 may have only one first line 2512. In some other embodiments, the diffraction grating 2500 may have a plurality of first lines 2512, e.g., a pair of first lines such as the diffraction grating 1300 described above with reference to FIGS. 13A and 13B.

In some embodiments, the third lines 2514 have the same length and/or the fourth lines 2518 have the same length, such that the third lines 2514 and/or the fourth lines 2518 coterminate in the third and fourth directions, respectively. However, other embodiments are possible, in which different ones of the third lines 2514 and/or different ones of the fourth lines 2518 do not coterminate. In addition, in some embodiments, coterminating third lines 2514 and coterminating fourth lines 2518 have the same length. However, in other embodiments, coterminating third lines 2514 and coterminating fourth lines 2518 have different lengths.

In some embodiments, adjacent ones of the third lines 2514 are separated by a constant spacing in the first direction (e.g., y-direction), and/or adjacent ones of the fourth lines 2518 are separated by a constant spacing in the first direction. However, other embodiments are possible, in which third lines 2514 and/or the fourth lines 2518 are not separated by constant spacings. In addition, in some embodiments, constantly-spaced third lines 2514 and constantly-spaced fourth lines 2518 have the same constant spacing. However, in other embodiments, constantly-spaced third lines 2514 and constantly-spaced fourth lines 2518 have different spacings.

In some embodiments, the third lines 2514 have the same width and/or the fourth lines 2518 have the same width. However, in other embodiments, the third lines 2514 and/or the fourth lines 2518 have different widths. In addition, in some embodiments, widths of the third lines 2514 having the same width and the fourth lines 2518 having the same width are the same. However, in some other embodiments, widths of the third lines 2514 having the same width and the fourth lines 2518 having the same width are different. In addition, in some embodiments, the third lines 2514 and the fourth lines 2518 have the same width as one or both of first lines 2512 and second lines 2416.

In some embodiments, the third lines 2514 extend in the third direction that is rotated in a counterclockwise direction relative to the one or more first lines 2512 by an angle smaller than the smallest angle of rotation of the second lines 2516 relative to the one or more first lines 2512 when viewed a direction of propagation of an incident light (e.g., into the page). In some embodiments, the second lines 2516 are rotated by 90° or $\pi/2$ relative to the one or more first lines 2512, and the third lines 2514 are rotated by 45° or $\pi/4$ relative to the one or more first lines 2512. In addition, the fourth lines 2518 extend in the fourth direction that is rotated in the counterclockwise direction relative to the one or more first lines 2512 by an angle greater than the smallest angle of rotation of the second lines 2516 relative to the one or more first lines 2512 when viewed the direction of propagation of an incident light. In some embodiments, the second lines 2516 are rotated by 90° or $\pi/2$ relative to the one or more first lines 2512, and the third lines 2514 are rotated by 135° or $3\pi/4$ relative to the one or more first lines 2512.

In some embodiments, similar to the combination of wave plates illustrated above with reference to FIG. 12A-12H, the phase differences caused by the relative orientations of one or more first lines 2512, the second lines 2516, the third lines 2514 and the fourth lines 2518, may vary between 0 and $\pi$. When the third lines 2514, the fourth lines 2518 and the second lines 2516 and are rotated relative to the one or more first lines 2512 by $7\pi/4$, $3\pi/4$ and $\pi$, phase pickups/retardations of $7\pi/2$, $3\pi/2$ and $2\pi$ may be achieved, respectively, such that the phase pickups/retardations covering the full $0$-$2\pi$ range may be achieved, according to some embodiments. As a result, by having the fast-axes orientation vary between 0 and $\pi$, phase pickups/retardations that covers the full $0$-$2\pi$ range may be achieved, but with a much more compact unit cell pitch and higher diffraction angles compared to the illustrated example in FIGS. 12A-12H.

Display Devices Based on Geometric Phase Metasurfaces

In various embodiments of a display system (e.g., with reference back to FIGS. 9A and 9B) a set 1200 of waveguides may include metasurface diffraction gratings that are configured to operate in transmission mode. In various embodiments, the set 1200 of waveguides includes waveguides 670, 680, 690 corresponding to each component color (R, G, B), which in turn has formed therein or thereon respective ones of incoupling optical elements 700, 710, 720, which may include or correspond to the diffraction gratings 1300, 2500 described above with reference to FIGS. 13A and 13B and 25. The waveguides 670, 680, 690 additionally has formed therein or thereon respective ones of light distributing elements (e.g., OPE's) 730, 740, 750 and/or outcoupling optical elements (e.g., EPE's) 800, 810, 820, which include or correspond to EPE/OPE 1346 described above with reference to FIGS. 13A and 13B. In operation, in some embodiments, when an incident light beam 1330, e.g., visible light, is incident on the metasurface 1308 at an angle of incidence $\alpha$, the grating 1300, 2500 diffracts the incident light into a diffracted light beam 1342, 1338 at a diffraction angle $\theta_2$. When one or both of the diffracted light beams 1338 and 1342 are diffracted at diffraction angles that exceed a critical angle $\theta_{TIR}$ for occurrence of total internal reflection for the substrate 1304 configured as a waveguide having an index of refraction $n_2$, i.e., when one or both of conditions $\theta_2 > \theta_{TIR}$ and $\theta_1 > \theta_{TIR}$ are satisfied, the one or both of the diffracted light beams 1338 and 1342 propagate in their respective opposite directions along the x-axis by total internal reflection (TIR). Subsequently, in some embodiments, the diffracted light beam 1346 coupled into the substrate 1304 under TIR mode until it reaches an orthogonal pupil expanders (OPE) 1346 or an exit pupil expander (EPE) 1346, described above with reference to FIGS. 9A and 9B.

While the gratings 1300, 2500 illustrated above with reference to FIGS. 13A and 13B and FIG. 25 are configured to operate in transmissive mode, other embodiments are possible. In some other embodiments, with reference back to FIGS. 9A and 9B, some display devices include a set 1200 of waveguides having diffraction gratings that are configured to operate in reflective mode. In these embodiments, the set 1200 of waveguides includes waveguides 670, 680, 690 corresponding to each component color (R, G, B), which in turn has formed therein or thereon respective ones of incoupling optical elements 700, 710, 720, which include or correspond to the diffraction grating 2600, whose cross-sectional view is described respect to FIG. 26. The diffraction grating 2600 includes a metasurface 2608 configured to diffract light in a reflective mode, where, unlike the diffraction gratings 1300, 2500 described above with reference to FIGS. 13A and 13B and 25, in operation, light incident on a side of the metasurface 2608 diffracts towards the same side of the metasurface 2608 as the light-incident side. The diffraction grating 2600 includes a substrate 1304 having a surface 1304S, on which a metasurface 1308 configured to diffract light having a wavelength in the visible spectrum is formed. The metasurface 2608 includes one or more first lines 1312 and a plurality of second lines 1316 whose material compositions, dimensions and lateral arrangements on the surface 1304S are similar to those of diffraction gratings 1300, 2500 described above with reference to FIGS. 13A and 13B and 25, respectively. In particular, while a top-down view is not illustrated, the metasurface 1308 includes one or more first lines 1312 extending in a first lateral direction (e.g., the y-direction) and a plurality of second lines 1316 extending in a second direction (e.g., the x-direction), where the one or more first lines 1312 and the second lines 1316 are disposed adjacent to one another in the second direction and alternatingly repeat in the second direction at a period less than a wavelength in the visible spectrum.

Without being limited by theory, in some embodiments, similar to the metasurface 1308 described above with reference to FIGS. 13A and 13B, in the metasurface 2608 of the grating 2600, the one or more first lines 1312 and the second lines 1316 are oriented at an angle relative to each other to cause a phase difference between the visible light diffracted by the one or more first lines 1312 and the visible light diffracted by the second lines 1316, where the phase difference between the visible light diffracted by the one or more first lines 1312 and the visible light diffracted by the second lines 1316 is twice the angle.

While not illustrated, similar to the diffraction grating 2500 described above with reference to FIG. 25, in some other embodiments, the diffraction grating 2600 further comprises one or both of a plurality of third lines 2514 each extending in a third direction and a plurality of fourth lines 2518 each extending in a fourth direction. In addition, in some embodiments, the illustrated diffraction grating 2600 has only one first line 2512.

Figure 26:
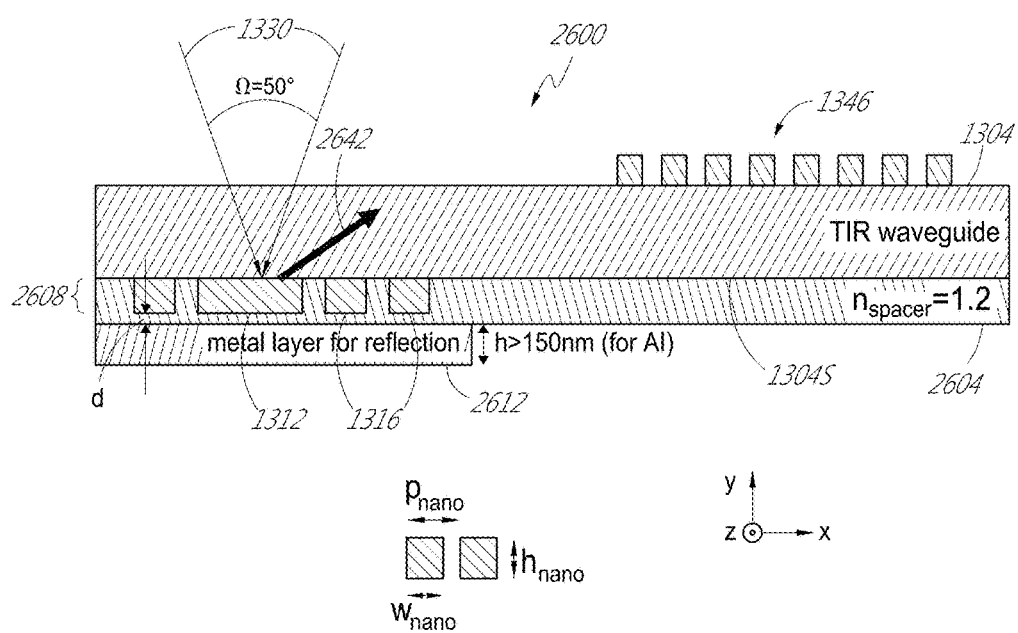
FIG. 26 illustrates a cross-sectional view of a diffraction grating comprising a metasurface having geometric phase optical elements, configured to diffract in reflective mode, according to some embodiments.

Other various possible arrangements of the one or more first lines 1312, the second lines 1316, the third lines 2514 and the fourth lines 2518 described above with reference to FIGS. 13A and 13B and 25 may be implemented in the diffraction grating 2600 of FIG. 26, whose detailed description is be omitted.

Unlike the gratings 1300 and 2500 described above with reference to FIGS. 13A and 13B and 25, in the grating 2600, an optically transmissive spacer layer 2604 may be formed over or on, e.g., directly on, the one or more first lines 1312 and the second lines 1316. In addition, a reflective layer 2612 may be formed over or on, e.g., directly on, the one or more first lines 1312 and the second lines 1316, and/or over or on, e.g., directly on, the spacer layer 2604.

In some embodiments, the spacer layer 2604 is formed directly on and contacting the one or more first lines 1312 and the second lines 1316, such that the one or more first lines 1312 and the second lines 1316 are embedded in the spacer layer 2604. The spacer layer 2604 has a height or thickness $h_{spacer}$ which is greater than the height of the one or more first lines 1312 and the second lines 1326 by a height d. The height d may be within the range of 5 nm to 1 µm, 5 nm to 500 nm or 10 nm to 300 nm, according to some embodiments. In some embodiments, the spacer layer 2604 has a refractive index $n_{spacer}$ that is lower than the refractive indices $n_{1,\,bulk}$ of the bulk material from which the one or more first lines 1312 and the second lines 1316 are formed. In some embodiments, the $n_{spacer}$ is also lower than the refractive index $n_2$ of the substrate 1304. In various embodiments, the $n_{spacer}$ has a refractive index of 1 to 2, 1.1 to 1.7, or 1.1 to 1.5, for instance 1.2. In various embodiments, the spacer layer 2604 may be formed of material that may be deposited by spin-coating, including poly(methyl methacrylate) (PMMA), spin-on glass, e-beam resist or photo-resist, and polymer. It will be appreciated that, when deposited by spin-coating, because the as-spin-coated material may undergo a viscous flow, the thickness of the spacer layer 2604 over the one or more first lines 1312 and the second lines 1316 may be thinner compared to the thickness of the spacer layer 2604 in regions where the one or more first lines 1312 and the second lines 1316 are not present, e.g., regions where the spacer layer 2604 is formed directly on the substrate 1304.

In some embodiments, the reflective layer 2612 is formed directly on the spacer layer 2604. In this embodiment, the reflective layer 2612 is separated from the one or more first lines 2612 and the second lines 2616 by the spacer layer 2604 formed thereover. However, in some other embodiments, the reflective layer 2612 may be formed directly on the one or more first lines 1312 and the second lines 1316. In these embodiments, the one or more first lines 1312 and the second lines 1316 may be embedded in the reflective layer 2612; i.e., the reflective layer 2612 may fill the spaces between the one or more first lines 1312 and/or between the second lines 1316.

The reflective layer 2612 may be formed of a material which substantially reflects light, e.g., visible light, such as a metal or metallic material, such as aluminum, silver, gold, and copper. In some other embodiments, the reflective layer 2612 may be formed of other light-reflective material, such as reflective polymer. When formed directly on the space layer 2604, the height or thickness $h_r$ of the reflective layer 2612 may be sufficiently thick to be substantially non-transmissive and free of pores, e.g., thicker than 150 nm, thicker than 500 nm or thicker than 1 µm, or in a range between these thicknesses. In embodiments where the reflective layer 2612 is formed directly on the one or more first lines 1312 and the second lines 1316, the thickness of reflective layer 2612 may be sufficient to bury the one more first lines 1312 and the second lines, and may be greater than the respective thickness $h_{nano1}$ and $h_{nano2}$.

Figure 27:
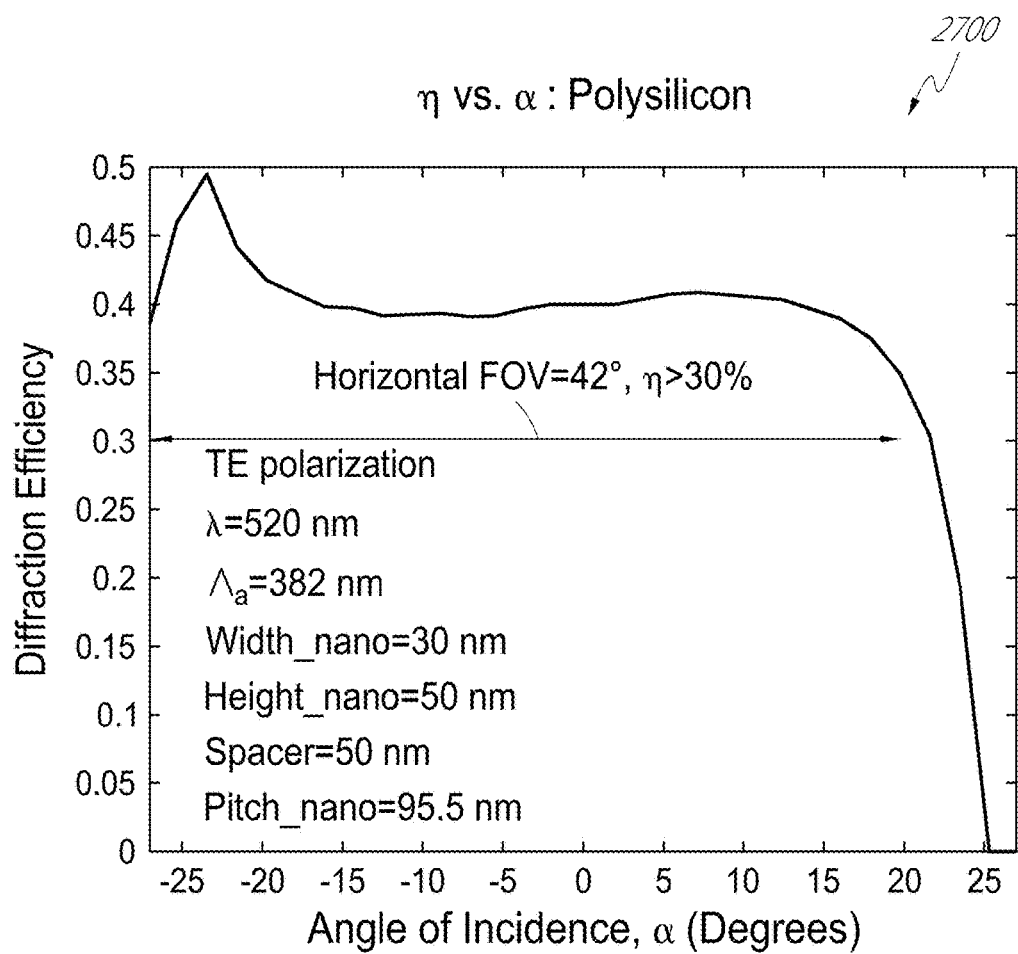
FIG. 27 illustrates a simulated diffraction efficiency (η) versus angle of incidence (α) for an exemplary diffraction illustrated in FIG. 26.

FIG. 27 illustrates a simulation 2700 of diffraction ($\eta$) versus angle of incidence ($\alpha$) for an exemplary diffraction grating in accordance with various the embodiments of the diffraction grating 2600 described above with reference to FIG. 26. In particular, the simulation 2700 displays the diffraction efficiency ($\eta$) of T−1 order diffracted TE polarized green light ($\lambda$=520 nm) simulated for a diffraction grating having one or more first lines and second lines formed of polycrystalline silicon on a substrate having $n_2$=1.77. $\Delta\alpha$=382 nm, $h_{nano1}$=$h_{nano2}$=50 nm, $W_{nano1}$=$W_{nano2}$=30 nm, $p_{nano1}$=95.5 nm $s_1$=65.5 nm and d=50 nm, under reflective mode. As illustrated, the range of angle of incidence ($\Delta\alpha$), or field of view (FOV), is relatively wide and exceeds about 45 degrees (−25 to +20 degrees), outside of which the diffraction efficiency $\eta$ falls off by about 10% from an efficiency of about 40% at $\alpha$=0.

Methods of Fabricating Geometric Phase Metasurfaces

In the following, methods of fabricating geometric phase metasurfaces are described. In some embodiments, the geometric phase metasurfaces may be fabricated using deposition of a high index material for forming the one or more first lines 1312 and the second lines 1316 on a lower index substrate 1304, followed by patterning using lithography and etch processes. In some other embodiments, the geometric phase metasurfaces may be fabricated using deposition of a high index material of the one or more first lines 1312 and the second lines 1316 on a lower index substrate 1304, followed by patterning using a nanoimprint technique.

FIGS. 28A-28D illustrate cross-sectional views of intermediate structures 2800A-2800D, respectively, at various stages of fabrication of a diffraction grating having a geometric phase metasurface using lithography and etch, according to some embodiments. Referring to the intermediate structure 2800A of FIG. 28A, the method includes providing a substrate 1304 having a surface 1304S suitable for forming a metasurface 1308 thereon. The substrate 1304 includes an optically transmissive material having a refractive index $n_2$ and various other material attributes described above with reference to FIGS. 13A and 13B. The method additionally includes forming on the surface 1304S a high index layer 1310 having an index of refraction $n_{1\ bulk}$ and various other material attributes described above with reference to FIGS. 13A and 13B. The high index layer 1310 is suitable, when patterned, for forming the one or more first lines 1312 and second lines 1316 as described above with reference to FIGS. 13A and 13B. The high index layer 1310 may be deposited using any suitable technique, such as chemical vapor deposition (CVD), including plasma-based CVD processes, such as plasma-enhanced chemical vapor deposition (PECVD) and thermal-based CVD processes, such as low pressure chemical vapor deposition (LPCVD), according to some embodiments. The high index layer 1310 may also be deposited using physical vapor deposition (PVD), evaporation, and atomic layer deposition, among other techniques. The method additionally includes forming on the high index layer 1310 a masking layer 1604A. The masking layer 1604A may be formed of or include one or more layers of materials that are suitable for providing a template for subsequent etching of the underlying high index layer 1310. In some embodiments, the masking layer 1604A may be a photoresist, which may be spin-coated, followed by a post-bake. In some other embodiments, the masking layer 1604 may include a plurality of layers, including a hard mask layer formed on the high index layer 1310 and a photoresist layer formed on the hard mask layer. The hard mask layer may be included, for example, when a photoresist layer may not provide sufficient etch selectivity during the subsequent etch pattern transfer to the underlying high index layer 1310. The hard mask layer may also serve as an antireflective coating to reduce reflection during the subsequent exposure process. In some embodiments, the hard mask layer may be a spin-coated polymer or a film deposited by any of the deposition techniques for depositing the high index layer 1310. When included, the hard mask layer may provide greater etch selectivity than the overlying photoresist layer. In some embodiments, the photoresist may be a positive photoresist or a negative photoresist. A positive photoresist is a type of photoresist in which the portion of the photoresist that is exposed to light becomes soluble to the photoresist developer, whereas a negative resist is a type of photoresist in which the portion of the photoresist that is exposed to light becomes insoluble to the photoresist developer.

In some embodiments, the photoresist and/or the hard mask layer may be formed of a material containing silicon or silicon oxide, which may have sufficient etch selectivity against the high index layer 1310, such that the photoresist and/or the hard mask layer remains relatively intact through the etching of the underlying high-index layer 1310. In these embodiments, the silicon or silicon oxide-containing photoresist and/or hard mask layer may remain on top of one or more first lines and/or the second lines after patterning, as described above with reference to FIG. 16A.

Figure 28A:
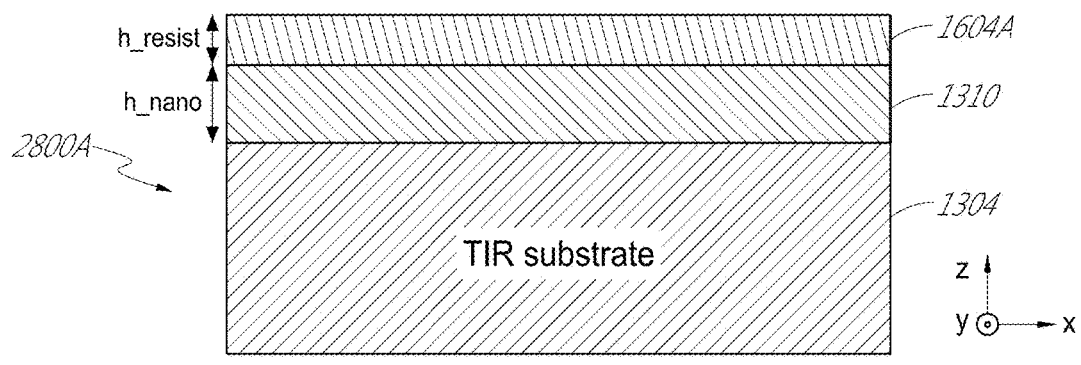
FIGS. 28A-28D are cross-sectional views of intermediate structures at various stages of fabrication of a diffraction grating comprising a metasurface having geometric phase optical elements, according to some embodiments.
Figure 28B:
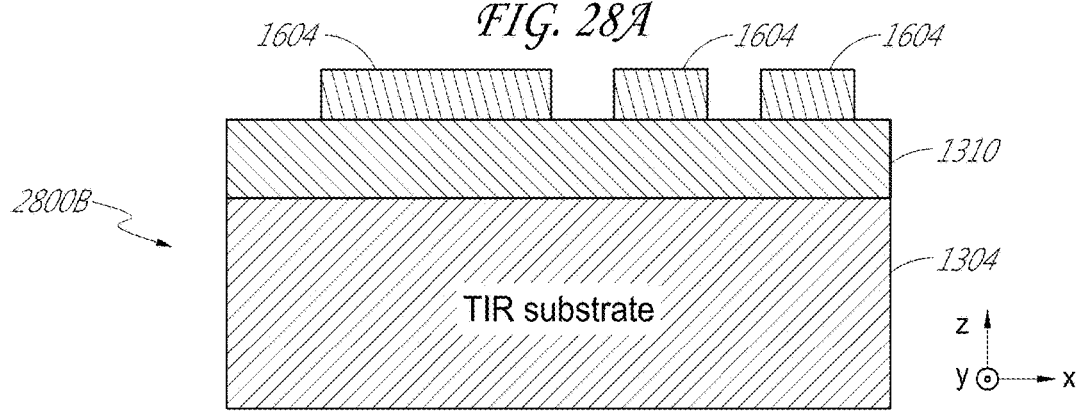

Referring to the intermediate structure 2800B of FIG. 28B, after deposition and post-deposition bake, the method includes patterning the photoresist layer of the mask layer 1604 by selectively exposing portions of the photoresist to a pattern of light. The exposure to light, e.g., coherent UV light, or an electron beam, causes a chemical change, e.g., polymeric crosslinking in the photoresist, which allows exposed portions of the photoresist to be selectively removed by a developer solution for a positive photoresist, or allows unexposed portions of the photoresist to be selectively removed by a developer solution for a negative photoresist. Upon selectively removing, the resulting patterned masking photoresist remains on the high index layer 1310, thereby serving as a template for the subsequent patterning the underlying hard mask layer when included by, e.g., etching. The resulting intermediate structure 2800C shows the patterned masking layer 1604, which includes the patterned photoresist and optionally the patterned hard mask layer when included.

Figure 28C:
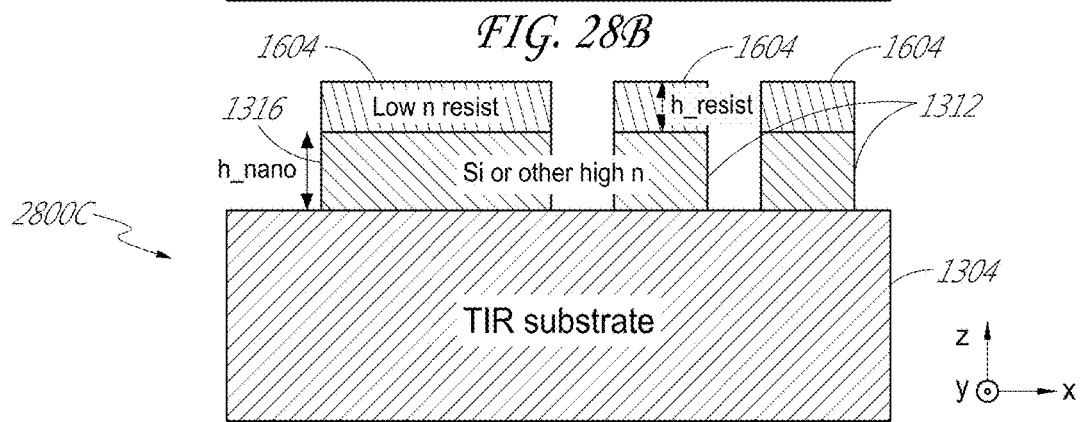

Referring to the intermediate structure 2800C of FIG. 28C, the patterned masking layer 1604 may be used as a template to etch the underlying high index layer 1310 into one or more first lines 1312 extending in a first lateral direction (e.g., the y-direction) and a plurality of second lines 1316 extending in a second direction (e.g., the x-direction), as described more in detail above with reference to FIGS. 13A and 13B. In various embodiments, the high index layer 1310 may be etched, e.g., anisotropically dry-etched. The etch process employed may have a suitable selectivity against the masking layer 1604 and/or the substrate 1304, such that the portions of the high index layer 1310 are removed without prematurely removing the masking layer 1604 and/or without undesirably damaging the exposes portions of the substrate 1304.

Referring to the intermediate structure 2800D, in some embodiments, the masking layer 1604 on the one or more first lines 1312 and the second lines 1316 are removed therefrom. The resist portion of the masking layer 1604 may be removed by, e.g., using a liquid resist stripper or an oxygen-based plasma in a process referred to as ashing. If desired and when included, the underlying hard mask layer may be subsequently removed using a wet or a dry etch process which selectively removes the hard mask without substantially affecting the one or more first lines 1312 and the second lines 1316 or the substrate 1304. However, some embodiments, e.g., the embodiment described above with reference to FIG. 16A, the mask layer 1604, e.g., the photoresist/hard mask or the hard mask, may be left-in without being removed.

Figure 28D:
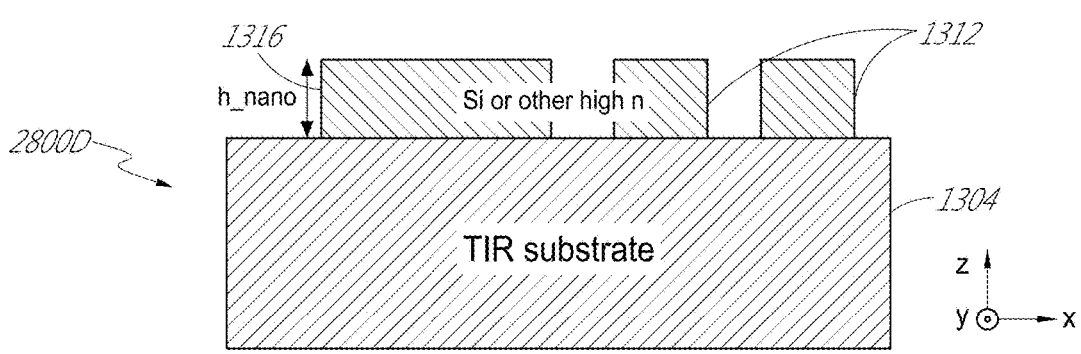
Figure 29A:
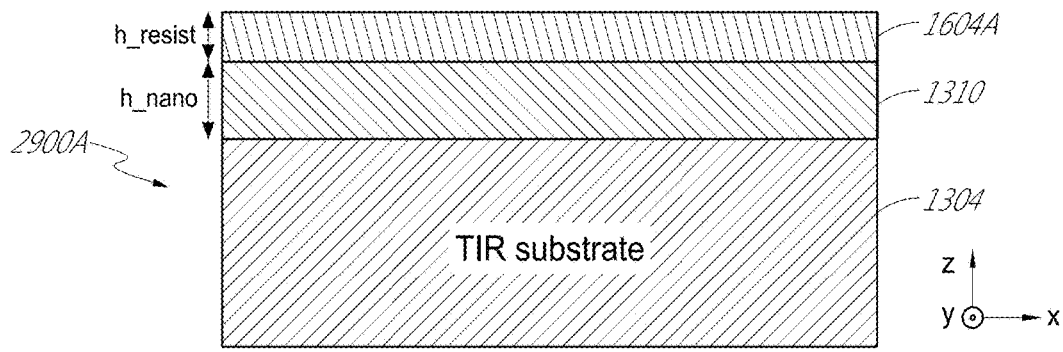
FIGS. 29A-29D are cross-sectional views of intermediate structures at various stages of fabrication of a diffraction grating comprising a metasurface having geometric phase optical elements, according to some other embodiments.
Figure 29B:
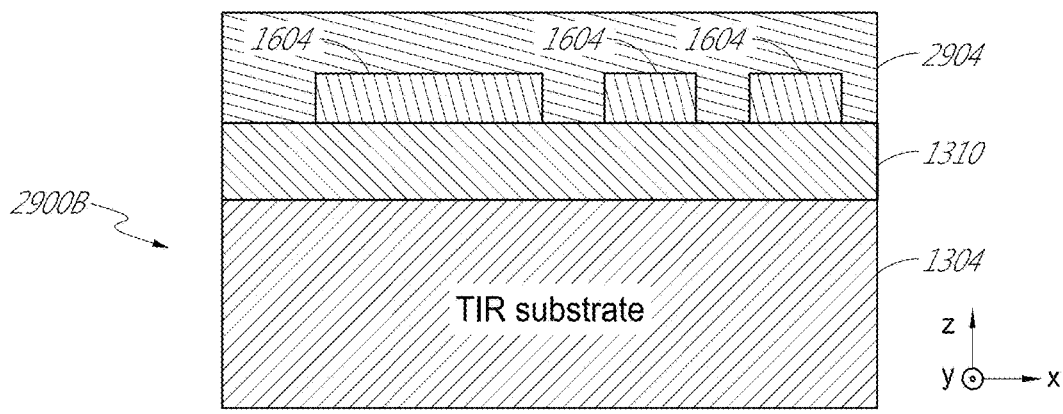
Figure 29C:
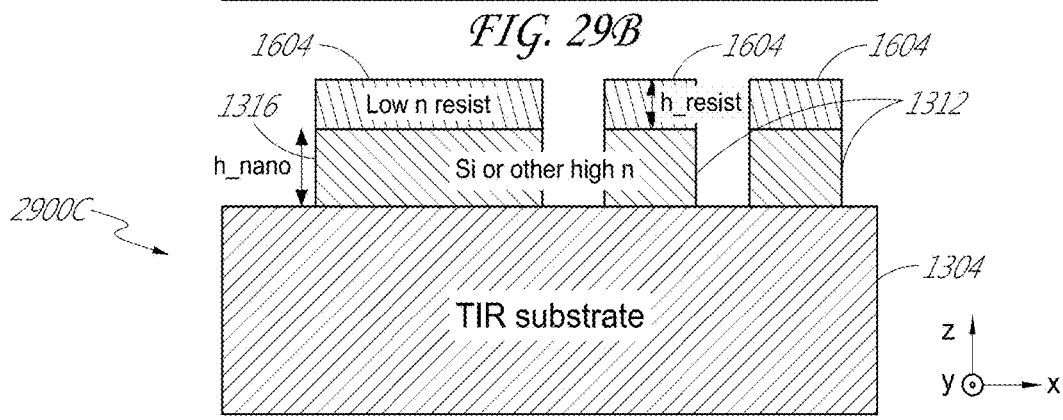

FIGS. 29A-29D illustrate cross-sectional views of intermediate structures 2900A-2900D, respectively, at various stages of fabrication of a diffraction grating having a geometric phase metasurface nanoimprint techniques, according to some embodiments. In some embodiments, the method of forming intermediate structures 2900A, 2900C and 2900D of FIGS. 29A, 29C and 29D, respectively, is similar to the method of forming intermediate structures 2800A, 2800C and 2800D of FIGS. 28A, 28C and 28D, respectively. However, the method of forming the intermediate structure 2900B of FIG. 29B is different from the method forming the intermediate structure 2800B of FIG. 28B, whose differences are described below.

Referring to the intermediate structure 2900B of FIG. 29B, unlike the method described above with reference to FIG. 28B, instead of patterning a photoresist layer by selectively exposing and removing portions of the photoresist using light or an electron beam, in the illustrated embodiment, a nanoimprint template 2904, or a nanoimprint mold, which has predefined topological patterns in accordance with formation of the one or more first lines 1312 and the second lines 1316, is brought into contact with an imprint resist of the masking layer 1604A. In some embodiments, the template 2904 is pressed into an imprint resist formed of thermoplastic polymer under certain temperature, e.g., above the glass transition temperature of the imprint resist, thereby transferring the pattern of the template 2904 into the softened imprint resist. After being cooled down, the template 2904 is separated from the imprint resist and the patterned resist is left on the high index layer 1310. In some other embodiments, the after being pressed into the imprint resist, the imprint resist is hardened by crosslinking under UV light.

Figure 29D:
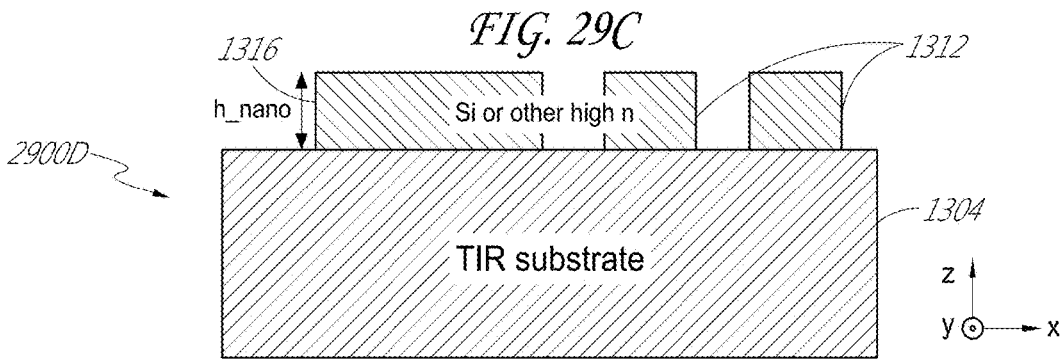

While not illustrated, reflective-mode metasurfaces, e.g., the metasurface 2608 described with reference to FIG. 26, may be formed through additional processing of the intermediate structures shown in FIG. 28D or 29D. For example, a spacer layer 2604 or a reflective layer may be deposited in the open volumes between the one or more first lines 1312 and the second lines 1316. In some other embodiments, the one or more first lines 1312 and the second lines 1316 may be formed by etching trenches in a blanket spacer layer 2604 or a blanket reflective layer and subsequently filling the trenches with the high index material of the one or more first lines 1312 and the second lines 1316.

It will be appreciated that substrates 1304 configured as waveguides having formed thereon metasurfaces according to various embodiments may be used to form display systems, such as the system 250 (FIG. 6) disclosed herein. For example, the metasurfaces may be utilized as incoupling, light distributing and/or outcoupling optical elements as descried herein. In some embodiments, after fabrication of the metasurface, the waveguide 2000 may be optically coupled to a light pipe, such as a light pipe for injecting image information into the waveguide from a spatial light modulator. The light pipe may be an optical fiber in some embodiments. Examples of light pipes include the image injection devices 360, 370, 380, 390, 400 (FIG. 6) and scanning optical fibers. In some embodiments, a plurality of waveguides each having metasurfaces 1308 may be provided, and each of these waveguides may be optically coupled to one or more image injection devices.

Geometric Phase Metasurfaces Having Asymmetric Optical Elements

As described supra, applications of the metasurfaces comprising PBOEs include their use as diffraction gratings, e.g., blazed gratings, that are capable of steering a light beam into several diffracted orders. For example, as described above with respect to FIGS. 13A and 13B, the diffraction grating 1300 may be configured to achieve maximum grating efficiency with respect to a plurality of diffraction orders, e.g., +1 and −1 diffraction orders. For example, as described supra with respect to FIGS. 13A and 13B, a blazed grating 1300 based on PBOEs may be configured to partially transmit an incident light as a transmitted light beam 1334 and partially diffracts the incident light as a diffracted light beam of +1 order 1342 at a diffraction angle $\theta_1$ and a diffracted light beam of −1 order 1338 at a diffraction angle $\theta_2$, where the diffraction angles are measured relative to the same plane for measuring α, e.g., the y-z plan. When one or both of the diffracted light beams 1338 and 1342 are diffracted at a diffraction angle that exceeds a critical angle $\theta_{TIR}$ for occurrence of total internal reflection in the substrate 1304 configured as a waveguide, the diffracted light beams 1338 and 1342 propagate in their respective opposite directions along the x-axis under total internal reflection (TIR) until the light beams reach the OPE's/EPE's 1346, which may correspond to the light distributing elements 1214, 1224, 1234 and the out-coupling optical elements 1250, 1252, 1254 (FIG. 9B). However, for some applications, it may be desirable to concentrate the diffracted light into a one of a plurality of diffraction orders, e.g., one of the +1 diffraction order 1338 or the −1 diffraction order 1338, while reducing the other of the plurality of diffraction orders, e.g., the other of the +1 order 1338 or −1 diffraction order 1338. For example, referring back to FIGS. 13A/13B, when the substrate 1304 is configured as a waveguide such that the diffracted light beams 1338 and 1342 propagate along the x-axis under total internal reflection (TIR) until the light beams reach the OPE's/EPE's 1346 disposed at one side, concentrating the diffracted light into a single order of diffraction provides a greater amount of light that is actually available to be outputted to the viewer.

Figure 30A:
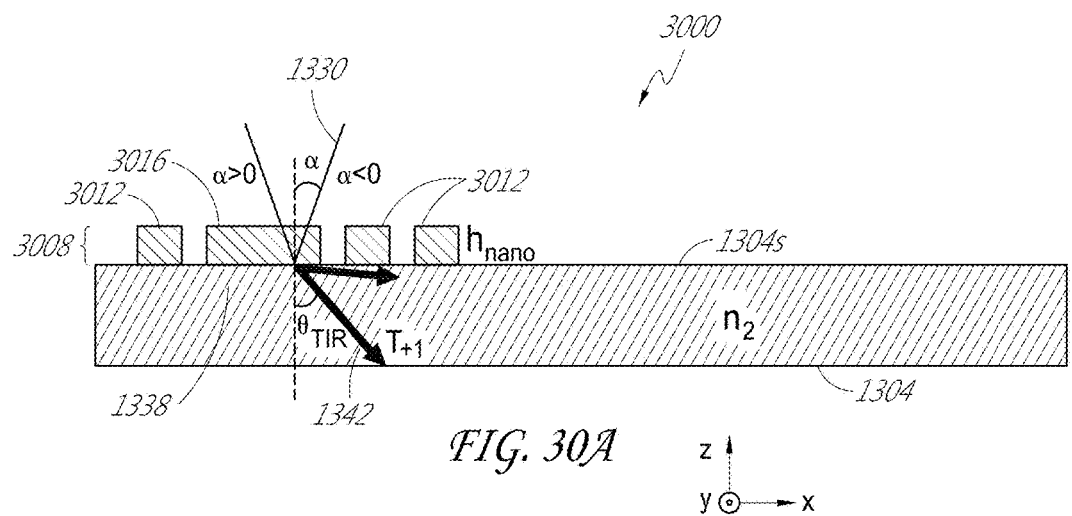
FIGS. 30A and 30B illustrate a cross-sectional side view and a top-down view, respectively, of a diffraction grating comprising a metasurface having 2-phase level, asymmetric geometric phase optical elements, according to some embodiments.
Figure 30B:
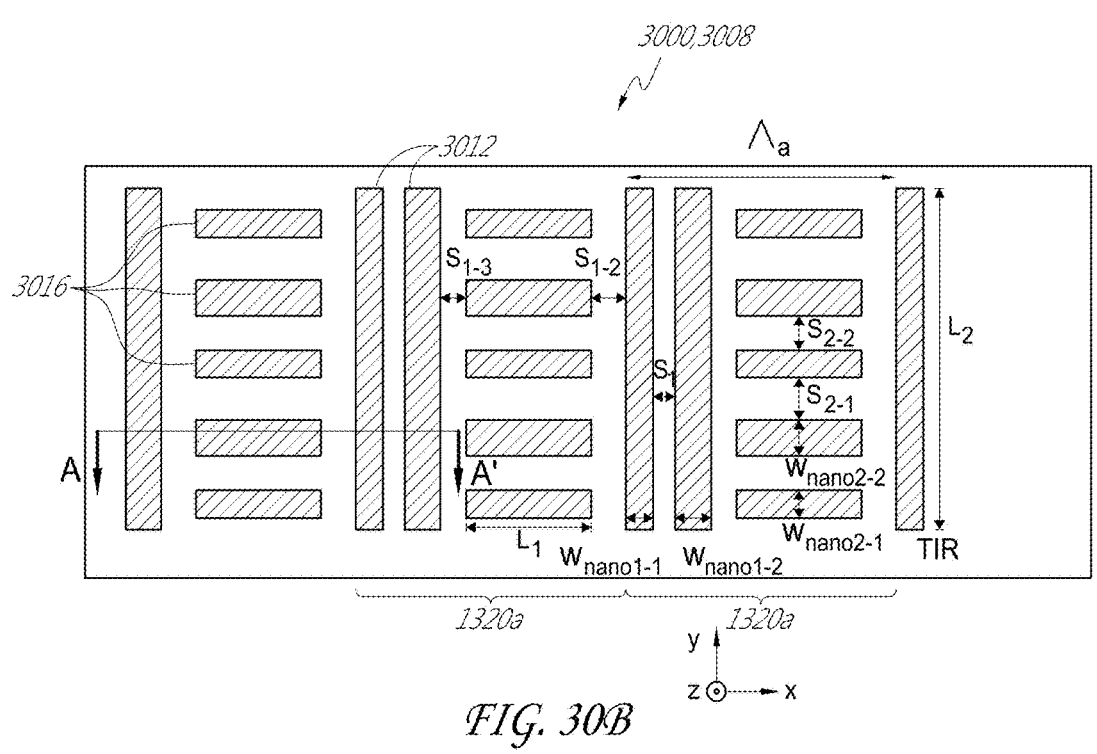

With reference to FIGS. 30A and 30B, a 2-phase level, asymmetric geometric phase metasurface configured to steer light in a particular diffraction order is illustrated. FIGS. 30A and 30B illustrate a cross-sectional side view and a top-down view, respectively, of a diffraction grating 3000 that includes a metasurface 3008 configured to diffract visible light having a wavelength, where the metasurface comprises a plurality of repeating unit cells 1320*a*. Each unit cell comprises a first set of nanobeams comprising two or more first nanobeams 3012 that are asymmetric in the sense that at least two of the first nanobeams 3012 have different widths compared to one another. Each unit cell also comprises a second set of nanobeams comprising a plurality of second nanobeams 3016 that include asymmetric second nanobeams 3016, at least two of which have different widths. The second nanobeams are disposed adjacent to the first nanobeams and separated from each other by a sub-wavelength spacing, wherein the first nanobeams 3012 and the second nanobeams 3016 have different orientations. Advantageously, it has been found that metasurfaces with these asymmetric nanobeams may diffract light such that the light is more efficiently steered into one of a plurality of diffraction orders, e.g., one of the +1 diffraction order 1342 or the −1 diffraction order 1338, while reducing the other of the plurality of diffraction orders, e.g., the other of the +1 order 1342 or −1 diffraction order 1338.

In some embodiments, the diffraction grating 3000 comprises a 2-level geometric phase metasurface. The cross-sectional side view illustrated with reference to FIG. 30A is that of a cross-section taken along the line AA' of FIG. 30B. The diffraction grating 3000 includes a substrate 1304 having a surface on which is formed a metasurface 3008 configured to diffract light having a wavelength in the visible spectrum. The metasurface 3008 includes first lines or nanobeams 3012 having a first orientation and extending generally in a first lateral direction (e.g., the y-direction) and a plurality of second lines or nanobeams 3016 extending generally in a second direction (e.g., the x-direction). The first lines or nanobeams 3012 may be considered to form a first set of nanobeams and the second lines or nanobeams 3016 may be considered to form a second set of nanobeams. The first lines 3012 and the second lines 3016 are disposed adjacent to one another in the second direction, and the first lines 3012 and the second lines 3016 alternatingly repeat in the second direction at a period, e.g., a period less than the wavelength of light for which the metasurface is configured to diffract. Advantageously, in comparison to structures such as those of U.S. Pat. No. 9,507,064, metasurfaces with the space-variant orientations can efficiently diffract light having multiple polarizations, e.g., TE and TM polarizations.

It will be appreciated that the physical and optical properties of the diffraction grating 3000 including, e.g., refractive indices of various materials as well as the operational principles of the grating, are similar to various embodiments described above, e.g., the diffraction grating 1300 described above with respect to FIG. 13A/13B. In addition, the unit cell pitch $\Lambda_a$ of the diffraction grating 3000, as well as dimensions, e.g., height, length and width, of the first nanobeams 3012 and of the second nanobeams 3016 are similar to various embodiments described above, and their detailed description is omitted herein for brevity.

However, unlike some embodiments described above, at least one of the first nanobeams 3012 have a different width than another of the first nanobeams 3012, and at least one of the second nanobeams 3016 have a different width than another of the second nanobeams 3016. In the illustrated embodiment, a unit cell includes the first set of nanobeams comprising a pair of first nanobeams 3012, having a first width $W_{nano1-1}$ and a second width $W_{nano1-2}$, that are different from each other. The unit cell additionally includes the second set of nanobeams comprising a plurality of second nanobeams 3016, having a third width $W_{nano2-1}$ and a fourth width $W_{nano2-2}$, that are different from each other. Thus, in the illustrated embodiment, the first set of nanobeams includes alternating nanobeams having two different widths, and the second set of nanobeams includes alternating nanobemas having two different widths. However, embodiments are not so limited and the first and/or second set of nanobeams can have additional nanobeams that have other widths.

In the following, various configurations including dimensions and geometric arrangements of the first lines 3012 and the second lines 3016 are described, whose combined effect is to steer diffracted light into one of a plurality of diffraction orders while reducing the other(s) of the plurality of diffraction orders, as well as achieving various desirable optical properties described above, including one or more of a relatively high diffraction angle, a relatively high diffraction efficiency, a relatively wide range of acceptance angle and a relatively uniform efficiency within the range of acceptance angle, and relatively high efficiency for both TE and TM polarizations.

In detail, referring to FIG. 30A, in operation, when an incident light beam 1330, e.g., visible light, is incident on the metasurface 3008 at an angle of incidence α measured relative to a plane normal to the surface 1304S and extending in a direction parallel to the first lines 1312, e.g., the y-z plane, the grating 3000 partially transmits the incident light as a transmitted light beam and partially diffracts the incident light as a diffracted light beam of +1 order 1342 at a diffraction angle $\theta_1$, while substantially suppressing a diffracted light beam of −1 order (not shown for clarity) at a diffraction angle $\theta_2$, where the diffraction angles are measured relative to the same plane for measuring α, e.g., the y-z plan. Similar to as described above, when the diffracted light beam of +1 order 1342 is diffracted at a diffraction angle that exceeds a critical angle $\theta_{TIR}$ for occurrence of total internal reflection in the substrate 1304 configured as a waveguide, the diffracted light beams propagate along the x-axis under total internal reflection (TIR) until the light beams reach the OPE's/EPE's 1346 (not shown for clarity, see, e.g., FIG. 13A-13B).

In various embodiments, each of $W_{nano1}$ of the first lines 1312 and $W_{nano2}$ of the second lines 1316 is smaller than the wavelength of light the metasurface 1308 is configured to diffract, and is preferably smaller than a wavelength in the visible spectrum. In some embodiments, each of the $W_{nano1-1}$, $W_{nano1-2}$, $W_{nano2-1}$ and $W_{nano2-2}$ is nm to 1 μm, 10 nm to 500 nm, 10 nm to 300 nm, 10 nm to 100 nm or 10 nm to 50 nm, for instance 30 nm. In some embodiments, $W_{nano1-1}$ is substantially equal to $W_{nano2-1}$ and $W_{nano1-2}$ is substantially equal to $W_{nano2-2}$. In some other embodiments, each of the $W_{nano1-1}$, $W_{nano2-1}$, $W_{nano1-2}$ and $W_{nano2-2}$ may be different.

According to some embodiments, immediately adjacent ones of the first lines 1312 in the second direction (x-direction) are separated by a spacing $s_{1-1}$. In addition, one of the first lines 1312 are separated from the one of the second lines 1316 on opposite sides by different constant spacing $s_{1-2}$ and $s_{1-3}$ According to some embodiments, each of the $s_{1-1}$, $s_{1-2}$ and $s_{1-3}$ is smaller than the wavelength the metasurface 3008 is configured to diffract.

According to some embodiments, immediately adjacent ones of the second lines 3016 in the first direction (y-direction) are separated by spacings $s_{2-1}$ and $s_{2-2}$ that alternatingly repeat with the alternatingly repeating second lines 3016 having two different widths $W_{nano2-1}$ and $W_{nano2-2}$. According to some embodiments, each of the $s_{2-1}$ and $s_{2-2}$ is smaller than the wavelength the metasurface 3008 is configured to diffract.

With continued reference to FIG. 30A, the first lines 3012 and the second lines 3016 have a height $h_{nano}$ which may be the same or different, and that are similar in dimensions as described above, e.g., with respect to FIGS. 13A/13B, whose descriptions with respect to the dimensions and the technical effects, e.g., on the field of view (FOV), are not described herein for brevity. Furthermore, the desired ratios of spacing to height of the different nanobeams may be realized where, e.g., each of the spacings $s_{1-1}$, $s_{1-2}$, $s_{1-3}$, $s_{2-1}$ and $s_{2-2}$ is in the range of 10 nm to 1 μm, 10 nm to 300 nm, 10 nm to 100 nm or 10 nm to 50 nm, for instance 30 nm. Of course, relatively lower values of $s_{1-1}$, $s_{1-2}$, $s_{1-3}$, $s_{2-1}$ and $s_{2-2}$ may be realized where $h_{nano1}$ and $h_{nano2}$ have correspondingly relatively lower values.

According to various embodiments, the combination of $s_{1-1}$ and one of $W_{nano1-1}$ or $W_{nano1-2}$ may be selected such that a pitch ($p_{nano1}$) of the first lines 3012, defined as a sum of $s_{1-1}$ and one of $W_{nano1-1}$ or $W_{nano1-2}$, has a value obtained by a sum of $W_{nano1-1}$, $W_{nano1-2}$ selected from ranges of 10 nm to 1 μm, 10 nm to 500 nm, 10 nm to 300 nm, 10 nm to 100 nm or 10 nm to 50 nm, and $s_1$ selected from ranges of 10 nm to 1 μm, 10 nm to 300 nm, 10 nm to 100 nm or 10 nm to 50 nm. For instance $p_{nano1}$=95.5 nm in some embodiments.

Of course, relatively small values of $s_{1-1}$, $s_{1-2}$, $s_{1-3}$, $s_{2-1}$ and $s_{2-2}$ may be realized and $h_{nano}$ may have correspondingly relatively small values. Advantageously, using a material with relatively high refractive index $n_1$ to form the first lines 1312 and/or the second lines 1316, relatively small values of $s_{1-1}$, $s_{1-2}$, $s_{1-3}$, $s_{2-1}$ and $s_{2-2}$, $h_{nano}$ may be obtained. This is because, as the inventors have found, the quantity $h_{nano}$ may be inversely proportional to the bulk refractive index of the material forming the first lines 3012 and the second lines 3016. Accordingly, for a material having bulk refractive index of 2.0-2.5, 2.5-3.0, 3.0-3.5 and higher than 3.5, $h_{nano}$ may be in the range of 500 nm to 1 μm, 300 nm to 500 nm, 100 nm to 300 nm and 10 nm to 100 nm, respectively, in various embodiments. Thus, by the particular combination of a material having a high bulk refractive index $n_1$ of the first lines 3012 and the second lines 3016 and the corresponding dimensions $s_{1-1}$, $s_{1-2}$, $s_{1-3}$, $s_{2-1}$ and $s_{2-2}$, $h_{nano}$, the overall pitch $\Lambda_a$ may also be correspondingly decreased, which in turn increases the diffraction angle θ, as described further below.

Figure 31A:
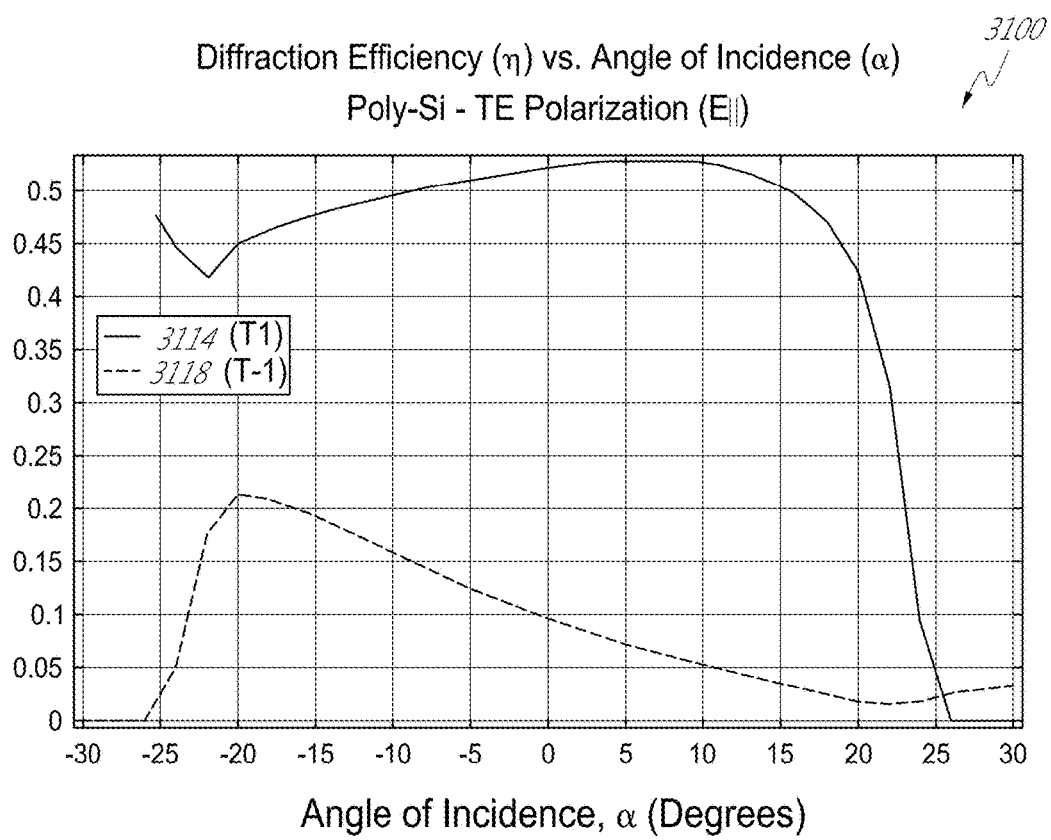
FIGS. 31A and 31B illustrate simulated diffraction efficiencies (η) versus angle of incidence (α) for an exemplary diffraction grating formed of polycrystalline silicon, for TE and TM polarized green light, respectively, according to some embodiments.
Figure 31B:
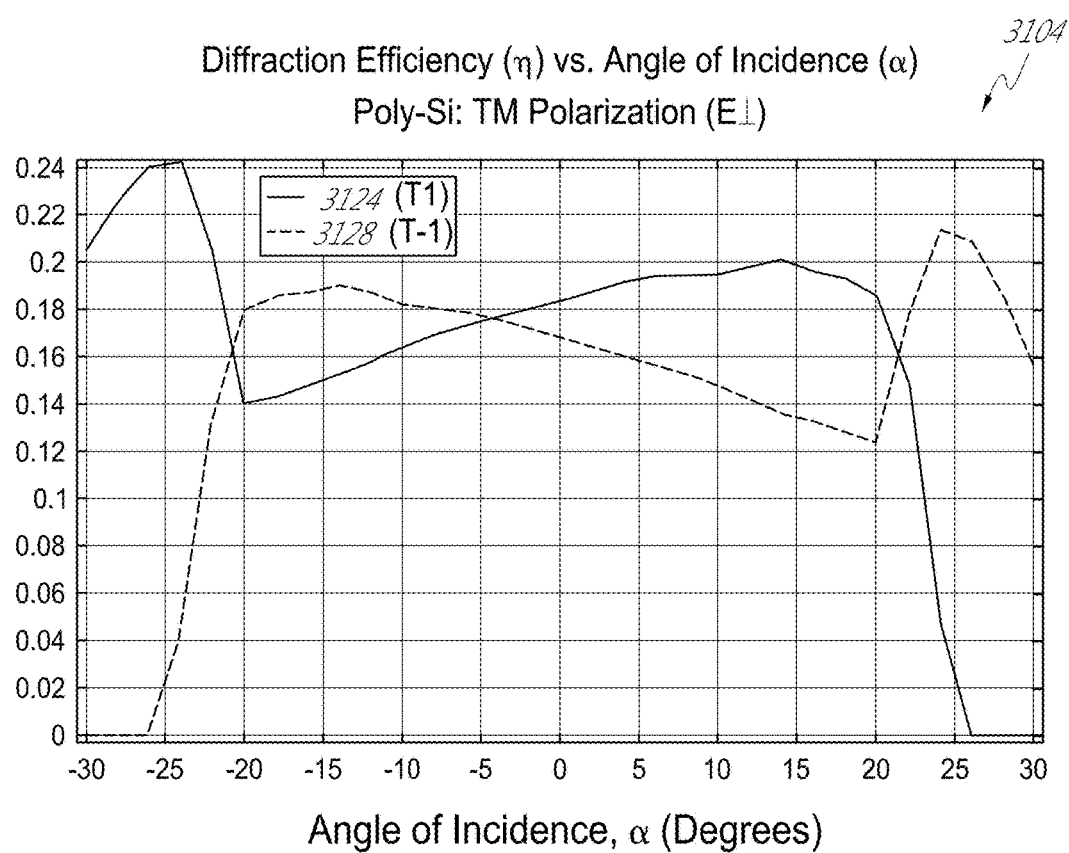

FIGS. 31A and 31B illustrate simulations 3100, 3104 of diffraction efficiency (η) versus angle of incidence (α) for an exemplary diffraction grating formed of polycrystalline silicon and configured to diffract green visible light. In particular, the simulations 3100 and 3004 display the diffraction efficiencies (η) of T+1 (3114, FIG. 31A) and T−1 (3118, FIG. 31A) order diffracted TE polarized green light at λ=520 nm and of T+1 (3124, FIG. 31B) and T−1 (3128, FIG. 31B) order TM polarized green light at λ=520 nm, respectively, incident on the diffraction grating at the α relative to a surface normal. The simulations 3100 and 3104 were performed for a diffraction grating having first lines and second lines formed of polycrystalline silicon on a substrate having $n_2$=1.77, where $\Lambda_a$=382 nm, $h_{nano1}$=107 nm, $W_{nano1-1}$=$W_{nano2-1}$=30 nm and $W_{nano1-2}$=$W_{nano2-2}$=45 nm, $s_{1-1}$=58 nm, $s_{1-2}$=23 nm, $s_{1-3}$=35 nm, $s_{2-1}$=$s_{2-2}$=58 nm, under transmission mode.

As illustrated in FIG. 31A, for TE polarized light, the diffraction grating 3000 diffracts the incident light relatively efficiently into the T+1 order diffracted beam 3114, while reducing the T−1 order diffracted beam 3118, with corresponding diffraction efficiencies exceeding 50% and about 10%, respectively, at α=0. For the T+1 order TE polarized green light, the range of angle of incidence (in the range of 10), or field of view (FOV), is relatively wide at about 50 (~20 to >+20) degrees, outside of which the diffraction efficiency η falls off by about 10% or more from an efficiency exceeding 50% at α=0. As illustrated in FIG. 31B, for TM polarized light, the diffraction grating 3000 diffracts the incident light relatively evenly between the T+1 order diffracted beam 3124 and the T−1 order diffracted beam 3128, with corresponding diffraction efficiencies lower than 20% at α=0.

Figure 32A:
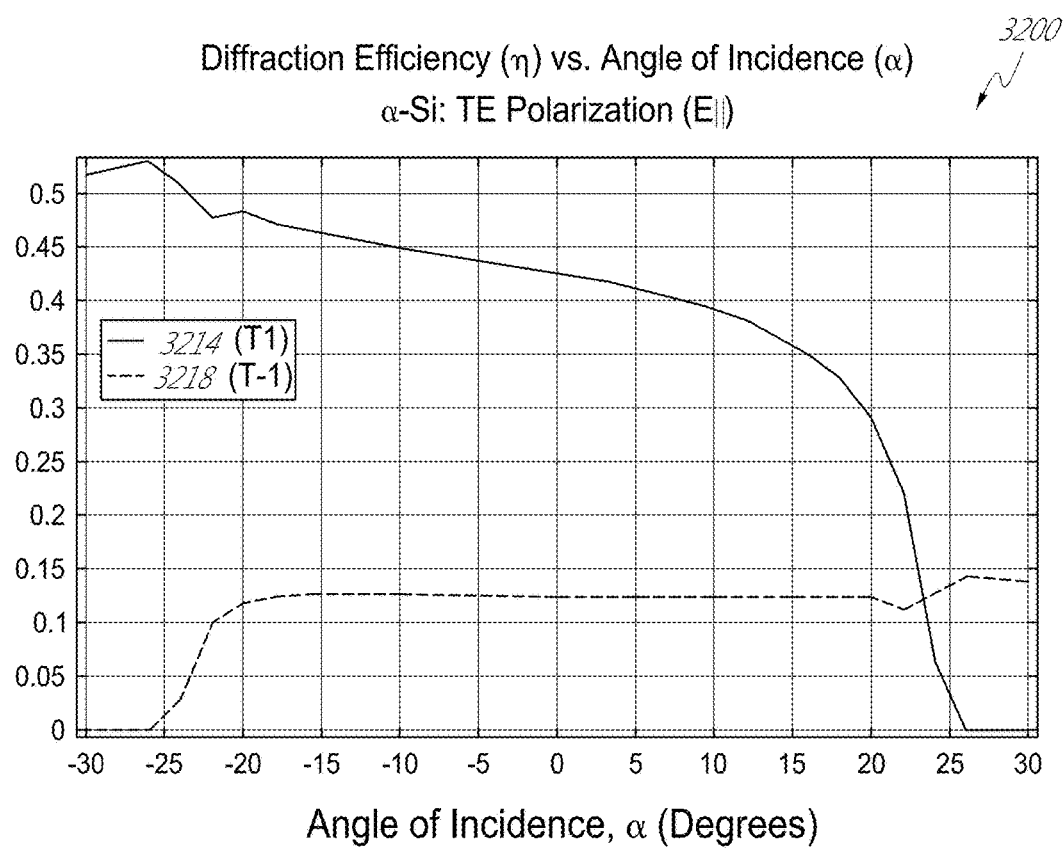
FIGS. 32A and 32B illustrate simulated diffraction efficiencies (η) versus angle of incidence (α) for an exemplary diffraction grating formed of amorphous silicon, for TE and TM polarized green light, respectively, according to some embodiments
Figure 32B:
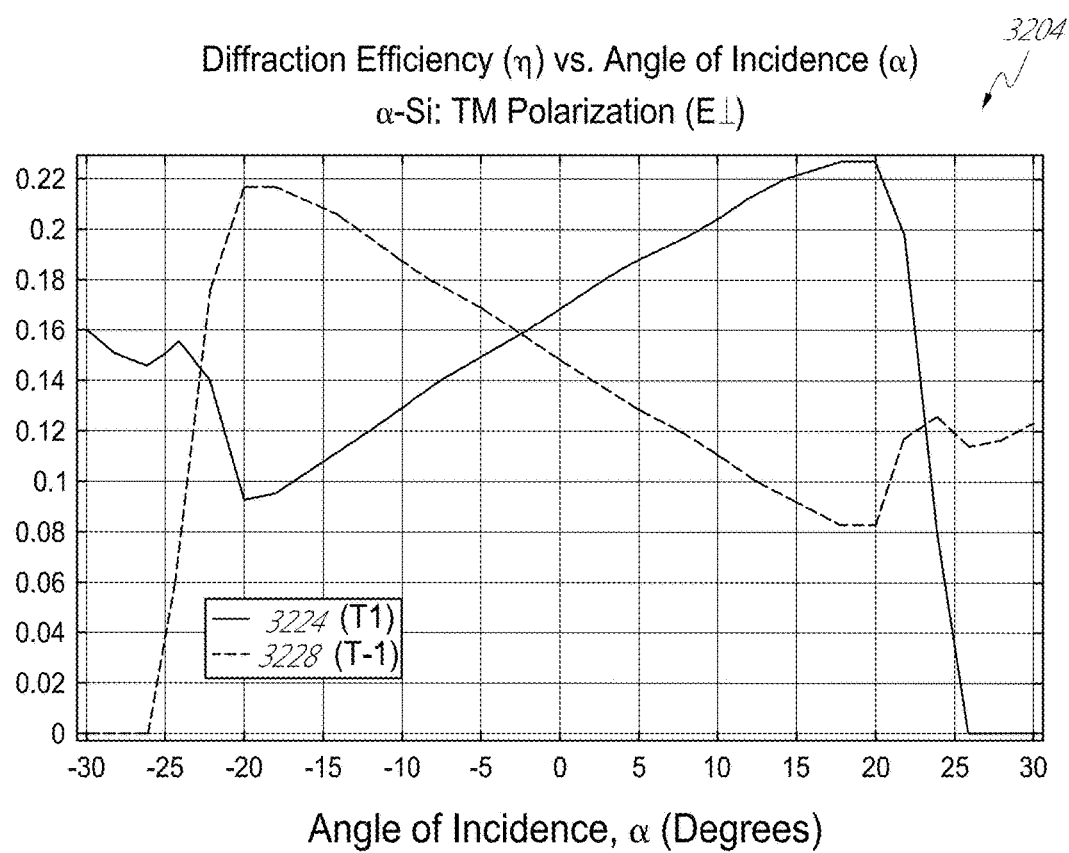

FIGS. 32A and 32B illustrate simulated diffraction efficiencies (η) versus angle of incidence (α) for an exemplary diffraction grating formed of amorphous silicon, for TE and TM polarized green light, respectively, according to some embodiments. In particular, the simulations 3200 and 3204 display the diffraction efficiencies (η) of T+1 (3214, FIG. 32A) and T−1 (3218, FIG. 32A) order diffracted TE polarized green light at λ=520 nm and of T+1 (3224, FIG. 32B) and T−1 (3228, FIG. 32B) order TM polarized green light at λ=520 nm, respectively, incident on the diffraction grating at the α relative to a surface normal. The simulations 3200 and 3204 were performed for a diffraction grating having first lines and second lines formed of amorphous silicon on a substrate having $n_2$=1.77, where $\Lambda_a$=382 nm, $h_{nano}$=85 nm, $W_{nano1-1}$=$W_{nano2-1}$=25 nm and $W_{nano1-2}$=$W_{nano2-2}$=40 nm, $s_{1-1}$=63 nm, $s_{1-2}$=25 nm, $s_{1-3}$=38 nm, $s_{2-1}$=$s_{2-2}$=63 nm, under transmission mode operation.

As illustrated in FIG. 32A, for TE polarized light, the diffraction grating 3000 diffracts the incident light relatively efficiently into the T+1 order diffracted beam 3214, while reducing the T−1 order diffracted beam 3218, with corresponding diffraction efficiencies of about 42% and about 13%, respectively, at α=0. For the T+1 order TE polarized green light, the range of angle of incidence (in the range of 10), or field of view (FOV), is relatively wide at >40 (<−30 to >+10) degrees, outside of which the diffraction efficiency η falls off by about 10% or more from an efficiency exceeding 40% at α=0. As illustrated in FIG. 32B, for TM polarized light, the diffraction grating 3000 diffracts the incident light relatively evenly between the T+1 order diffracted beam 3224 and the T−1 order diffracted beam 3228, with corresponding diffraction efficiencies exceeding 15% at α=0.

Figure 33A:
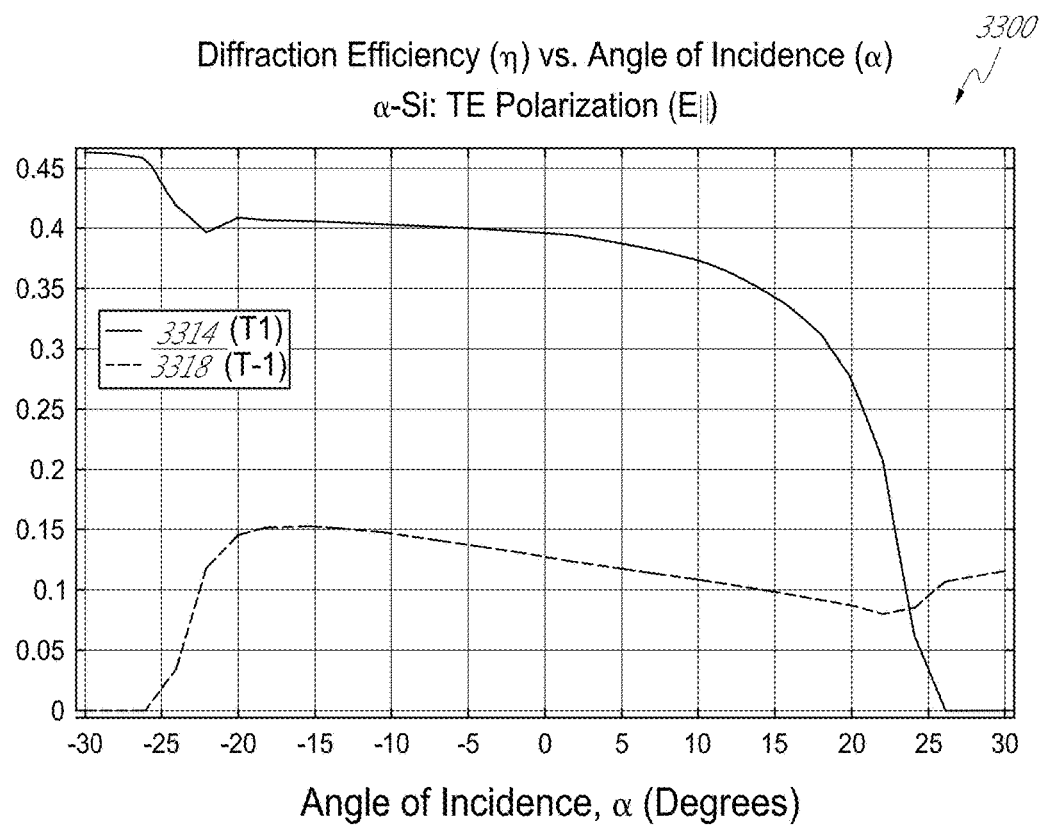
FIGS. 33A and 33B illustrate simulated diffraction efficiencies (η) versus angle of incidence (α) for an exemplary diffraction grating formed of amorphous silicon, for TE and TM polarized green light, respectively, according to some embodiments.
Figure 33B:
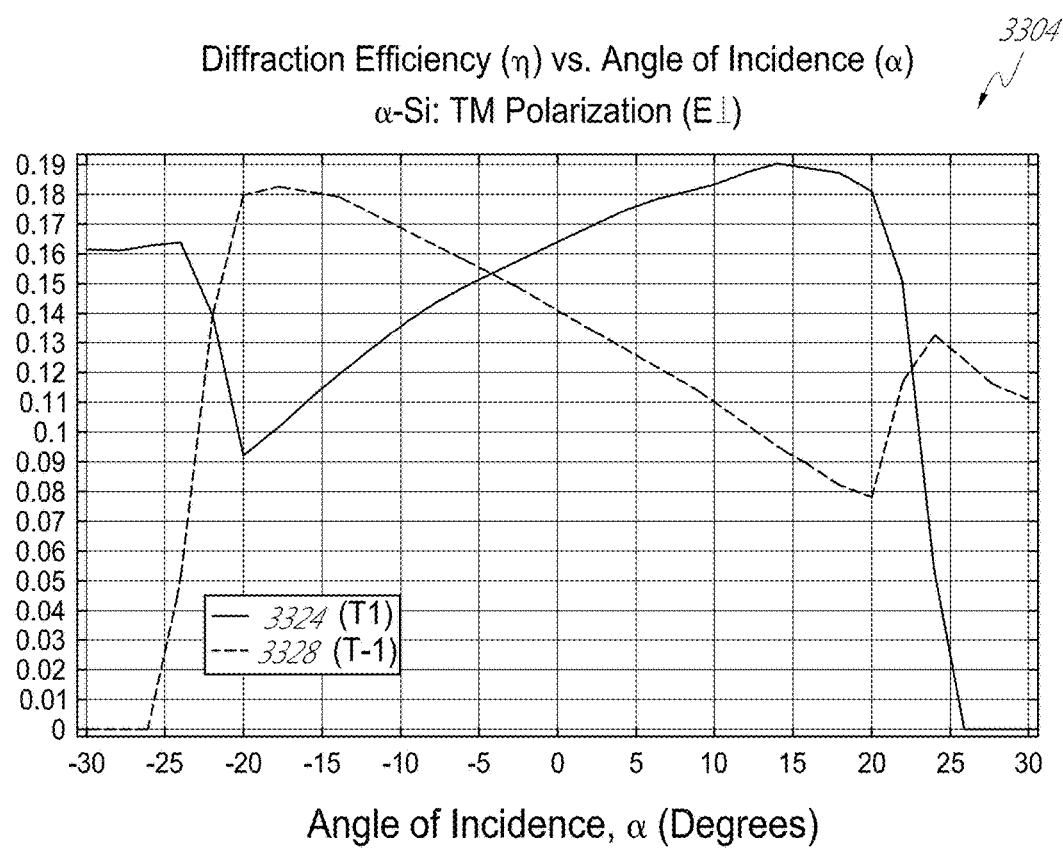

FIGS. 33A and 33B illustrate simulated diffraction efficiencies (η) versus angle of incidence (α) for an exemplary diffraction grating formed of amorphous silicon, for TE and TM polarized green light, respectively, according to some embodiments. In particular, the simulations 3300 and 3304 display the diffraction efficiencies (η) of T+1 (3314, FIG. 33A) and T−1 (3318, FIG. 33A) order diffracted TE polarized green light at λ=520 nm and of T+1 (3324, FIG. 32B) and T−1 (3328, FIG. 32B) order TM polarized green light at λ=520 nm, respectively, incident on the diffraction grating at the α relative to a surface normal. The simulations 3300 and 3304 were performed for a diffraction grating having first lines and second lines formed of amorphous silicon on a substrate having $n_2$=1.77, where $\Lambda_a$=382 nm, $h_{nano1}$85 nm, $W_{nano1-1}$=$W_{nano2-1}$=30 nm and $W_{nano1-2}$=$W_{nano2-2}$=45 nm, $s_{1-1}$=58 nm, $s_{1-2}$=23 nm, $s_{1-3}$=35 nm, $s_{2-1}$=$s_{2-2}$=58 nm, under transmission mode.

As illustrated in FIG. 33A, for TE polarized light, the diffraction grating 3000 diffracts the incident light relatively efficiently into the T+1 order diffracted beam 3314, while reducing the T−1 order diffracted beam 3318, with corresponding diffraction efficiencies of about 39% and about 13%, respectively, at α=0. For the T+1 order TE polarized green light, the range of angle of incidence (in the range of 10), or field of view (FOV), is relatively wide at >40 (<−30 to >+10) degrees, outside of which the diffraction efficiency η falls off by about 10% or more from an efficiency exceeding 35% at α=0. As illustrated in FIG. 33B, for TM polarized light, the diffraction grating 3000 diffracts the incident light relatively evenly between the T+1 order diffracted beam 3324 and the T−1 order diffracted beam 3328, with corresponding diffraction efficiencies exceeding 15% at α=0.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention.

For example, while advantageously utilized with AR displays that provide images across multiple depth planes, the augmented reality content disclosed herein may also be displayed by systems that provide images on a single depth plane, and/or with virtual reality displays. In some embodiments where multiplexed image information (e.g. light of different colors) is directed into a waveguide, multiple metasurfaces may be provided on the waveguide, e.g., one metasurface active for each color of light. In some embodiments, the pitch or periodicity, and/or geometric sizes, of the protrusions forming the metasurface may vary across a metasurface. Such a metasurface may be active in redirecting light of different wavelengths, depending upon the geometries and pitches at the locations where that light impinges on the metasurfaces. In some other embodiments, the geometries and pitches of metasurface features are configured to vary such that deflected light rays, even of similar wavelengths, propagate away from the metasurface at different angles. It will also be appreciated that multiple separated metasurfaces may be disposed across a substrate surface, with each of the metasurfaces having the same geometries and pitches in some embodiments, or with at least some of the metasurfaces having different geometries and/or pitches from other metasurfaces in some other embodiments.

Also, while advantageously applied to displays, such as wearable displays, the metasurfaces may be applied to various other devices in which a compact, low-profile light redirecting element is desired. For example, the metal surfaces may be applied to form light redirecting parts of optical plates (e.g., glass plates), optical fibers, microscopes, sensors, watches, cameras, and image projection devices generally.

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

For ease of description, various words indicating the relative positions of features are used herein. For example, various features may be described as being "on," "over," at the "side" of, "higher" or "lower" other features. Other words of relative position may also be used. All such words of relative position assume that the aggregate structure or system formed by the features as a whole is in a certain orientation as a point of reference for description purposes, but it will be appreciated that, in use, the structure may be positioned sideways, flipped, or in any number of other orientations.

In addition, though the invention has been described with reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All suitable combinations and subcombinations of features of this disclosure are intended to fall within the scope of this disclosure.

What is claimed is:

1. An optical system comprising:
   a metasurface configured to diffract visible light having a wavelength, the metasurface comprising:
   a plurality of repeating unit cells, each unit cell consisting of two to four sets of nanobeams, wherein:
   a first set of nanobeams are formed by one or more first nanobeams; and
   a second set of nanobeams are formed by a plurality of second nanobeams disposed adjacent to the one or more first nanobeams and separated from each other by a sub-wavelength spacing,
   wherein the one or more first nanobeams and the plurality of second nanobeams are elongated in different orientation directions, and
   wherein the unit cells repeat at a period less than or equal to about 10 nm to 1 μm.

2. The optical system of claim 1, wherein the one or more first nanobeams and the second nanobeams are oriented at an angle relative to each other to cause a phase difference between the visible light diffracted by the one or more first nanobeams and the visible light diffracted by the second nanobeams.

3. The optical system of claim 1, wherein the phase difference is twice the angle.

4. The optical system of claim 1, wherein the wavelength in the visible spectrum corresponds to a blue light, a green light or a red light.

5. The optical system of claim 1, wherein the one or more first nanobeams and the second nanobeams are oriented in orientation directions that are rotated by about 90 degrees relative to each other.

6. The optical system of claim 1, wherein each of the first nanobeams have a same width.

7. The optical system of claim 1, wherein each of the second nanobeams has a same width.

8. The optical system of claim 1, wherein each of the first nanobeams in each of the second nanobeams have a same spacing between individual ones of the first and second nanobeams.

9. The optical system of claim 1, wherein the unit cells repeat at a period less than or equal to the wavelength, wherein the wavelength is within the visible spectrum.

10. The optical system of claim 1, wherein the one or more first nanobeams and the second nanobeams have a height smaller than the wavelength.

11. The optical system of claim 1, wherein the one or more first nanobeams and the second nanobeams are formed of a material whose bulk refractive index is higher than 2.0 at the wavelength.

12. The optical system of claim 1, wherein the one or more first nanobeams and the second nanobeams are formed of a semiconductor material or an insulating material.

13. The optical system of claim 1, wherein the one or more first nanobeams and the second nanobeams are formed of a material having silicon.

14. The optical system of claim 13, wherein the one or more first nanobeams and the second nanobeams are formed of a material selected from the group consisting of polycrystalline silicon, amorphous silicon, silicon carbide and silicon nitride.

15. The optical system of claim 1, wherein the one or more first nanobeams and the second nanobeams are configured to diffract the visible light at a diffraction efficiency greater than 10% at a diffraction angle greater than 50 degrees relative to a surface normal plane.

16. The optical system of claim 15, wherein the one or more first nanobeams and the second nanobeams are configured to diffract light at the diffraction efficiency for the incident light having a range of angle of incidence which exceeds 40 degrees.

17. The optical system of claim 16, wherein the surface normal plane extends in the first orientation direction.

18. The optical system of claim 17, wherein the one or more first nanobeams and the second nanobeams are configured to diffract light in a transmission mode, wherein the intensity of diffracted light on an opposite side of the one or more first nanobeams and the second nanobeams as a light-incident side is greater compared to the intensity of diffracted light on a same side of the one or more first nanobeams and the second nanobeams as the light-incident side.

19. The optical system of claim 17, wherein the wherein the one or more first nanobeams and the second nanobeams are configured to diffract light in a reflection mode, wherein the intensity of diffracted light on a same side of the one or more first nanobeams and the second nanobeams as a light-incident side is greater compared to the intensity of diffracted light on an opposite side of the one or more first nanobeams and the second nanobeams as the light-incident side.

20. The optical system of claim 1, wherein the one or more first nanobeams and the second nanobeams are formed on a substrate and formed of a material whose bulk refractive index is greater than a refractive index of the substrate by at least 0.5.

21. The optical system of claim 20, wherein the substrate has a refractive index greater than 1.5.

22. The optical system of claim 20, wherein the substrate is configured such that light diffracted by the one or more first nanobeams and the second nanobeams propagate in the second direction under total internal reflection.

23. The optical system of claim 1, wherein the one or more first nanobeams and the second nanobeams have a substantially rectangular cross-sectional shape.

24. The optical system of claim 1, wherein the one or more first nanobeams comprise a pair of first nanobeams.

25. The optical system of claim 24, wherein the one or more first nanobeams are immediately adjacent to the pair of nanobeams such that the second nanobeams are directly interposed between adjacent pairs of first nanobeams.

26. The optical system of claim 1, wherein the one or more first nanobeams consists of one first nanobeam.

27. The optical system of claim 1, further comprising a third set of nanobeams formed by a plurality of third nanobeams elongated in a different orientation relative to the first one or more first nanobeams and the plurality of second nanobeams, the third nanobeams interposed between the one or more first nanobeams and the second nanobeams.

28. The optical system of claim 27, wherein the third nanobeams have the same length such that the third nanobeams coterminate.

29. The optical system of claim 27, wherein adjacent ones of the third nanobeams are separated by a constant space in the first orientation direction.

30. The optical system of claim 27, wherein the one or more first nanobeams span a distance in the first orientation direction corresponding to a plurality of third nanobeams.

31. The optical system of claim 27, wherein each of the third nanobeams has the same width and wherein a spacing between individual ones of the third nanobeams has a same width.

32. The optical system of claim 27, wherein the third nanobeams extend in a third orientation direction that is rotated in a counterclockwise direction relative to the one or more first nanobeams by an angle smaller than the smallest angle of rotation in the counterclockwise direction of the second nanobeams relative to the one or more first nanobeams when viewed a direction of propagation of an incident light.

33. The optical system of claim 27, further comprising a fourth set of nanobeams formed by a plurality of fourth nanobeams elongated in a different orientation relative to the first one or more first nanobeams, the plurality of second nanobeams and the plurality of third nanobeams, the fourth nanobeams disposed on a side of the second nanobeams in the second orientation direction that is opposite to a side in which the third nanobeams are disposed.

34. The optical system of claim 33, wherein the fourth nanobeams extend in a fourth orientation direction that is rotated in a counterclockwise direction relative to the one or more first nanobeams by an angle greater than the smallest angle of rotation in the counterclockwise direction of the second nanobeams relative to the one or more first nanobeams when viewed a direction of propagation of an incident light.

35. The optical system of claim 34, wherein the fourth orientation direction and the third orientation direction are rotated by about 90 degrees relative to each other.

36. The optical system of claim 1, wherein the one or more first nanobeams and the second nanobeams comprise a bilayer comprising a lower layer having a first refractive index and an upper layer having a second refractive index lower than the first refractive index.

37. The optical system of claim 36, wherein the upper layer is formed of a material having a refractive index lower than about 2.0.

38. The optical system of claim 36, wherein the upper layer contains silicon or carbon.

39. The optical system of claim 1, wherein the one or more first nanobeams and the second nanobeams are buried in a transparent spacer layer.

40. The optical system of claim 39, wherein the transparent spacer layer has a refractive index smaller than a refractive index of a bulk material of one or more first nanobeams and the second nanobeams.

41. The optical system of claim 1, wherein a metallic reflective layer is formed over the one or more first nanobeams and the second nanobeams.

42. The optical system of claim 1, further comprising a waveguide configured to propagate visible light, the wave guide comprising:
a substrate having thereon the metasurface, wherein the one or more first nanobeams and the second nanobeams are arranged to diffract light at a diffraction angle relative to the direction of an incident light and to cause the diffracted light to propagate in the substrate under total internal reflection.

43. The waveguide of claim 42, wherein the substrate is formed of a material whose refractive index is less than a bulk refractive index of the material from which the one or more nanobeams and the second nanobeams are formed, thereby causing the diffracted light to propagate in the substrate under total internal reflection.

44. The waveguide of claim 42, wherein the diffraction angle exceeds 50 degrees.

45. The waveguide of claim 42, wherein the substrate is formed of a material whose refractive index is smaller than a bulk refractive index of the material from which the one or more nanobeams and the second nanobeams are formed by at least 0.5.

46. The waveguide of claim 42, wherein the substrate has a refractive index greater than 1.5.

47. The optical system of claim 1, wherein the optical system is a head-mounted display device configured to project light to an eye of a user to display augmented reality image content, the head-mounted display device comprising:
a frame configured to be supported on a head of the user;
a display disposed on the frame, at least a portion of the display comprising:
one or more waveguides, the one or more waveguides being transparent and disposed at a location in front of the user's eye when the user wears the head-mounted display device such that the transparent portion transmits light from a portion of an environment in front of the user to the user's eye to provide a view of the portion of the environment in front of the user;
one or more light sources; and
at least one diffraction grating configured to couple light from the light sources into the one or more waveguides or to couple light out of the one or more waveguides, the diffraction grating comprising the metasurface.

48. The device of claim 47, wherein the one or more light sources comprises a fiber scanning projector.

49. The device of claim 47, the display configured to project light into the user's eye so as to present image content to the user on a plurality of depth planes.

50. A method of fabricating an optical system, comprising:
providing a substrate;
forming on the substrate a metasurface comprising a plurality of unit cells, the unit cells consisting of two to four sets of nanobeams, wherein forming the unit cells comprises:
forming a first set of nanobeams comprising one or more first nanobeams; and
forming a second set of nanobeams adjacent to the one or more first nanobeams, the second set of nanobeams comprising a plurality of second nanobeams that are separated from each other by a sub-wavelength spacing,
wherein the one or more first nanobeams and the plurality of second nanobeams are elongated in different orientation directions, and
wherein the unit cells repeat at a period less than or equal to about 10 nm to 1 μm.

51. The method of claim 50, wherein forming the one or more first nanobeams and forming the second nanobeams comprises lithographically defining the first and second nanobeams.

52. The method of claim 50, wherein forming the one or more first nanobeams and forming the second nanobeams comprises forming the first and second nanobeams by nanoimprinting.

53. The method of claim 50, wherein forming the one or more first nanobeams and forming the second nanobeams are performed simultaneously.

54. The method of claim 50, wherein the one or more first nanobeams have the same width.

55. The method of claim 50, wherein the second nanobeams of each unit cell have the same width.

56. The method of claim 50, wherein the units cells have a period less than or equal to a wavelength in the visible spectrum.

57. An optical system comprising:
   a metasurface configured to diffract visible light having a wavelength, the metasurface comprising:
      a plurality of repeating unit cells, each unit cell comprising:
         a first set of nanobeams formed by one or more first nanobeams; and
         a second set of nanobeams formed by a plurality of second nanobeams disposed adjacent to the one or more first nanobeams and separated from each other by a sub-wavelength spacing,
         wherein the one or more first nanobeams and the plurality of second nanobeams are elongated in different orientation directions, and
         wherein the unit cells repeat at a period less than or equal to the wavelength.

58. The optical system of claim 57, further comprising a light source configured to emit light of the wavelength to the metasurface.

59. The optical system of claim 58, further comprising a spatial light modulator configured to modulate light from the light source and to output the modulated light to the metasurface.

60. The optical system of claim 57, wherein the wavelength corresponds to blue light, green light or red light.

* * * * *

UNITED STATES PATENT AND TRADEMARK OFFICE
CERTIFICATE OF CORRECTION

PATENT NO. : 10,466,394 B2
APPLICATION NO. : 15/880404
DATED : November 5, 2019
INVENTOR(S) : Lin et al.

It is certified that error appears in the above-identified patent and that said Letters Patent is hereby corrected as shown below:

In the Specification

In Column 2, Line 14, delete "wave guide" and insert --waveguide--.

In Column 4, Lines 52-53, delete "wherein the wherein the" and insert --wherein the--.

In Column 6, Line 27, delete "wave guide" and insert --waveguide--.

In Column 11, Line 36, delete "11A" and insert --11A.--.

In Column 13, Line 8, delete "embodiments" and insert --embodiments.--.

In Column 27, Line 35, delete "pickups/retardadations" and insert --pickups/retardations--.

In Column 31, Line 24, delete "0 and it," and insert --0 and $\pi$,--.

In Column 31, Line 27, delete "by it" and insert --by $\pi$--.

In Column 35, Line 46, delete "herein." and insert --herein,--.

In Column 35, Line 46, delete "The" and insert --the--.

In Column 36, Line 36, delete "sum of and" and insert --sum of $s_1$ and--.

In Column 37, Line 22, delete "n1 bulk For" and insert --$n_{1\ bulk}$. For--.

In Column 38, Line 33, delete "5 mm nm," and insert --5 mm,--.

In Column 39, Line 14, delete "g=2Θ," and insert --$\varphi_g = 2\Theta$,--.

Signed and Sealed this
Twenty-fourth Day of November, 2020

Andrei Iancu
*Director of the United States Patent and Trademark Office*

CERTIFICATE OF CORRECTION (continued)
U.S. Pat. No. 10,466,394 B2

In Column 40, Line 9, delete "n2" and insert --$n_2$--.

In Column 41, Line 45, delete "Δα=382 nm," and insert --$\Lambda_a$=382 nm,--.

In Column 42, Line 38, delete "Δα=382 nm," and insert --$\Lambda_a$=382 nm,--.

In Column 43, Line 4, delete "$h_{nano1}$=$h_{nano2}$=$^2$60 nm," and insert --$h_{nano1}$=$h_{nano2}$=260 nm,--.

In Column 43, Line 22, delete "Δα=382 nm," and insert --$\Lambda_a$=382 nm,--.

In Column 43, Line 47, delete "Δα=334 nm," and insert --$\Lambda_a$=334 nm,--.

In Column 43, Line 66, delete "Λa=334 nm," and insert --$\Lambda_a$=334 nm,--.

In Column 44, Line 18, delete "Δα=334 nm," and insert --$\Lambda_a$=334 nm,--.

In Column 44, Line 37, delete "Δα=334 nm," and insert --$\Lambda_a$=334 nm,--.

In Column 46, Line 30, delete "7π/4," and insert --π/4,--.

In Column 46, Line 31, delete "7π/2," and insert --π/2,--.

In Column 49, Line 12, delete "n2=1.77." and insert --$n_2$=1.77,--.

In Column 49, Line 12, delete "Δα=382 nm," and insert --$\Lambda_a$=382 nm,--.

In Column 53, Line 35, delete "FIG." and insert --FIGS.--.

In Column 53, Line 56, delete "nanobemas" and insert --nanobeams--.

In Column 54, Line 29, delete "$W_{nano2-2}$ is nm" and insert --$W_{nano2-2}$ is in the range of 10 nm--.

In Column 54, Line 41, delete "$s_{1-3}$" and insert --$s_{1-3}$.--.

In Column 55, Lines 52-53, delete "(in the range of 10)," and insert --(Δα),--.

In Column 56, Lines 18-19, delete "(in the range of 10)," and insert --(Δα),--.

In Column 56, Line 41, delete "$h_{nano1}$85 nm," and insert --$h_{nano1}$=85 nm,--.

In Column 56, Lines 51-52, delete "(in the range of 10)," and insert --(Δα),--.

In the Claims

In Column 60, Lines 20-21, Claim 19, delete "wherein the wherein the" and insert --wherein the--.

In Column 61, Lines 54-55, Claim 42, delete "wave guide" and insert --waveguide--.